United States Patent [19]

Tani et al.

[11] Patent Number: 4,926,358

[45] Date of Patent: May 15, 1990

[54] SYSTEM FOR CONTROLLING CURLS OF A PAPER

[75] Inventors: Tatsuo Tani, Urayasu; Hiroshi Yokoyama, Yokohama; Shoji Hayashi, Yokohama; Takashi Murofushi, Yokohama, all of Japan

[73] Assignee: Ricoh Company, Ltd., Tokyo, Japan

[21] Appl. No.: 196,482

[22] Filed: May 20, 1988

Related U.S. Application Data

[63] Continuation-in-part of Ser. No. 179,296, Apr. 8, 1988, abandoned.

[30] Foreign Application Priority Data

| | | | |
|---|---|---|---|
| May 20, 1987 | [JP] | Japan | 62-121190 |
| May 29, 1987 | [JP] | Japan | 62-83631[U] |
| May 29, 1987 | [JP] | Japan | 62-83632[U] |
| Jul. 3, 1987 | [JP] | Japan | 62-101845[U] |
| Sep. 3, 1987 | [JP] | Japan | 62-135006[U] |
| Sep. 14, 1987 | [JP] | Japan | 62-228576 |
| Sep. 16, 1987 | [JP] | Japan | 62-140029[U] |
| Sep. 22, 1987 | [JP] | Japan | 62-143792[U] |
| Sep. 29, 1987 | [JP] | Japan | 62-147490[U] |
| Oct. 29, 1987 | [JP] | Japan | 62-165837[U] |
| Oct. 29, 1987 | [JP] | Japan | 62-165838[U] |
| Jan. 9, 1988 | [JP] | Japan | 63-1434[U] |

[51] Int. Cl.[5] .... G03G 15/00; G06F 15/62

[52] U.S. Cl. .... 364/562; 355/204; 355/207; 355/311; 356/387; 364/550; 364/556

[58] Field of Search .... 356/371, 376, 387; 355/3 SH, 3 TR, 3 FU, 64, 30, 14 SH, 73, 76, 204, 207, 311; 364/550, 561, 556, 471, 478, 562; 271/193, 279, 307, 310; 162/271

[56] References Cited

U.S. PATENT DOCUMENTS

| | | | |
|---|---|---|---|
| 4,068,946 | 1/1978 | Eschweiler, Jr. | 355/64 |
| 4,417,800 | 11/1983 | Hirose et al. | 355/3 TR |
| 4,453,820 | 6/1984 | Suzuki | 355/3 TR |
| 4,505,695 | 3/1985 | Billings | 162/271 |
| 4,539,072 | 9/1985 | Frye et al. | 162/271 |
| 4,540,275 | 9/1985 | Iwahashi | 355/3 TR |
| 4,542,977 | 9/1985 | Kamogawa et al. | 355/3 TR |
| 4,591,259 | 5/1986 | Kuo et al. | 355/3 SH |
| 4,596,632 | 6/1986 | Goetz et al. | 162/271 |
| 4,623,975 | 11/1986 | Kagami | 356/387 |
| 4,627,718 | 12/1986 | Wyer | 355/14 SH |
| 4,632,533 | 12/1986 | Young | 355/3 SH |
| 4,641,272 | 2/1987 | Sasaki et al. | 364/559 |
| 4,652,110 | 3/1987 | Sato et al. | 355/3 FU |
| 4,666,289 | 5/1987 | Kawano | 355/3 SH |
| 4,673,279 | 6/1987 | Brown | 355/3 SH |
| 4,708,468 | 11/1987 | Stemmle | 355/3 SH |
| 4,727,385 | 2/1988 | Nishikawa et al. | 355/30 |
| 4,733,310 | 3/1988 | Kapp et al. | 355/14 SH |
| 4,734,721 | 3/1988 | Boyer et al. | 355/30 |
| 4,747,911 | 5/1988 | Polson | 356/371 |
| 4,763,164 | 8/1988 | Ariga et al. | 355/14 SH |
| 4,763,889 | 8/1988 | Dei et al. | 355/14 SH |
| 4,771,318 | 9/1988 | Noguchi et al. | 355/14 SH |
| 4,804,998 | 2/1989 | Miyawaki | 355/14 SH |

FOREIGN PATENT DOCUMENTS

| | | |
|---|---|---|
| 53-35731 | 4/1978 | Japan . |
| 59-30156 | 2/1984 | Japan . |
| 60-50568 | 3/1985 | Japan . |
| 61-28754 | 2/1986 | Japan . |
| 63-65647 | 4/1988 | Japan . |

*Primary Examiner*—Kevin J. Teska
*Attorney, Agent, or Firm*—Oblon, Spivak, McClelland, Maier & Neustadt

[57] ABSTRACT

A curl control system applicable to an electrophotographic copier for sensing the conditions of curls of a paper being transported and correcting the curls includes a curl sensing device and a curl correcting device. Two distance sensor units illuminate the paper and receive a reflection from the paper to sense the amount and direction of curl of the paper. A paper size sensor is provided for sensing the size of the paper. The curl correcting device corrects the curls on the basis of the amount and direction of curl sensed. The curl correcting device may be implemented in the device in many fashions.

62 Claims, 54 Drawing Sheets

Fig. 4

| KIND OF PAPER | WEIGHT ($g/m^2$) | THICK-NESS ($\mu m$) | WATER CONTENT (%) | | | |
|---|---|---|---|---|---|---|
| | | | INITIAL | ZERO MIN. AFTER FIXING | 5 MIN. AFTER FIXING | 30 MIN. AFTER FIXING |
| A | 52.7 | 61 | 6.8 | 4.1 | 4.8 | 6.0 |
| B | 689 | 82 | 5.3 | 3.6 | 4.8 | 5.5 |
| C | 848 | 95 | 6.4 | 4.2 | 4.9 | 5.6 |
| D | 102.5 | 111 | 6.6 | 4.8 | 5.4 | 6.2 |
| E | 658 | 80 | 6.1 | 3.8 | 5.4 | 6.0 |
| F | 734 | 111 | 6.4 | 3.9 | 5.3 | 5.4 |

Fig. 5

| KIND OF PAPER \ WATER CONTENT | 4 % | 5 % | 6 % |
|---|---|---|---|
| A | △ | ○ | ○ |
| B | △ | △ | ○ |
| C | △ | △ | ○ |
| D | ○ | ○ | ○ |
| E | × | ○ | ○ |
| F | × | △ | ○ |

SYSTEM FOR CONTROLLING CURLS OF A PAPER

CROSS REFERENCE TO RELATED APPLICATION

This application is a continuation-in-part of copending U.S. patent application Ser. No. 179,296, filed Apr. 8, 1988 (now abandoned).

BACKGROUND OF THE INVENTION

The present invention relates to a system for controlling curls of a paper. More particularly, in an image forming apparatus in which a visible image provided on a photoconductive element is transferred to a paper being transported along a predetermined transport path, the present invention is concerned with a system for sensing curls of the paper and correcting the curls on the basis of their particular conditions.

In an electrophotographic copier, facsimile apparatus, electrostatic printer or like image forming apparatus which uses an electrophotographic process, an electrostatic latent image or a toner image provided on a photoconductive element is transferred by a transfer charger to a paper which is transported along a predetermined path. The paper carrying the image thereon is separated from the photoconductive element and then fed to a fixing station which is adapted to fix the image by applying heat to the paper. While the paper is driven through the fixing station, it is deformed or curled due to the heat and the decrease in its water content which is ascribable to evaporation. Generally, a paper for such an application is provided with a water content of about 6% at the production stage and wrapped in an elaborated manner to be sealed from moisture. In addition, a paper feed tray of a copier is provided with a hermetic configuration and even furnished with a heater for controlling relative humidity.

However, when the papers are left in an unwrapped condition as often occurs due to incomplete management and if the humidity is high, they absorb moisture and, when used in the moist condition, suffer from curls. Should such a curled paper be subjected to any subsequent step, there would occur various problems as enumerated below.

(1) When a paper is curled, its contact with a photoconductive element at a transfer stage become unstable resulting in irregular image transfer, local omission of an image, and other occurrences which are undesirable for stable reproduction.

(2) A paper with relatively great curls cannot be surely separated from a photoconductive element and, in the worst case, causes an image to be partly re-transferred to the photoconductive element, critically degrading the image quality. These occurrences are observed during the course of separation process which belongs to a sequence of image forming processes. Specifically, incomplete separation of a paper from a photoconductive element is apt to occur when an electric current which flows from a separation charger into a paper is small. Conversely, re-transfer of an image is apt to occur when the separation current is large. Although a separation current is usually so adjusted as to eliminate such incomplete separation and re-transfer, the image quality attainable with a curled paper is poor because the value of separation current which causes incomplete separation and re-transfer is partly different from the usual.

(3) A paper separated from a photoconductive element carries a non-transferred toner image thereon and therefore should not be nipped by a transport roller pair from opposite sides. It is a common practice to transport such a paper to a fixing station by using a suction assembly which retains the paper on a belt by suction. However, when a paper separated from a photoconductive element and driven toward the fixing station is curled, its curled portions fail to be sucked depending upon the conditions of the curls. Those curled portions so transported afloat are liable to abut against other units to become dog-eared or to jam a transport path.

(4) In a two-side copy mode, papers each being provided with an image on one surface thereof are individually turned upside down by an inverting mechanism and sequentially stacked on a two-side tray. Then, after a document has been replaced with another, those papers are fed again to reproduce an image on their other surface, or back. When papers carrying images on their one surface are curled at a fixing station, they cannot be stacked smoothly on the two-side tray or re-fed smoothly therefrom. This constitutes a cause of jams, scratches on copies, dog-earing, positional deviation between an image and a paper, etc.

(5) In a combination copy mode, papers each undergone the first copying operation are sequentially stacked on an intermediate tray with or without the intermediary of an inverting mechanism. After the replacement of a document, those papers are fed again for the second copying operation. When any of the papers is curled at the fixing station during the first copying operation, it is transported to the fixing station in a curled condition. Assuming that the fixing station is implemented with a heating roller and a pressing roller which is pressed against the heating roller, the curled paper which is driven toward a nipping section of such a roller pair is partly raised at its leading edge away from an inlet guide and therefore fails to smoothly enter the nipping section. Such a paper is apt to be creased or to jam the transport path. In the light of this, there has been proposed to provide a narrow slit between one of the heating and pressing rollers and the guide member (Japanese Laid-Open Patent Publication (Kokai) No. 53-35731), or to provide two ridges at opposite sides of an intermediate portion of a guide surface of the inlet guide so that a paper may be nipped by the roller pair while being stretched toward opposite sides (Japanese Laid-Open Patent Publication (Kokai) No. 60-50568). Although the slit scheme mentioned above may effectively prevent a paper from being creased, it is incapable of eliminating a jam when the curl or the thickness of a paper is too great to allow the paper to smoothly move through the slit. The ridge scheme is not effective unless a paper is curled in a certain limited direction and rather aggravates creasing when a paper is curled in the opposite direction.

(6) When a sorter, finisher and other post-processing units are associated with a copier, a curled paper coming out of the copier is apt to jam such units or to impair their functions.

To solve the problems (1) to (6) discussed above, a variety of curl correcting approaches have heretofore been proposed such as a one which applies a stress or heat to a paper which is curled in a predetermined direction in the opposite direction to the curl (Japanese Laid-Open Utility Model Publication (Kokai) No.

59-30156), and a one which senses a curled condition of a paper, selects one of two different transport paths based on the curled condition, and applies a stress or heat to the paper in the opposite direction to the curl (Japanese Laid-Open Utility Model Publication No. 61-28754). All these prior art curl correcting schemes is capable of straightening a paper with no regard to the direction of a curl and adjusting the amount of correction on the basis of the amount of curl.

However, the amount and direction of curl depends upon the kind of a paper, water content of a paper, ambient conditions of a transport path, etc. Hence, even if a curl correcting device is so adjusted as to fully straighten a paper at a certain instant, a change in the kind of a paper to be transported and/or in the ambient conditions causes the amount of curl of a paper before correction to be changed. In this condition, a curl may remain even after the correction. Moreover, the direction of curl may become even opposite to the expected direction and, in this case, the curl correcting device simply serves to increase the amount of curl.

As discussed above, the prior art curl correcting devices are incapable of coping with all the kinds of curls without any assistance. In addition, they cannot deal with all the kinds of curls without resorting to a substantial degree of stress or heat and therefore an expensive and complicated construction.

SUMMARY OF THE INVENTION

It is therefore an object of the present invention to provide an imporved curl control system which controls curls of a paper being transported in an image forming apparatus by sensing conditions of the curls.

It is another object of the present invention to provide a curl sensing device for sensing the direction and amount of curl of a paper being transported in an image forming apparatus.

It is another object of the present invention to provide a curl correcting device for correcting curls of a paper being transported in an image forming apparatus.

It is another object of the present invention to provide a curl correcting device for correcting curls of a paper being transported in an image forming apparatus on the basis of the direction and amount of curl.

It is another object of the present invention to prevent a curled paper from effecting the operations of various process units which are arranged along a paper transport path defined in an image forming apparatus.

It is another object of the present invention to prevent a paper being transported along a paper transport path defined in an image forming apparatus from curling and thereby jamming the transport path.

It is another object of the present invention to allow a paper to be stably transported in an image forming apparatus by preventing it from curling.

It is another object of the present invention to promote stable reproduction of an image by preventing a paper being transported in an image forming apparatus from curling.

It is another object of the present invention to provide a generally improved curl control system.

A curl control system for controlling a curl of a paper which is applicable to an image forming apparatus of the present invention comprises a curl sensing device for sensing a curl of the paper, and a curl correcting device for correcting a curl sensed by the curl sensing device on the basis of conditions of the curl.

BRIEF DESCRIPTION OF THE DRAWINGS

The above and other objects, features and advantages of the present invention will become more apparent from the following detailed description taken with the accompanying drawings in which:

FIG. 4 is a table showing a variation in water content with respect to various kinds of papers;

FIG. 5 is a table showing the degrees of local omission of an image which were determined with various kinds of papers associated with the water contents of FIG. 4;

DESCRIPTION OF THE PREFERRED EMBODIMENTS

Hereinafter will be described a curl control system in accordance with the present invention which is generally constituted by a curl sensing device and a curl correcting device, and an image forming apparatus to which the curl control device is applied.

Image Forming Apparatus

Figure 1:
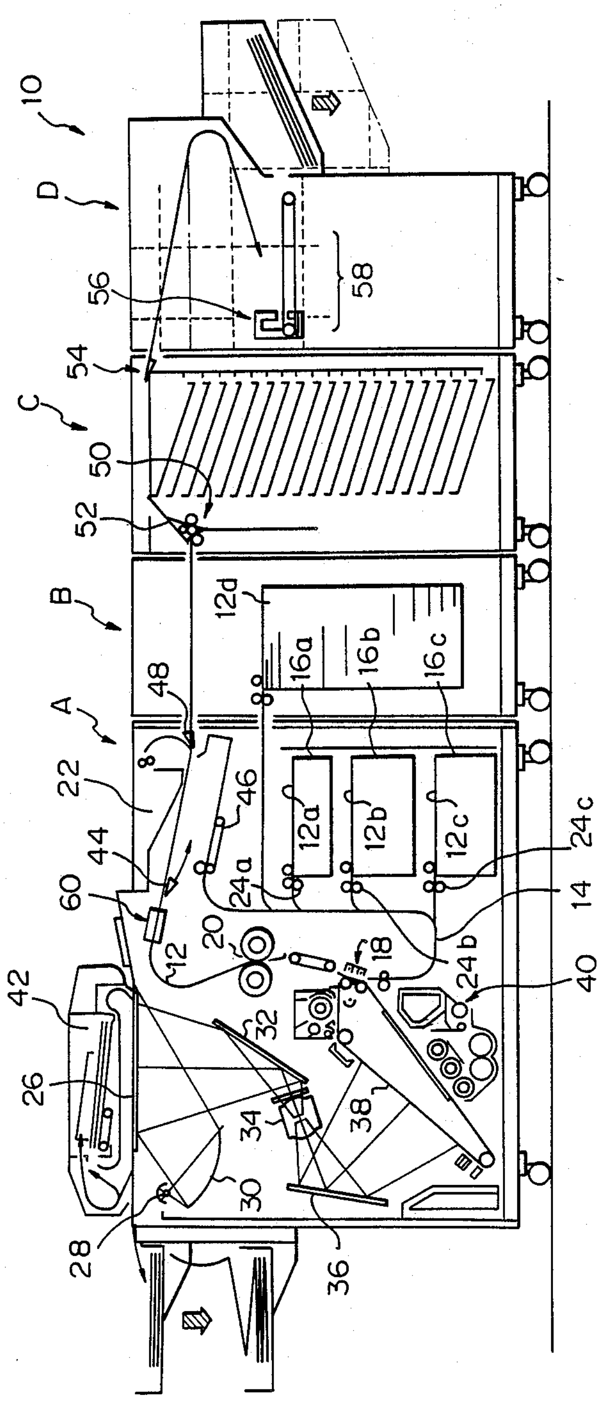
FIG. 1 is a sectional side elevation schematically showing an electronic copier to which a curl control system of the present invention is applied.

Referring to FIG. 1 of the drawings, an electrophotographic copier representative of an image forming apparatus to which the present invention is applicable is shown and generally designated by the reference numeral 10. As shown, the copier 10 is made up of a copier body A, a mass paper feeder B, a sorter C, and a post-processing unit D. In the copier body A, a paper transport path 14 extends from feed trays 16*a*, 16*b* and 16*c* to a discharge tray 22 via a transfer station 18 and a fixing station 20 so as to selectively transport papers 12*a*, 12*b* and 12*c*, which are respectively loaded in the feed trays 16*a*, 16*b* and 16*c*.

Specifically, the feed trays 16*a* and 16*b* and 16*c* are arranged one above another and loaded with the papers 12*a*, 12*b* and 12*c* which may be different in size from each other. Feed rollers 24*a*, 24*b* and 24*c* are respectively associated with the feed trays 16*a*, 16*b* and 16*c* and selectively driven to feed the papers 12*a*, 12*b* and 12*c* one at a time. For this purpose, buttons are provided on a console, not shown.

A glass platen 26 is provided on the top of the copier body A. An original document laid on the glass platen 26 is illuminated by a lamp 28. Imagewise light reflected by the document is routed through a mirror 30, a mirror 32, a lens 34 and a mirror 36 to a photoconductive element 38, whereby a latent image is electrostatically formed on the element 38. At a developing station 40, toner is deposited on the latent image to produce a toner image. Then, at the transfer station 18, the toner image is transferred to any of the papers 12*a*, 12*b* and 12*c* which are selectively fed from the feed station. Designated by the reference numeral 42 is an automatic document feeder (ADF) which is operable in an ADF mode or in a SADF (semiautomatic document feed) mode as desired.

The fixing station 20 includes a pair of drums which are held in pressing contact with each other. The drums cooperate to heat and press the paper 12*a*, 12*b* or 12*c* to fix the toner image thereon. Disposed between the fixing station 20 and the discharge tray 22 is a first selector pawl 44. This selector pawl 44 is actuated through a two-side copy button to sequentially guide the papers 12*a*, 12*b* or 12*c*, which carry images on one side thereof, from the transport path 14 to a two-side tray 46.

The mass paper feeder B is loaded with a great number of papers 12*d* and feeds the papers 12*d* one at a time to the transport path 14 of the copier body A. A second selector pawl 48 is interposed between the first pawl 44 and the discharge tray 22. When actuated through a sorter button or the like, the second selector pawl 48 sequentially guides the papers which have undergone the copying process toward the sorter C via the interior of the mass paper feeder B. The sorter C includes an inverting section 50 which in turn includes a third selector pawl 52. This selector pawl 52 may be actuated to invert the paper 12*a*, 12*b*, 12*c* or 12*d*. Also included in the sorter C is a fourth selector pawl 54 which may be actuated to direct the paper 12*a*, 12*b*, 12*c* or 12*d* toward the post-processing unit D. A stapler 56 and a finisher 58 are installed in the post-processing unit D.

Figure 2:
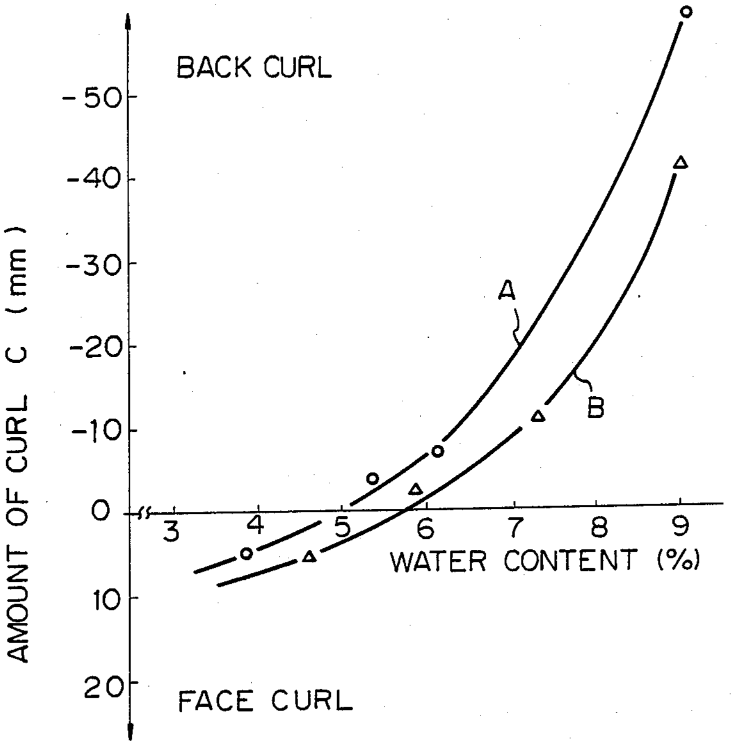
FIG. 2 is a plot representative of a relationship between the water content of a paper and the amount of curl.
Figure 3:
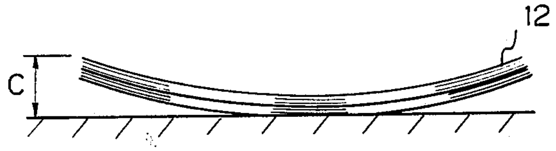
FIG. 3 is a diagram showing how the amount of curl is measured.

Generally, the water content of papers for the above application is controlled to about 6% at the production stage, as previously stated. This is because the curl of such papers is minimum when the water content is about 6%, as shown in FIG. 2. In FIG. 2, the abscissa and the ordinate are representative of a water content (%) and an amount of curl C (mm), respectively. Further, a curve A and a curve B are representative of the characteristic of papers G of a certain kind and that of papers H of another kind, respectively. In FIG. 2, the amount of curl toward that surface of a paper on which an image is recorded (face curl) is represented by a positive value while the amount of curl away from the same (back curl) is represented by a negative value. In any case, it is apparent from FIG. 2 that the water content should preferably be controlled to less than at least 7%. The amounts of curl of FIG. 2 were measured in terms of a lift C of the edge of a stack of ten papers, as shown in FIG. 3.

Even though the water content of a paper may be initially controlled to about 6%, the paper is apt to curl as the water content is lowered to about 4% due to evaporation. FIG. 4 shows such a change in water content with respect to various kinds of papers A to F. As shown, the water content which is initially controlled to about 6% is reduced to about 4% when, for example, the image is fixed at the fixing station 20 of the copier 10, then increased to about 5% when the paper is left in the natural condition for 5 minutes, and then restored to about 6% in 30 minutes. The data shown in FIG. 4 were obtained at ambient temperature of 25° C. and relative humidity of about 60%.

FIG. 5 shows whether the image reproduced on each of the papers A to F is locally omitted for water contents of 4%, 5% and 6%. In FIG. 5, circles, triangles and crosses are respectively representative of a case wherein the reproduced image on a paper is complete, a case wherein the local omission is not noticeable, and a case wherein the local omission is noticeable. The data shown in FIG. 5 prove that water contents of 6% or so prevent an image from being locally missed out at the transfer stage.

Figure 6:
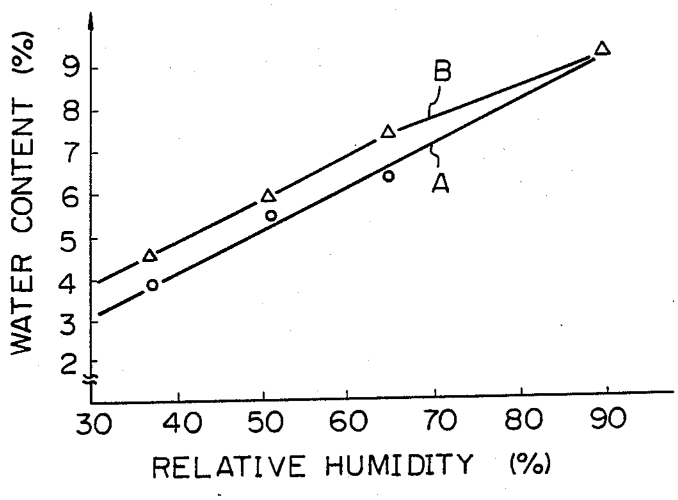
FIG. 6 is a graph showing a relationship between the relative humidity of an ambience around a paper and the water content of a paper.
Figure 7A:
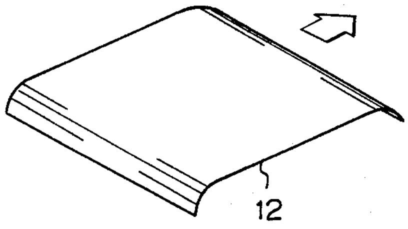
FIGS. 7A and 7B are diagrams each showing a particular curled condition of a paper.
Figure 7B:
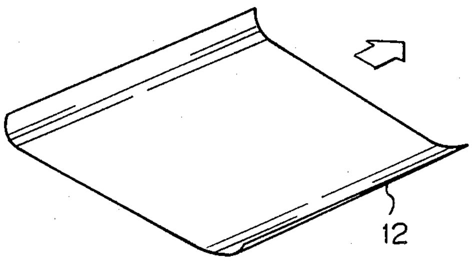

On the other hand, the water content varies with the relative humidity of the ambience such as shown in FIG. 6. In FIG. 6, the abscissa and the ordinate indicate relative temperature (%) and water content (%), respectively. A curve A and a curve B are representative of the characteristic of the paper G and that of the paper B, respectively. It will be seen that the amount and the direction of curl are effected by the relative humidity of the ambience for the same kind of papers. If the relatively humidity is controlled to about 60%, the water content of papers can be maintained lower than at least 7%, as also shown in FIG. 6. Further, a paper may be curled at its leading and trailing edges with respect to an intended direction of paper transport (indicated by an arrow), as shown in FIG. 7A, or at its side edges with respect to the same direction, as shown in FIG. 7B.

Curl Sensing Device

Figure 8:
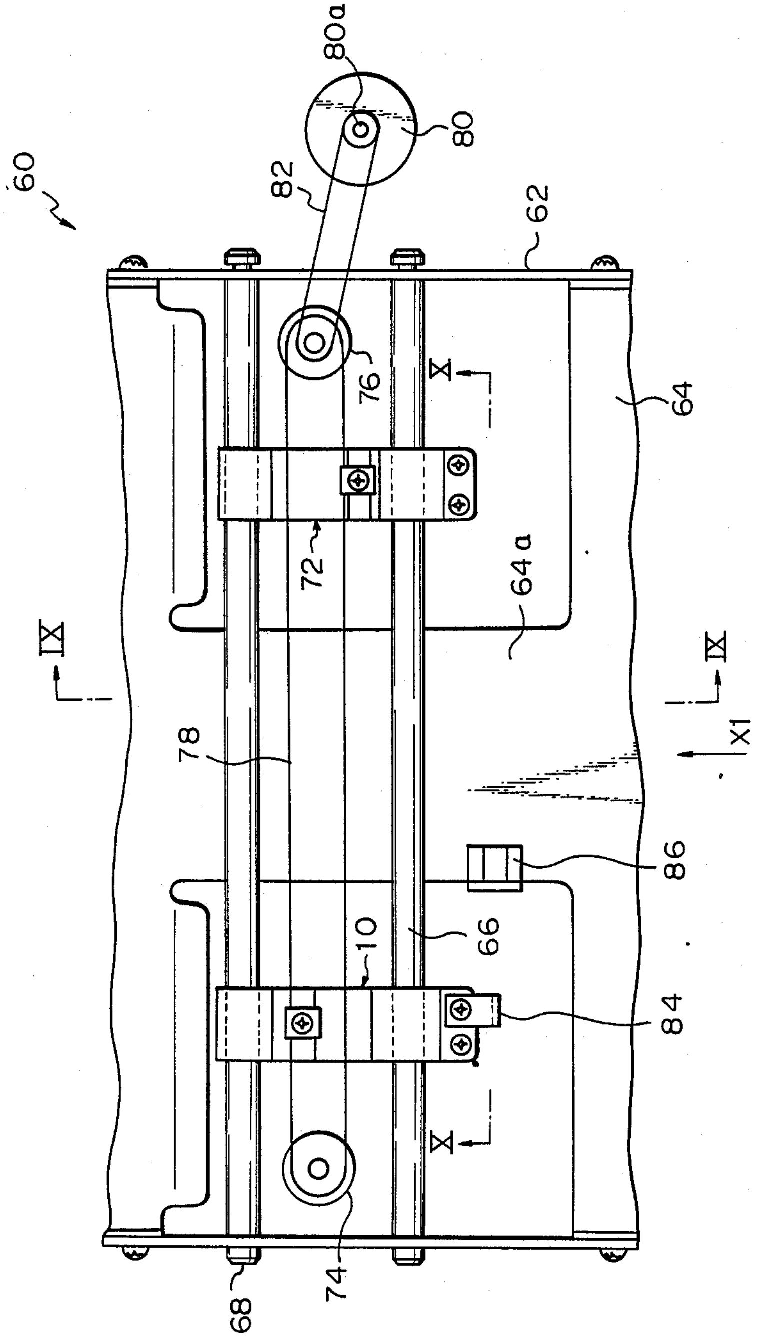
FIG. 8 is a plan view of a curl sensing device which forms a part of the curl control system of the present invention.
Figure 9:
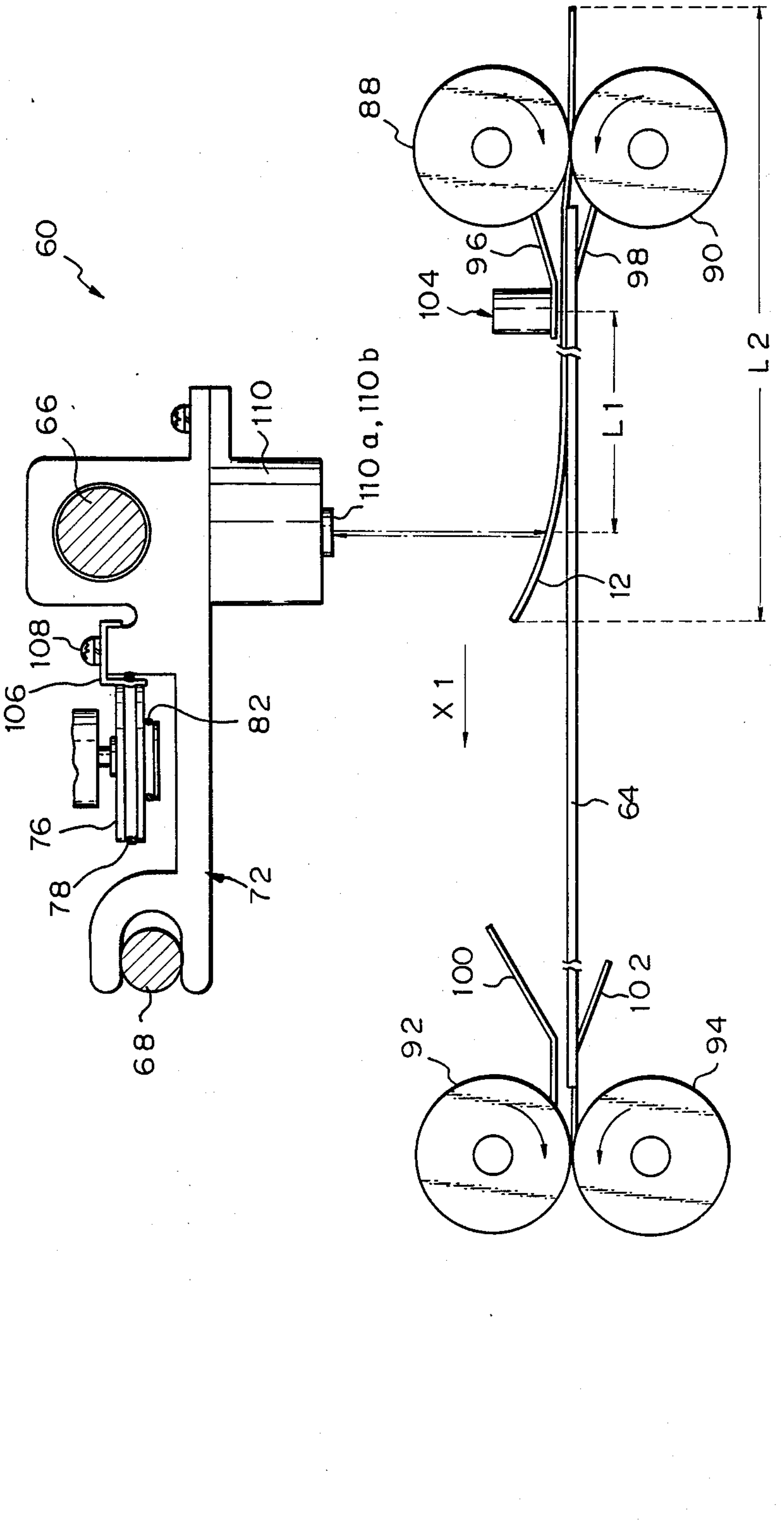
FIG. 9 is an enlarged section along line IX—IX of FIG. 8.
Figure 10:
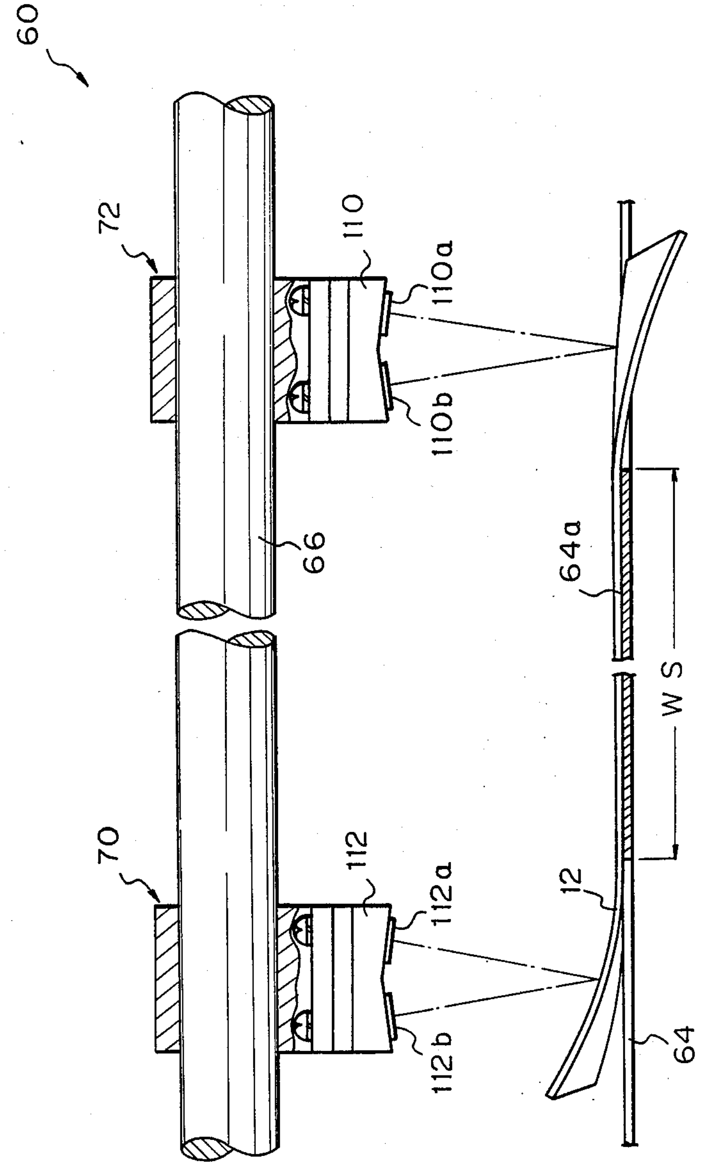
FIG. 10 is an enlarged section along line X—X of FIG. 8.

Referring to FIGS. 8 to 10, a specific construction of the curl sensing device in accordance with the present invention is shown. When the curl sensing device 60 of the figures is applied to the copier 10 of FIG. 1 by way of example, it will usually be located just downstream of the fixing station 20 (see FIG. 1) for the following reason. When the paper 12 is driven through the fixing station 20, it loses a substantial part of its moisture and therefore it is apt to curl. Should the amount of curl be large, the edges of the paper would be caught by guides and others which are built in the sorter C and the finisher 58 or like post-processing unit D, resulting in a jam. As shown in FIGS. 8 and 9, the paper 12 is transported in a direction indicated by an arrow X1. A support plate 64 and two guide bars 66 and 68 are fixedly mounted on a frame 62. Two carriages 70 and 72 are individually movable on and along the guide bars 66 and 68. Two pulleys 74 and 76 are rotatably mounted on the frame 62 and interconnected by an endless wire 78. An electric motor 80 has an output shaft 80*a* which is drivably connected to the pulley 76 by an endless drive wire 82.

The carriages 70 and 72 are each rigidly connected to a part of the endless wire 78. It is noteworthy that one of the carriages 70 and 72 is rigid on one run of the endless wire 78 and the other on the other run of the wire 78. In this configuration, when the carriage 70 is moved to the right, the carriage 72 is moved to the left; when the former is moved to the left, the latter is moved to the right. This is to position the carriages 70 and 72 in the vicinity of opposite edges of a paper 12 of any size. In this example, since the paper 12 is positioned by using the center of the support plate 64 (with respect to the direction X1) as a reference, the distances from the center of the support plate 64 to the opposite edges of the paper 12 are equal to each other and are dependent upon the width of the paper 12. In this example, the carriages 70 and 72 are positioned such that the distances from the center of the support plate 64 to the carriages 70 and 72 remain the same. Specifically, the motor 80 is driven by a certain amount which is associated with the size of the paper 12, so that the two carriages 70 and 72 are positioned at a time in the vicinity of opposite edges of the paper 12. A light intercepting plate 84 is mounted on one end of the carriage 70 while a carriage home position sensor 86 is mounted on the support plate 64 for sensing the plate 84. Positioning control for the carriages 70 and 72 is performed on the basis of a position where the sensor 86 senses the plate 84.

Figure 11:
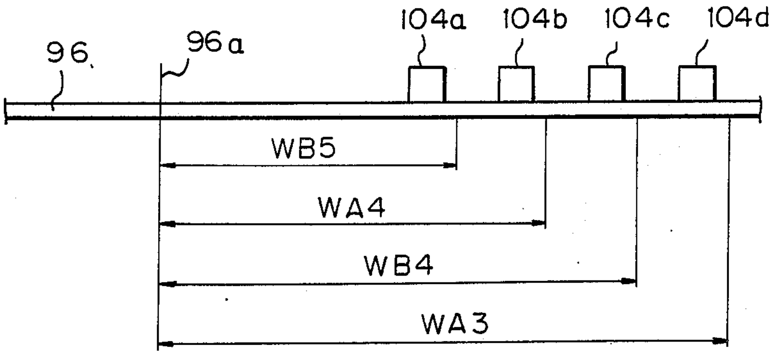
FIG. 11 is a front view of a paper size sensor as shown in FIG. 9.

As shown in FIG. 9, two rollers 88 and 90 are disposed one above the other at the inlet side of the paper transport path while two rollers 92 and 94 are disposed at the outlet side of the same. Paper guides 96, 98, 100 and 102 are so arranged as to route the paper 12 along a predetermined path. A paper size sensor 104 is located in the vicinity of the inlet rollers 88 and 90. As shown in FIG. 11, the paper size sensor 104 is made up of four sensing elements 104*a*, 104*b*, 104*c* and 104*d* which are arranged on the paper guide 96 in an array which extends in the widthwise direction (perpendicular to the direction of paper transport) of the paper 12. The function of the sensor 104 is sensing the presence and the size of the paper 12. Specifically, the sensing elements 104*a*, 104*b*, 104*c* and 104*d* are respectively located at positions slightly short of distances WB5, WA4, WB4 and WA3 as measured from the center axis 96*a* of the widthwidre direction of the paper 12. It is to be noted that the distances WB5, WA4, WB4 and WA3 indicate half the sizes of the shorter sides (widthwide dimensions) of sizes B5, A4, B4 and A4, respectively. Hence, the presence/absence and the widthwise dimension of the paper 12 can be determined on the basis of the combination of four electric signals which are outputted by the paper size sensor 104.

Figure 12:
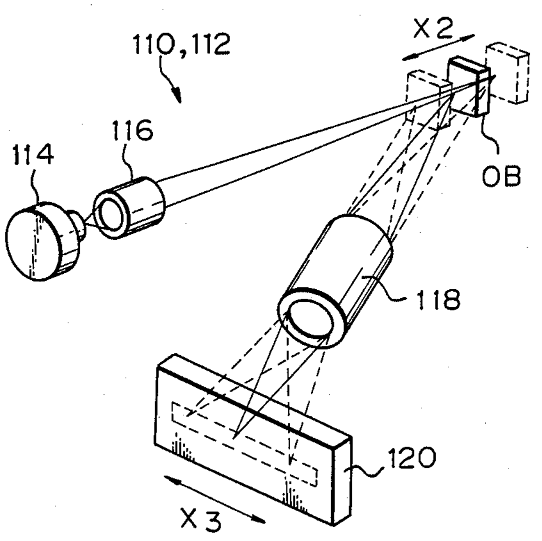
FIG. 12 is a perspective view of a distance sensor unit.

Referring again to FIG. 9, the endless wire 78 is connected to the carriage 72 by a metal fixture 106 which is in turn fastened to the carriage 72 by a screw 108. A distance sensor unit 110 is rigidly mounted on the underside of the carriage 72 with its sensing axis extending downward toward the paper 12, functioning to sense the amount (height) and the direction of curl of the paper 12. This sensor unit 110 is a commercially available sensor unit and constructed as shown in FIG. 12. In FIG. 12, the unit 110 comprises a semiconductor laser 114, an illuminating lens 116, a focusing lens 118, and a one-dimensional image sensor 120. The illuminating lens 116 restricts a laser beam issuing from the laser 114 to illuminate an object OB. Reflected by the object OB, the laser beam is focused onto the image sensor 120 by the lens 118. The optical axis of the laser 114 and lens 116 on the light emitting side and the optical axis of the lens 118 and image sensor 120 on the light receiving side are inclined relative to each other. As the distance between the laser 114 and lens 116 and the object OB, i.e., the distance between the sensor unit 110 and the object OB is changed (in a direction X2), the incidence angle of the laser beam reflected by the object OB to the lens 118 is changed with the result that the position of the beam being focused on the image sensor 120 is changed in a direction X3. The image sensor 120 has an array of light-sensitive elements which extends in the direction X3 on the light-sensitive surface of the image sensor 120, so that the position of the laser beam is determined by identifying particular one of the light-sensitive elements to which the beam is incident. That is, the distance between the sensor unit 110 and the object OB, i.e., the curled portion of the paper 12 is determined by processing an output signal of the image sensor 120. The output of the image sensor 120 is applied to an electric circuit, not shown, to be thereby transformed into distance data.

As shown in FIG. 10, the distance sensor unit 110 has a light-emitting surface 110*a* and a light-sensitive surface 110*b*. Another distance sensor unit 112 is mounted on the underside of the carriage 70 and has a light-emitting surface 112*a* and a light-sensitive surface 112*b*. The construction of the sensor unit 112 is identical with that of the sensor unit 110. The width WS of the support plate 64 is reduced in that part of the plate 64 which neighbors the carriages 70 and 72, i.e., in the vicinity of a curl measuring section. Otherwise, the support plate 64 would prevent the edge portions of the paper 12 from being deformed upward or downward. Stated another way, the central part of the paper 12 is supported by a part 64*a* of the support plate 64 but not the edge portions, allowing the paper 12 to freely move up and down as shown in FIG. 10. In practice, a paper will rarely be curled upward at one end and downward at the other end as shown in FIG. 10.

As shown in FIG. 9, each of the distance sensor units 110 and 112 begins to operate upon the lapse of a period of time of $L_1/A$ (sec) after the paper size sensor 104 has sensed the leading edge of the paper 12 and stops its operation upon the lapse of a period of time of $L_2/A$ (sec). Here, $L_1$ (mm) is the distance between the location of the distance sensor units 110 and 112, more precisely those positions of the units 110 and 112 to which laser beams are incident, and the paper size sensor 104, $L_2$ (mm) is the dimension of the paper 12 as measured in the direction of transfer, and A is the transport speed (mm/sec) of the paper 12 as effected by the roller pairs 88 and 90.

Figure 13:
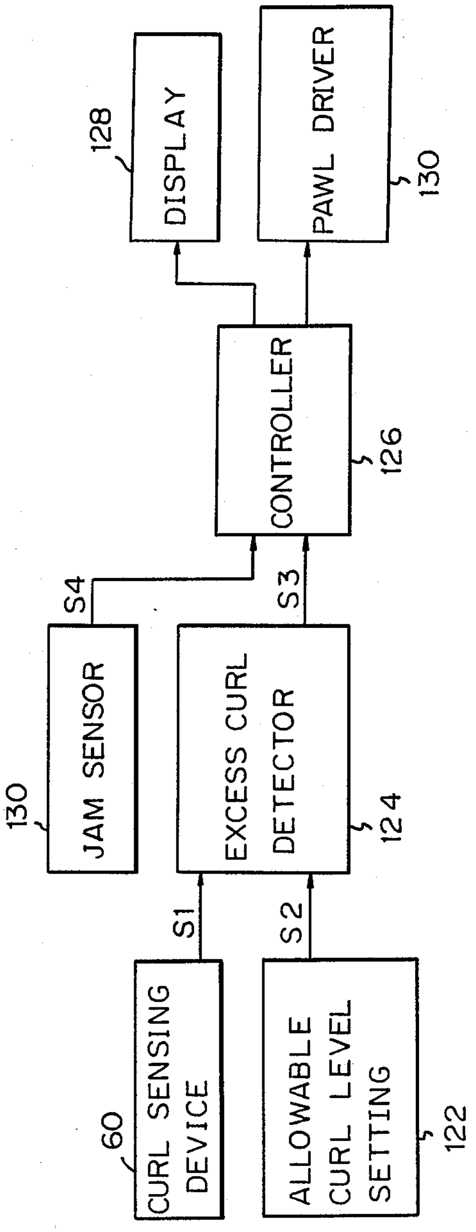
FIG. 13 is a schematic block diagram showing a control system of the copier of FIG. 1.
Figure 14:
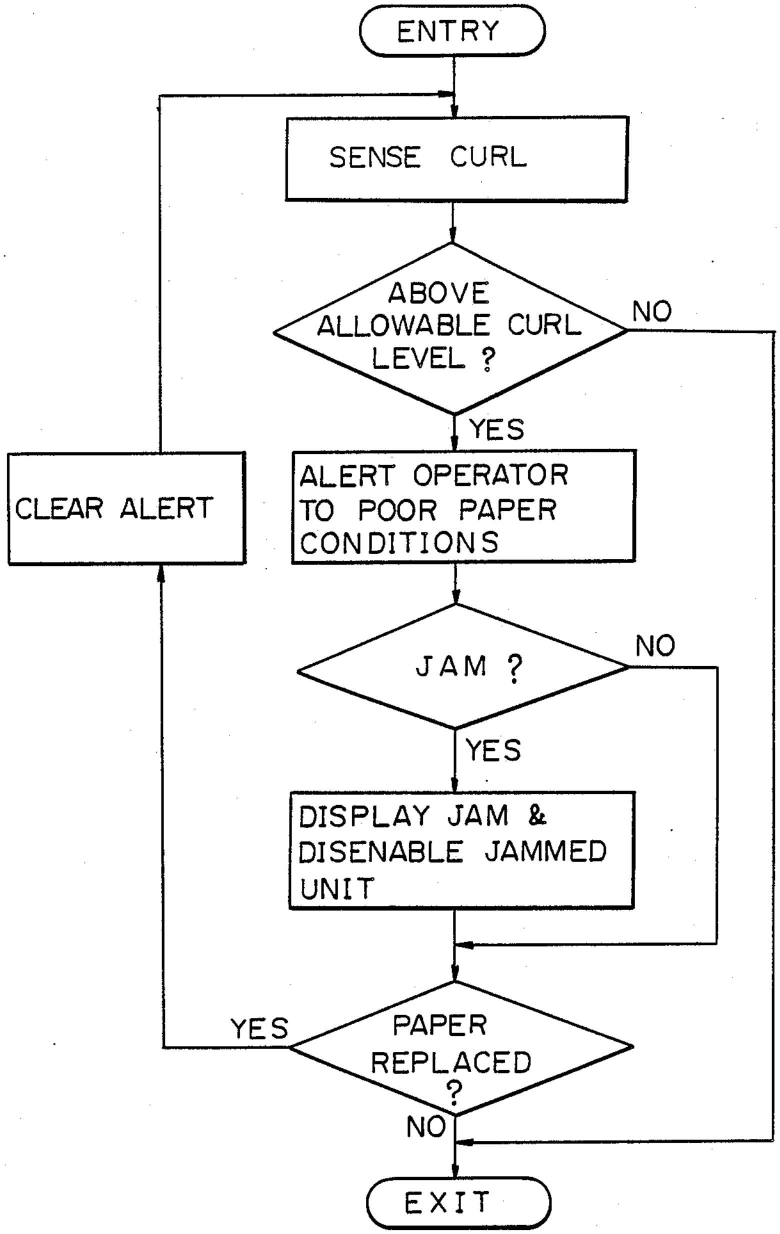
FIG. 14 is a flowchart demonstrating the operation of the control system of FIG. 13.

Referring to FIGS. 13 and 14, there is shown a system for controlling the copier 10 based on the amount of curl which is sensed by the curl sensing device 60 as stated above.

As shown in FIG. 13, a signal $S_1$ representative of the amount and direction of curl as sensed by the device 60 is applied to an excess curl detector 124, which is implemented by a comparator, together with a signal $S_2$ which is representative of an allowable curl level as set up by an allowable curl level setting block 122. Comparing the signals $S_1$ and $S_2$, the excess curl detector 124 delivers an excess curl signal $S_3$ to a controller 126 if the actual curl ($S_1$) is above the allowable level ($S_2$). In response, the controller 126 produces a warning on a display 128 to alert a person to the fear of a jam and like troubles in the copier 10. Preferably, the warning is displayed in words such as "PAPER IS WET—

CHANGE PAPER" or "NO TWO-SIDE COPY—CHANGE PAPER". The allowable curl level mentioned above should preferably be adjustable in consideration of the scattering among copiers as well as the allowable range which may depend upon the user. When the user alerted by the warning changes the papers 12 with new ones, the warning is cleared in response to, for example, removal of a paper feed tray. Then, the above control is repeated preferably after measuring the curl again.

Located downstream of the fixing station 20 are the two-side tray 46, sorter C, stapler 56 and others which are susceptible to the curl of a paper. Therefore, when the amount of curl exceeds the allowable level and a jam occurs repeatedly, troubles may be avoided by inhibiting any of those units from being used and, at the same time, displaying the inhibition while urging the operator to take necessary measures such as the replacement of papers. Specifically, as shown in FIG. 13, when a jam occurred in the copier 10 is detected by a jam detector 130, a jam signal $S_4$ is fed from the jam detector 130 to the controller 126. Controlled by the controller 126, a pawl driver 130 drives the first to fourth selector pawls 44, 48, 52 and 54 of the copier 10 so as to prevent papers from being transferred to the mass paper feeder B, sorter C, post-processing unit D, etc. For example, the pawl driver 130 drives the second selector pawl 48 to the position of FIG. 1 so that the use of the units B, C and D is inhibited, the papers being routed to the discharge tray 22 of the copier body A. Again, when the papers are replaced with new ones, the display is cleared to cancel the inhibition of use of the units. Such a procedure is shown in a flowchart in FIG. 14.

Although two distance sensors 110 and 112 are used in the illustrative embodiment, the present invention can be practiced even with a single distance sensor which is responsive to the curl of one of laterally opposite edges of a paper. However, the use of two or more distance sensors is more preferable considering the fact that the degree of curl often differs from the right edge to the left edge of a paper.

As stated above, the curl sensing device which forms a part of the present invention allows the position of distance sensing units to be adjusted in matching relation to the size of a paper being transported, thereby allowing curls of a paper to be measured with no regard to the size at its edge portions where curls are comparatively large and, therefore, with considerable sensitivity.

Curl Correcting Device

Various embodiments of the curl correcting arrangement which forms the other part of the present invention and cooperates with the curl sensing device 60 will be described hereinafter.

[I] First Embodiment

Figure 15A:
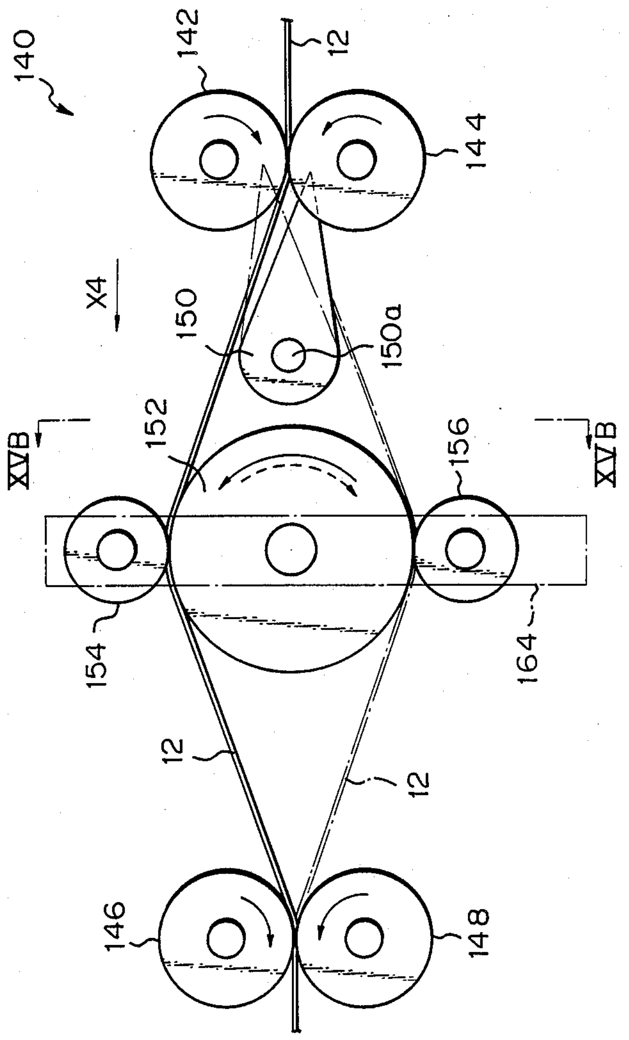
FIG. 15A is a front view of a first embodiment of a curl correcting device which forms the other part of the curl control system of the present invention.
Figure 15B:
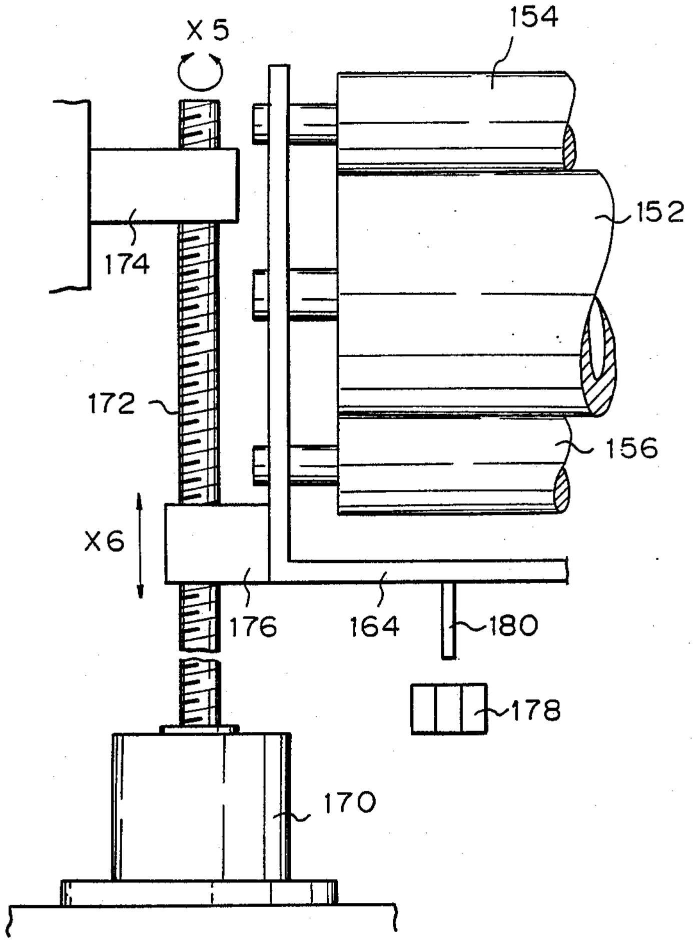
FIG. 15B is an enlarged side elevation as viewed in a direction XVB—XVB of FIG. 15A.

Referring to FIGS. 15A and 15B, a first embodiment of the curl correcting device is shown and generally designated by the reference numeral 140. While the device 140 is usually located downstream of the curl sensing device 60 with respect to the direction of paper transport, it may of course be located in any desired position on the paper transport path to uncurl a paper at that position. The paper 12 is transported in a direction indicated by an arrow X4 in FIG. 15A. A pair of rollers 142 and 144 and another pair of rollers 146 and 148 are positioned at the inlet side and the outside side of the paper transport path. A pawl 150 for deflecting the paper 12 is located downstream of the rollers 142 and 144 while rollers 152, 154 and 156 are located downstream of the pawl 150. The roller 152 is held in contact with the rollers 154 and 156 so that the rollers 154 and 156 follow the rotation of the roller 152. The intermediate roller 152 is connected to the output shaft of a main motor 162 (see FIG. 16) via two clutches 158 and 160 (FIG. 16) and selectively rotatable in a clockwise and a counterclockwise direction. The rollers 152, 154 and 156 are supported by a support member 164 integrally with each other. Driven by a solenoid 166 (FIG. 16), the pawl 150 is rotatable about a support shaft 150*a*.

When the tip 150*b* of the pawl 150 is held in a lowered position, the paper 12 is driven by the rollers 142 and 144 toward the rollers 152 and 154 above the pawl 150. When the tip 150*b* of the pawl 150 is held in a raised position, the paper 12 is driven toward the rollers 152 and 156 below the pawl 150. The paper 12 entered the curl correcting device is moved away from the roller 152 while being deformed along the periphery of the roller 152. A heater 168 (FIG. 16) is disposed in the roller 152 to heat the surface of the roller 152 to a high temperature. Therefore, the paper 12 is subjected to both mechanical and thermal stresses at the roller 152. The direction of such stresses depends upon the position of the paper 12 relative to the roller 152, i.e., whether it is located above or below the roller 152. Further, the rollers 152, 154 and 156 are selectively movable up and down as viewed in FIG. 15A. As the roller 152 is moved up or down, the area of contact of the roller 152 with the paper 12 is changed and, hence, the magnitude of stresses acting on the paper 12 varies with the position of the roller 152. In practice, various kinds of paper guides are located in the vicinity of the various rollers mentioned above so as to guide the paper 12 to a predetermined transport path, although not shown in FIG. 15A.

As shown in FIG. 15B, an electric motor 170 such as a stepping motor is located adjacent to one end of the support member 164. A lead screw 172 is connected to the output shaft of the motor 170. One end of the lead screw 172 is rotatably supported by a support member 174 which is rigidly connected to a frame. A lug 176 extends from one end of the support member 164 and is formed with a through threaded bore. The lead screw 172 is passed through the through bore of the lug 176 and held in mesh with a screw-thread of the latter. When the motor 170 is driven, the lead screw 172 is rotated in a direction of an arrow X5 to in turn move the support member 164 up or down as indicated by an arrow X6. A sensor 178 is provided for sensing a lug 180 which also so extends from the support member 164 as to define a reference position of the support member 164.

Figure 16:
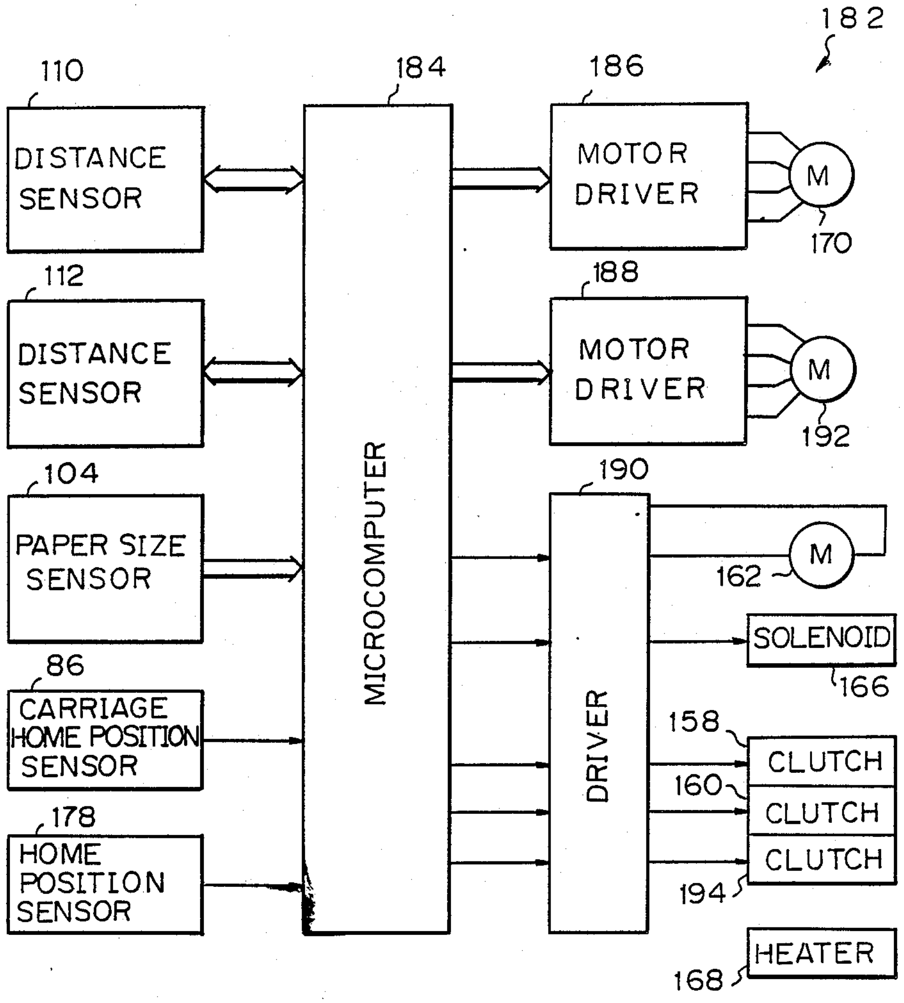
FIG. 16 is a schematic block diagram showing a control system associated with the curl correcting device of FIGS. 15A and 15B.

Referring to FIG. 16, an electric circuit associated with a controller 182 of the curl correcting device 140 is schematically shown. The controller 182 includes a microcomputer 184. Connected to the ports of the microcomputer 184 are the distance sensor units 110 and 112, sensors 104, 86 and 178, motor drivers 186 and 188, and a driver 190. The stepping motor 170 and a stepping motor 192 are connected to the output terminal of the motor drivers 186 and 188, respectively. Connected to the output terminal of the driver 190 are the main motor 162 (DC motor), solenoid 166, and clutches 158 and 160 as well as a clutch 194. The solenoid 166 is adapted to drive the pawl 150. The clutches 158 and 160 are selectively coupled and uncoupled to control the roller 152 and main motor 162. Further, the clutch 194 is coupled and uncoupled to control the main motor 162 and various transport rollers.

Figure 17A:
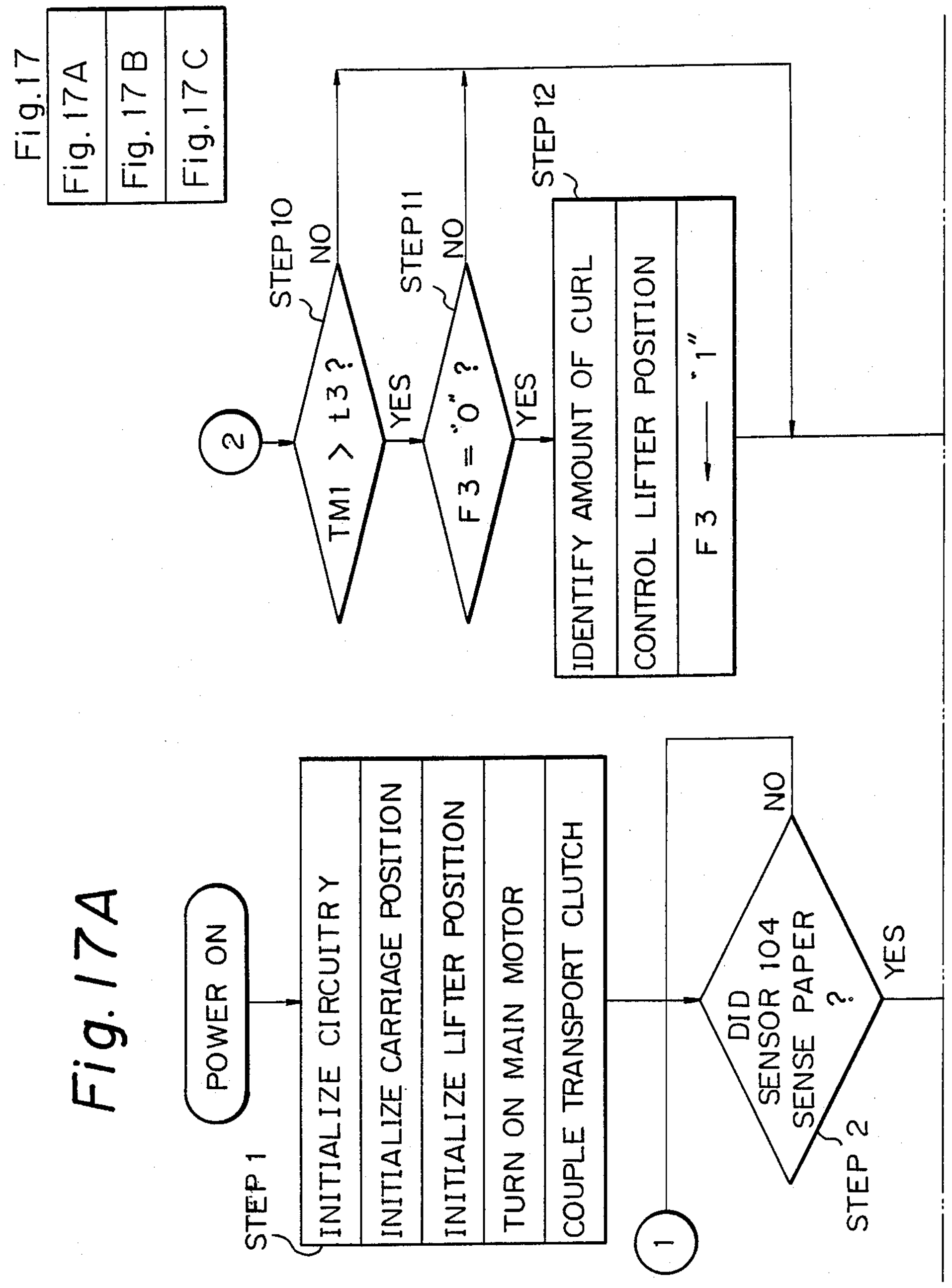
FIG. 17 is a flowchart associated with the operation of a controller (CPU) which is shown in FIG. 16.
Figure 17B:
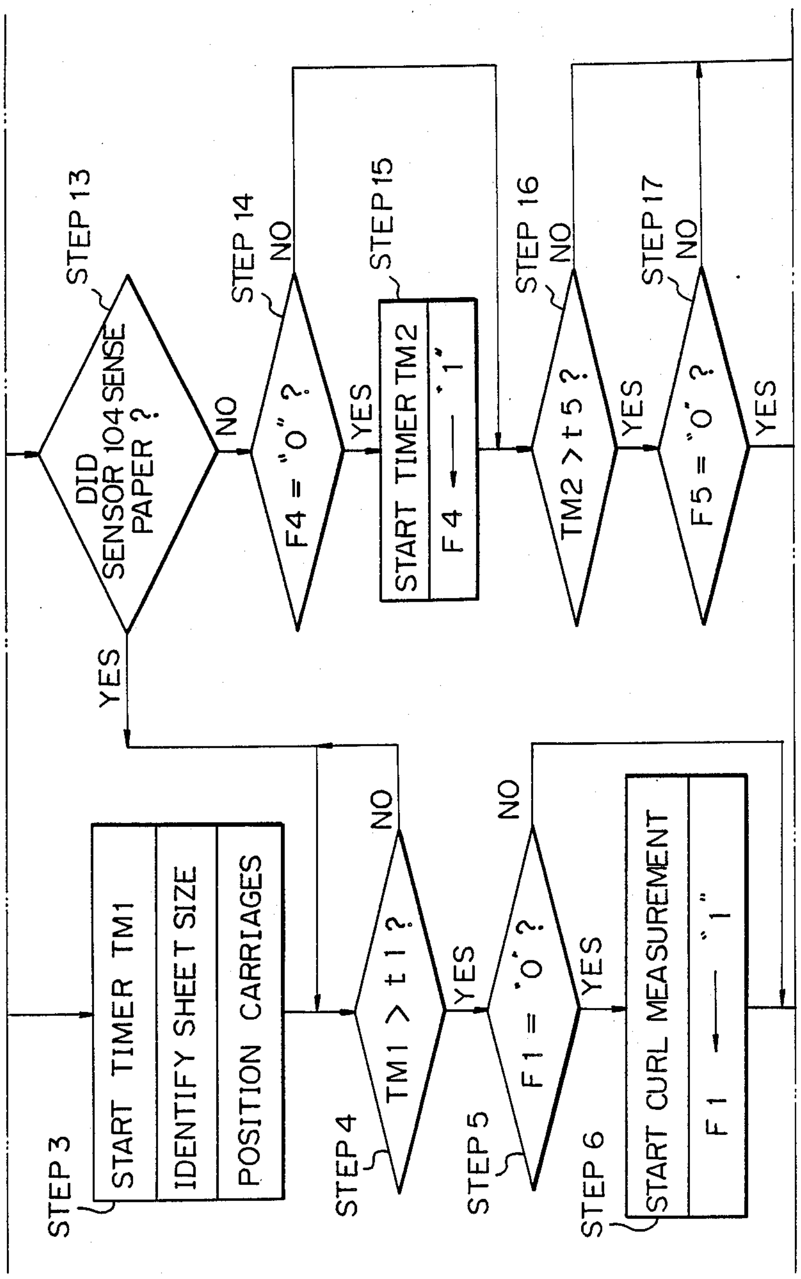
Figure 17C:
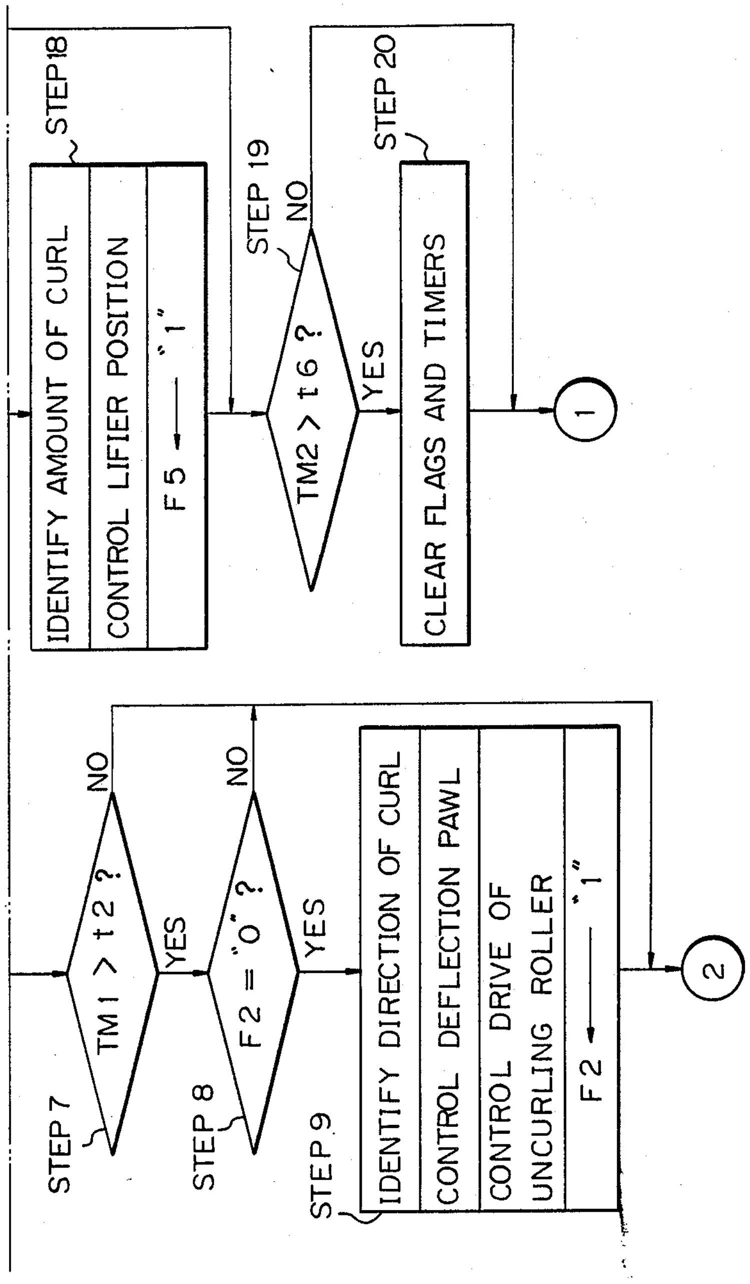

The operation of the microcomputer 184 will be described with reference to FIG. 17. When a power switch of the copier is turned on, the microcomputer 184 performs initialization in a STEP 1. Specifically, the microcomputer 184 initializes itself (i.e. initializes ports, clears a memory, and initializes interruption and other operation modes), then positions the carriages 70 and 72 at their predetermined reference positions, then positions the support member 164 at its predetermined reference position, and then energizes the main motor 162 while coupling the clutch 194 which is associated with the transport rollers. After the initialization, the microcomputer 184 waits until the sensor 104 senses the leading edge of a paper (STEP 2). Since the sensor 104 has four sensing elements **104*a*, 104*b*, 104*c* and 104*d* as previously stated, the microcomputer 184 decides that the sensor 104 has sensed a paper in response to a change of the output of any of the four sensing elements from a paper absence state to a paper presence state. When the sensor 104 senses the leading edge of a paper, the microcomputer 184 starts a timer TM1. By comparing four outputs of the sensor 104 with reference data, the microcomputer 184 identifies the size of the paper 12 as measured in the widthwise direction and, based on the size, positions the carriages 70 and 72. Specifically, the microcomputer 184 drives the stepping motor 170 such that the sensing axes of the distance sensors 110 and 112 are individually located at predetermined positions (inward) as measured from the opposite edges of the paper 12; the stepping motor 170 is driven by steps which are associated with the distance between the position before the drive and the position after the drive. Those new positions of the distance sensor units 110 and 112, i.e., those of the carriages 70 and 72** are stored to facilitate the next positioning control.

Thereupon, the microcomputer 184 waits until the timer TM1 reaches a predetermined time t1 (STEP 4). The time t1 is dependent upon the distance between the sensor 104 and those of the sensing axes of the distance sensor units 110 and 112 as well as upon the transport speed of a paper 12, and it corresponds to an interval between the time when the sensor senses the leading edge a paper 12 and the time when that paper 12 reaches the sensing axes of the distance sensor units 110 and 112. Then, the microcomputer 184 checks the state of a flag F1 (STEP 5). Since the flag F1 is (logical) ZERO at first, the microcomputer 184 advances to a STEP 6 for starting the measurement of a curl, setting the flag F1 to (logical) ONE. Upon the sart of curl measurement, the microcomputer 184 executes interrupt processing, not shown, every time a predetermined period expires. By the interrupt processing, distance data outputted by the distance sensor units 110 and 112 are fed to the microcomputer 184 to be stored in a store which is built in the microcomputer 184. Subsequently, the microcomputer 184 compares the timer TM1 with a certain value which corresponds to a time t2 (STEP 7). This time t2 is later than the time t1 by a predetermined period of time which is necessary for measured data sufficient to determine the direction of curl to be obtained after the start of curl measurement. As the timer TM1 exceeds the time t2, the microcomputer 184 checks the state of a flag F2 (STEP 8). Since the flag F2 is ZERO at first, the program advances to a STEP 9.

At the STEP 9, the microcomputer 184 determines the direction of curl first. Specifically, the microcomputer 184 produces a difference between a mean value of distance data outputted by the distance sensor unit 110 and 112 and sampled during the interval between the times t1 and t2 and distance data which is associated with a zero curl condition, and then determines the positive/negative sign of the difference to see if the leading edge of the paper 12 is curled upward or downward. Based on the result of decision, the microcomputer 184 controls the solenoid 166 which is associated with the pawl 150, controls the clutchs 158 and 160 which determine the direction of rotation of the uncurling roller 152, and sets the flag F2 to ONE. It is to be noted that the microcomputer 184 checks each of the previously mentioned sampled distance data and, if it is excessively great, neglects it deciding that it is not related to the paper 12.

Subsequently, the microcomputer 184 compares the timer TM1 with a value which corresponds to a time t3 (STEP 10). The time t3 is later than the time t1 by a predetermined period of time necessary for sufficient data for the accurate measurement of curl to be obtained after the start of curl measurement ($t1>t2>t3$). As the timer TM1 exceeds the time t3, the microcomputer 184 advances to a STEP 12 because the flag F3 is ZERO at first. In the STEP 12, the microcomputer 184 determines the amount of curl by an arithmetic operation, i.e., by applying a predetermined equation to those data which have been sampled during the interval between the times t1 and t3. Then, based on the amount of curl, the microcomputer 184 adjusts the position (level) of the rollers 152, 154 and 156. Specifically, the microcomputer 184 determines a target roller position associated with the measured amount of curl by referencing a memory table which stores a relationship between the amount of curl and the target roller position, and then drives stepping motor 192 in a predetermined direction by a particular number of steps which is associated with the distance between the instantaneous roller position and the target roller position. As a result, the uncurling level of the curl correcting device is determined on the basis of the actual amount of curl. At this instant, the flag F3 is set to ONE.

Then, the microcomputer 184 checks the output signals of the sensor 104 to see if the sensor 104 has sensed the trailing edge of the paper 12. When the outputs of all the sensing elements **104*a* to 104*d* of the sensory 104 are representative of the absence of a paper 12, the microcomputer 184 decides that the sensor 104 has sensed the trailing edge of the paper 12. If the sensor 104 has not sensed it, the program returns to the STEP 4. If the result of decision in the STEP 4 is positive, the program advances to a STEP 14 in which the state of a flag F4 is checked. Since the flat F4 is ZERO at first, a STEP 15 is executed in which the microcomputer 184** starts a timer TM2 and sets the flag F4 to ONE.

The microcomputer 184 then compares the timer TM2 with a value which corresponds to a time t5 (STEP 16). The time t5 is representative of a period of time necessary for a paper 12 to be moved into alignment with the sensing axes of the distance sensor units 110 and 112 after its trailing edge has been sensed by the sensor 104. As the timer TM2 exceeds the time t5, a STEP 17 is executed for checking the state of a flag F5. Sine the flag F5 is initially ZERO, the STEP 17 is followed by a STEP 18. In the STEP 18, the final amount of curl is calculated by using all the sampled distance data associated with the leading edge to the trailing edge of the paper 12, the amount of curl produced by the STEP 12 being corrected by the final amount of curl. The position (level) of the roller 152 is finely adjusted in matching relation to the corrected amount of curl. The flag F5 is set to ONE. Next, the microcomputer 184 compares the timer TM2 with a time t6 (STEP 19). The t6 is representative of an interval between the time when the sensor 104 senses the trailing edge of a paper 12 and the time when the trailing edge of that paper 12 moves out of the curl correcting device. As the timer TM2 exceeds the time t6, all the flags and timers are cleared (STEP 20).

In the illustrative embodiment, the sensor 104 is implemented by a number of sensing elements 104*a* to 104*d* for identifying the size of a paper 12. Alternatively, in the case that the curl correcting device 140 is used as a unit of, for example, a part of a copier of the type having a plurality of paper feeders 16*a*, 16*b* and 16*c* as shown in FIG. 1, the distance between the distance sensor units 110 and 112 may be adjusted in response to a command from a main control unit which is capable of grasping the sizes of papers which are loaded in the individual paper feeders as well as which paper feeder has been selected. In such a case, the sensor 104 can be implemented by a single sensing element. Further, the sensor unit 104 may be practically omitted if the main control unit is capable of grasping even the position of a paper.

[II] Second Embodiment

As stated earlier, papers for use with a copier are wrapped in an elaborated manner for maintaining a water content of about 6%. However, since the papers are of course unwrapped before they are loaded in a paper feeder of a copier, particularly a paper feed tray, the water content changes with the relative humidity of the atmosphere causing the papers to easily curl. The curl correcting device of this embodiment is implemented as a humidity adjusting device which dehumidifies and/or humidifies papers. While the curl sensing device 60 which may be used with this embodiment of the curl correcting device is usually located on the paper transport path downstream of the fixing station 20, it may of course be positioned upstream of papers which are stacked on a paper feed tray.

Figure 18:
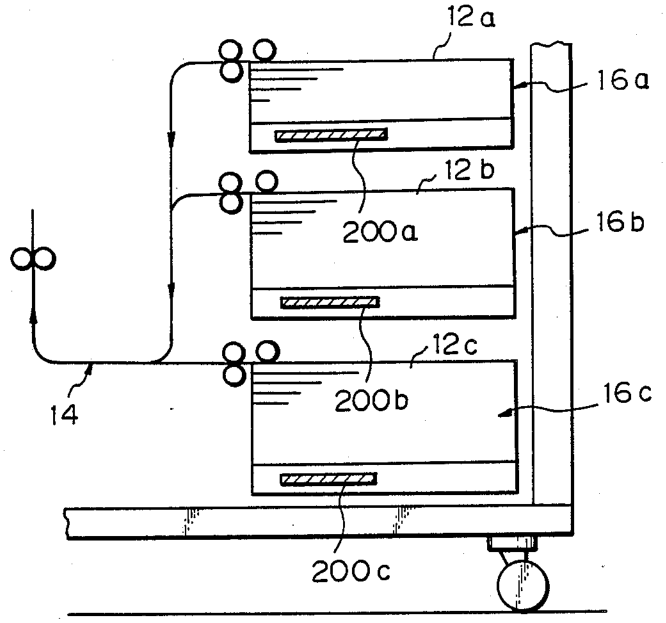
FIG. 18 is a side elevation of a humidity adjusting device which is representative of a second embodiment of the curl correcting device and associated with a paper feeder.
Figure 19:
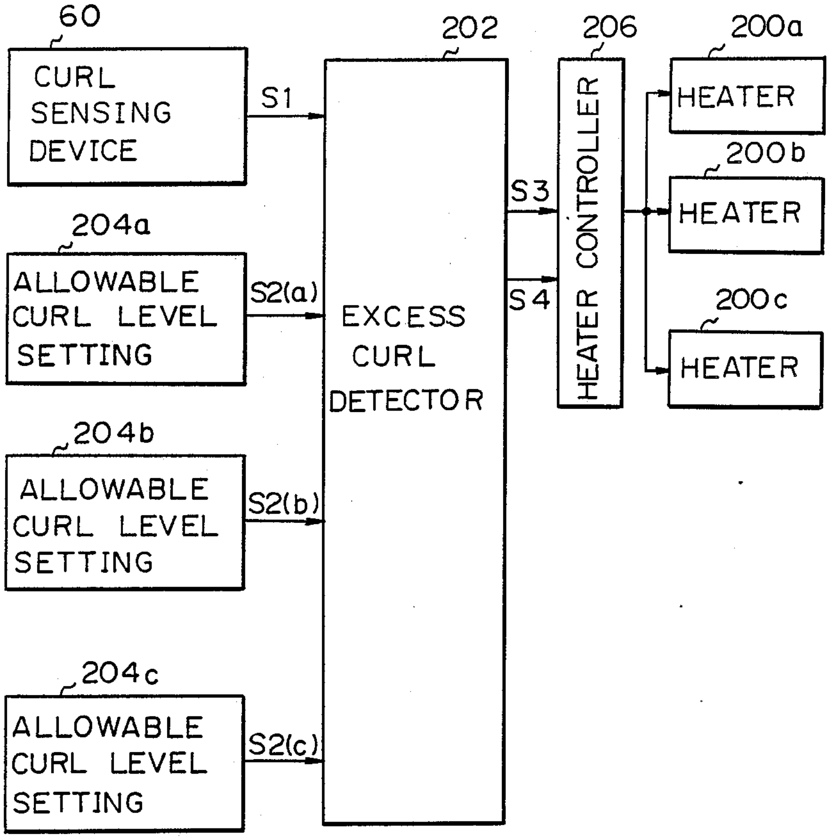
FIG. 19 is a schematic block diagram showing a control system which is associated with the humidity adjusting device of FIG. 18.

Referring to FIG. 18, dehumidifiers 200*a*, 200*b* and 200*c* which constitute the humidity adjusting device are respectively positioned at the bottom of the paper feed trays 16*a*, 16*b* and 16*c* of the copier 10. Each of the dehumidifiers 200*a* to 200*c* is constituted by a heater and controlled by a control system which is shown in FIG. 19. As shown in FIG. 19, a signal $S_1$ representative of the amount and direction of curl and outputted by the curl detector 60 is fed to an excess curl detector 202. Also fed to the excess curl detector 202 are signals $S_2$(a), $S_2$(b) and $S_2$(c) which are respectively generated by allowable curl level setting blocks 204*a*, 204*b* and 204*c* which are in turn associated with the paper feed trays 16*a*, 16*b* and 16*c*, respectively. Of course, when the number of paper feed trays is n, n allowable curl level setting blocks will be installed. In response to the amount and direction of curl, the allowable curl level and other data, the excess curl detector 202 delivers an excess curl signal $S_3$ and a curl direction signal $S_4$ to a heater controller 206 which is adapted to on-off control the heaters 200*a* to 200*c*.

Figure 20:
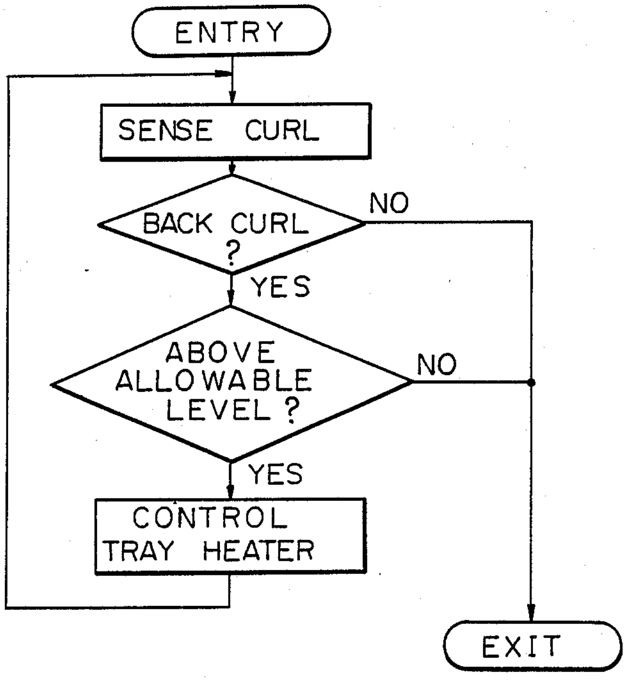
FIG. 20 is a flowchart associated with the operation of the control system as shown in FIG. 19.

For example, as shown in FIG. 20, when the curl is a face curl or when the curl is a back curl but does not exceed a predetermined level, the heater controller 206 maintains the heaters 200 deenergized. When the curl is a back curl which is above the predetermined level, the heater controller 206 energizes the heaters 200 to lower the relative humidity. As the relatively humidity within the trays 16 and therefore the water content of the papers 12 is lowered due to repeated copying operation until the amount of curl sensed after fixing becomes lower than a predetermined level, the heater controller 200 turns off the heaters 200.

In the case that the paper feeder has a plurality of trays such as the trays 16*a* to 16*c* of the copier 10 of FIG. 1, the water content upon which the amount of curl depends differs from one tray to another because papers to be loaded in the individual trays may have been exposed for different periods of time and/or subjected to different humidity while exposed and because the moisture absorption may differ from one kind of papers to another. Even if all the papers share the same water content, the amount of curl depends upon the property of the papers. In the light of this, the allowable curl level setting blocks 204*a*, 204*b* and 204*c* which are respectively associated with the trays 16*a*, 16*b* and 16*c* are individually adjustable with respect to the allowable curl level. Hence, the heaters 200*a*, 200*b* and 200*c* are controlled independently of each other. This kind of adjustment is indispensable even if all the papers share the same property, because the amount of curl may be scattered among equipment.

While the illustrative embodiment uses heaters as dehumidifiers, they may of course be replaced with any other type of dehumidifiers which are known in the art.

Figure 21:
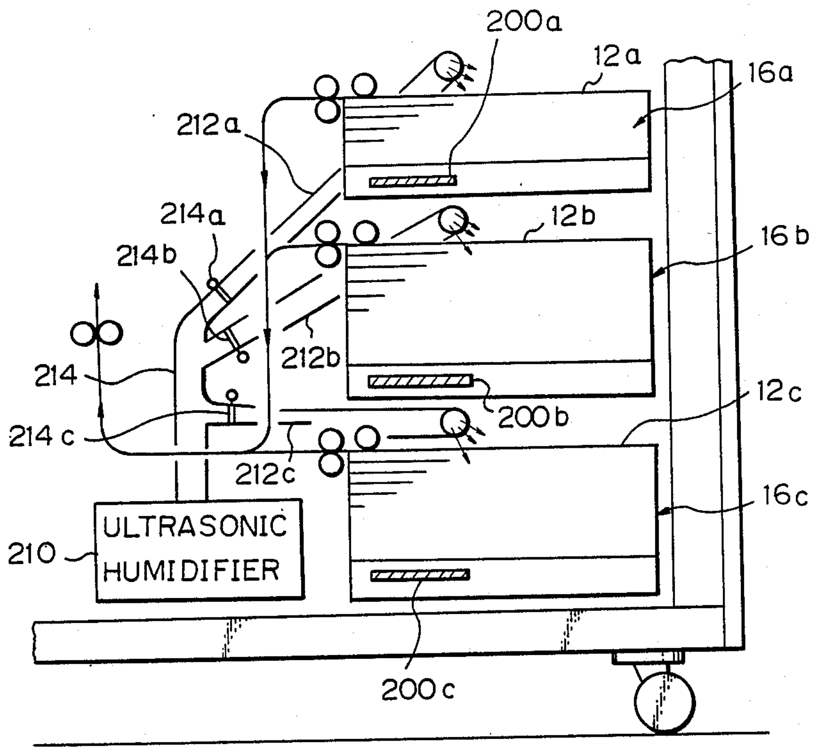
FIG. 21 is a side elevation showing a modification to the second embodiment.
Figure 22:
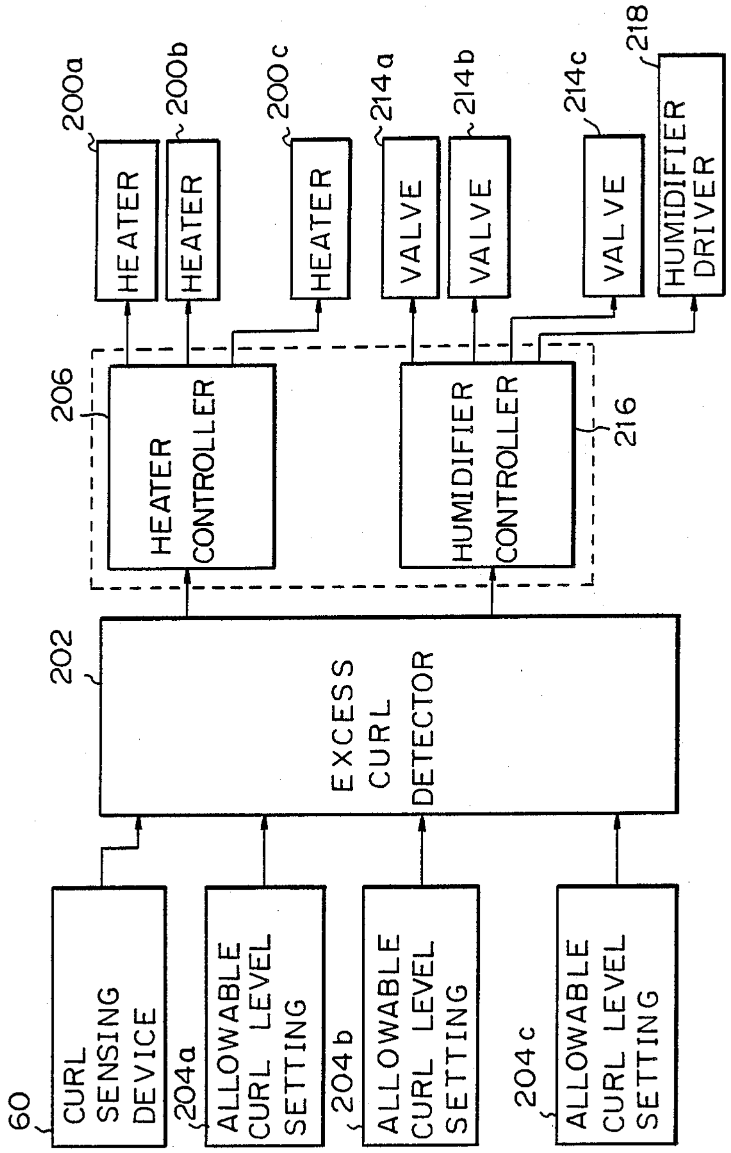
FIG. 22 is a schematic block diagram showing a control system in accordance with the modification of FIG. 21.
Figure 23:
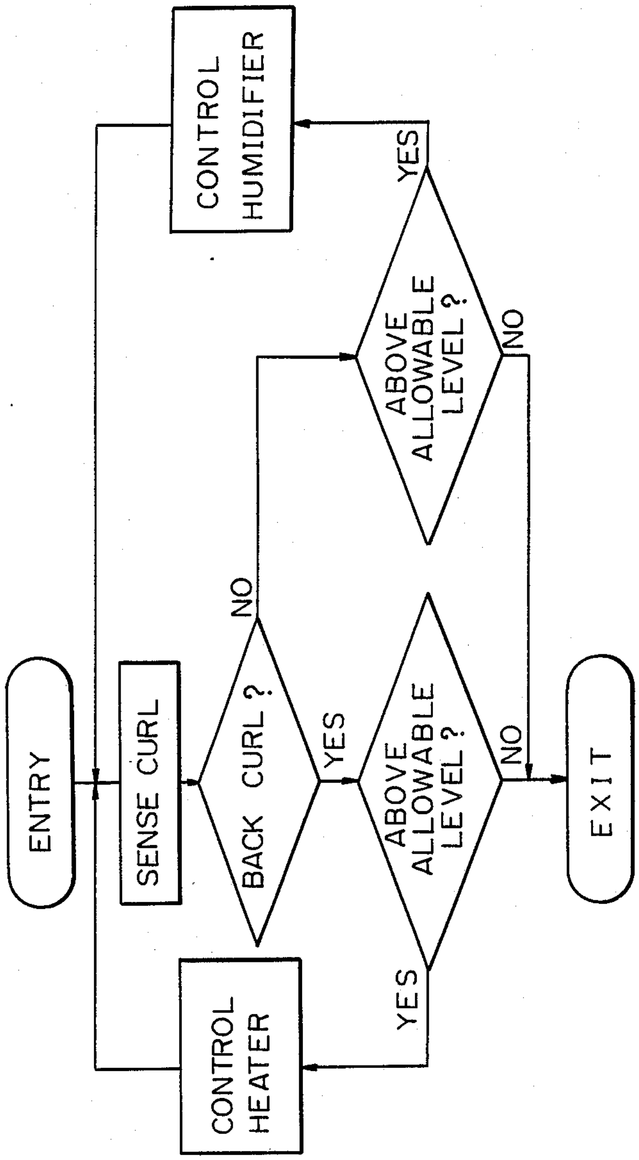
FIG. 23 is a flowchart associated with the operation of the control system as shown in FIG. 22.

Referring to FIGS. 21 to 23, a modification to the second embodiment is shown. In the modification, the humidity adjusting device is constituted by the dehumidifiers (heaters) 200*a*, 200*b* and 200*c* which are respectively positioned at the bottom of the trays 16*a*, 16*b* and 16*c*, and a humidifying assembly 208 adapted to humidify the papers 12*a* to 12*c* which are respectively loaded in the trays 16*a*, 16*b* and 16*c* . The humidifying assembly 208 comprises an ultrasonic humidifier 210, ducts 212*a*, 212*b* and 212*c* providing communication between the humidifier 210 and the trays 16*a*, 16*b* and 16*c* for spraying humid air from the humidifier 210 toward the papers 12*a*, 12*b* and 12*c*, and valves 214*a*, 214*b* and 214*c* respectively associated with the ducts 212*a*, 212*b* and 212*c* for controlling the supply of humid air through the ducts to the papers 12*a*, 12*b* and 12*c*. The humidifying assembly 208 is provided because papers are apt to curl when their water content is noticeably lowered due to drying, i.e., because it is necessary to humidify those papers whose water content lies in a relatively low range as well as to dehumidify those papers whose water content lies in a relatively high range. Both the face curl and the back curl ascribable to the water content effect the various processing units which are provided along the paper transport path. For example, assuming that papers with face curls are stacked on the two-side tray 46 of the copier 10 in a two-side copy mode, they are apt to ride on the side walls of the tray 46 because they are upwardly convex and, in the worst case, the succeeding paper slips under the preceding paper.

A specific construction of a control system for controlling the humidifying assembly 208 and the dehumidifiers (heaters) 200*a*, 200*b* and 200*c* is shown in FIG. 22.

In FIG. 22, a humidifier controller 216 is provided in addition to the structural elements of the system of FIG. 19. The humidifier controller 216 is connected to the excess curl detector 202 and controls the valves 214a, 214b and 214c. Connected to the humidifier controller 216 is a humidifier driver 218. An exemplary operation of the control system is shown in FIG. 23. As shown, when a curl detected is a back curl which is above a predetermined level, the heaters 200 are turned on. When the relative humidity is lowered until the curl decreases beyond the predetermined level, the heaters 200 are turned off. When a curl is a face curl which is above a predetermined level, the humidifying assembly 208 is activated; as the relative humidify is elevated until the curl decreases beyond the predetermined level, the assembly 208 is deactivated.

While in the modification shown and described a single humidifier 210 is shared by a plurality of trays 16a, 16b and 16c, each of the trays may be provided with an exclusive humidifier 210.

As described above, in accordance with any of the second embodiment and its modification, papers are dehumidified by sensing the amount of curl or, alternatively, they are selectively dehumidified and humidified based on the direction of curl. This allow the relative humidity of the ambience around paper feed trays to be controlled to a predetermined value, thereby eliminating curls above a certain level. Since a plurality of paper feed trays can be dehumidified and humidified independently of each other, desirable curl control is achievable with all the trays which may be different in property from each other. Furthermore, the allowable curl level is adjustable on a tray bais to compensate for any possible scattering, and both a face curl and a back curl are controlled with accuracy.

[III] Third Embodiment

In this particular embodiment, the curl correcting device is implemented as a device for adjusting the position of a guide mechanism which is adapted to guide a paper being transported along the paper transport path to the transfer station. More specifically, the device is constructed to adjust the angle of a guide plate which forms a part of the guide mechanism relative to the surface of a photoconductive element, i.e., the entry angle of a paper, and the distance between the photoconductive element and the guide plate in matching relation to the amount and direction of curl. While the curl sensing device 60 which may be used with this embodiment is usually located on the transport path downstream of the fixing station 20 of the copier 10, it may of course be located upstream of the transfer station 18.

Figure 24:
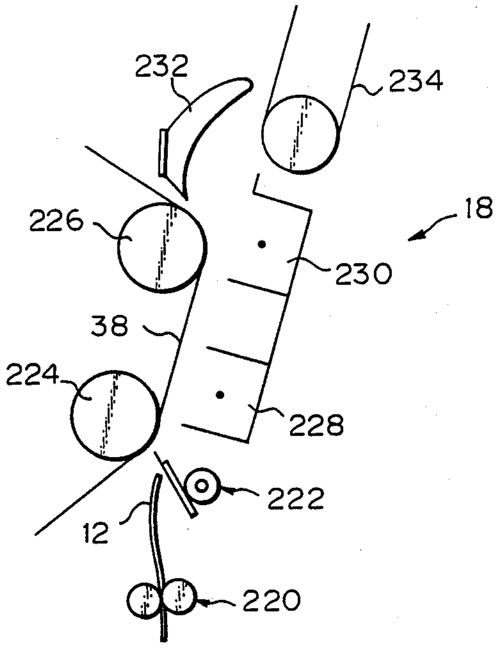
FIG. 24 is a sectional side elevation showing a transfer station which is included in the copier of FIG. 1.

FIG. 24 shows a specific construction of the transfer station 18. As shown, a paper 12 fed from a register roller pair 220 is guided by a guide mechanism 222 into contact with the photoconductive element 38. This element 38 is guided by guide rollers 224 and 226 to move through the transfer station 18. After the paper 12 has been charged by a transfer charger 228, a toner image is transferred from the photoconductive element 38 to the paper 12. Then the paper 12 is discharged by a separation charger 230, separated by a pawl 232 from the photoconductive element 38, and fed to the fixing station 20 of FIG. 1 by a belt 234.

Figure 25:
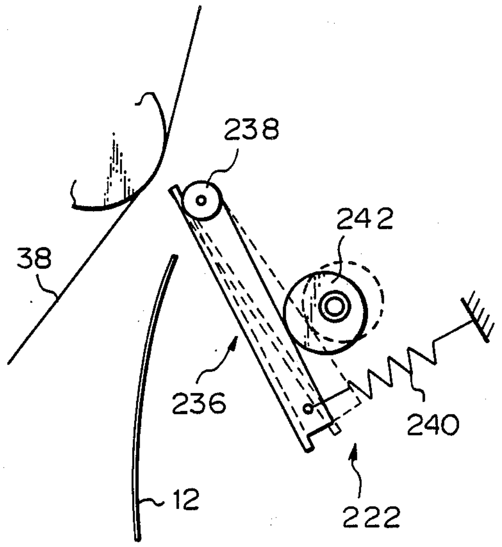
FIGS. 25 and 26 are sectional side elevations showing a specific construction of a guide mechanism positioning device which is representative of a third embodiment of the curl correcting device.
Figure 26:
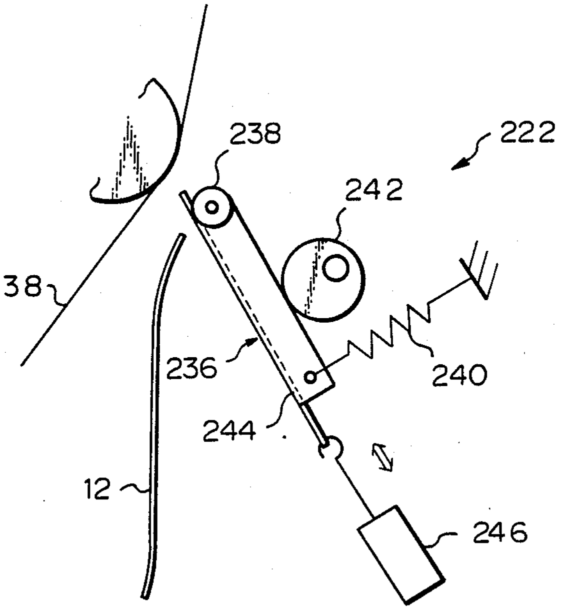

Referring to FIG. 25, a specific construction of the guide mechanism 222 is shown. As shown, the mechanism 222 is made up of a guide plate 236, a pivot shaft 238, a spring 240, and an eccentric cam 242. The guide plate 236 is constantly pulled by the spring 240 toward the eccentric cam 242. As the cam 242 is rotated, the guide plate 236 is moved about the pivot shaft 238 and thereby adjusted in angle relative to the surface of the photoconductive element 38. As shown in FIG. 26, the guide mechanism 222 further includes a flat slider 244 which constitutes a paper guide surface of the guide plate 236. Driven by a solenoid 246 which is engaged with a lower portion of the slider 244, the slider 244 is movable as indicated by an arrow in FIG. 26 to adjust the distance between the tip of the guide plate 236 and the surface of the photoconductive element 38. In this particular embodiment, the guide plate 236 is segmented into a plurality of pieces along the width of the paper 12 although it may be constituted by a single piece. Needless to mention, the guide mechanism 222 is controlled in response to an amount of curl which is sensed by the previously described curl sensing device 60. Specifically, the cam 242 and solenoid 246 are actuated in association with the amount of curl so that the positional relationship between the guide plate 239 and the photoconductive element 38, i.e., angle and distance are adjusted. The position of the guide plate 239 may be determined relative to the photoconductive element 38 as follows.

Figure 27A:
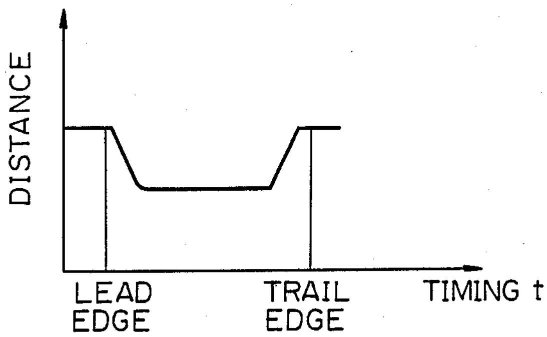
FIGS. 27A and 27B are plots each showing the distance between a photoconductive element and a guide plate of the guide mechanism of FIGS. 25 and 26 with respect to an intended direction of paper transfer.
Figure 27B:
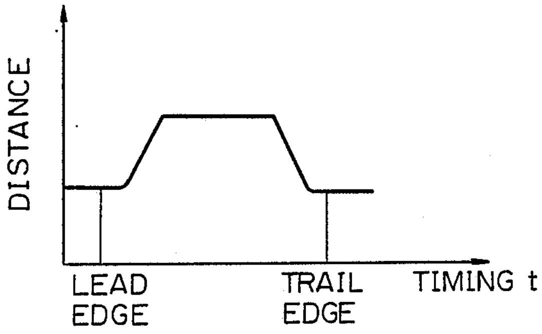

For example, assume that the paper 12 is curled in the direction of paper transport and toward the photoconductive element 38, as shown in FIG. 7A. In this condition, the leading and trailing edges of the paper 12 are directed toward the photoconductive element 38. Then, since the paper 12 itself is directed toward the element 38, it is needless to noticeably incline the guide plate 236 of the guide mechanism 222, i.e., the angular position indicated by a solid line in FIG. 25 by way of example suffices. On the other hand, since the intermediate portion of the paper 12 is remote from the photoconductive element 38, the distance between the tip of the guide plate 236 and the element 38 is increased for the leading and trailing edges of the paper 12 and decreased for the intermediate portion, as shown in FIG. 27A. Assume that the paper 12 is curled in the other direction away from the photoconductive element 38. Then, the guide plate 236 is actuated in the opposite manner. Specifically, the angle of the guide plate 236 is increased as indicated by a dotted line in FIG. 25 so that, as shown in FIG. 27B, the distance between the tip of the guide plate 236 and the element 38 is decreased for the leading and trailing edges of the paper 12 and increased for the intermediate portion.

Next, assume that the paper 12 is curled along its sides in the direction of transport and toward the photoconductive element 38. In this case, since the intermediate portion of the paper 12 is remote from the element 38, intermediate segments of the guide plate 236 are increased in angle and decreased in distance than the others so that they may contact the element 38 earlier than the others. When the side curl is directed away from the element 38, those segments of the guide plate 238 which are located at opposite side are increased in angle than the others.

Figure 28:
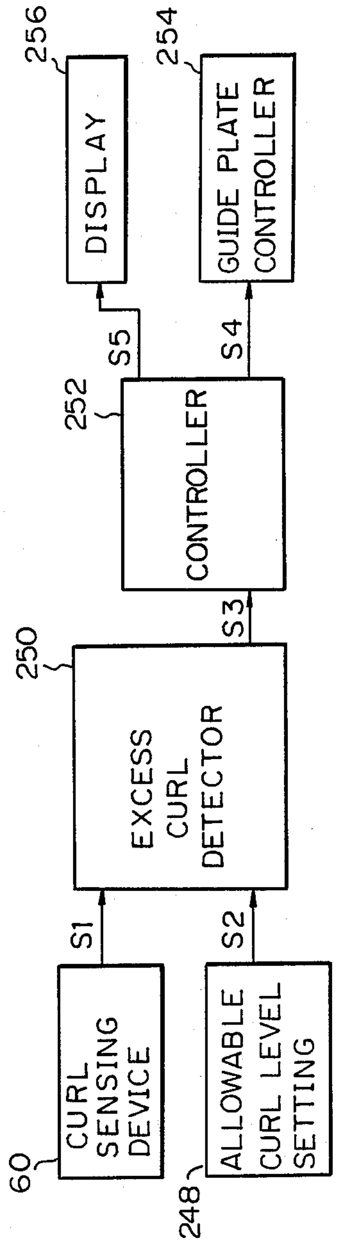
FIG. 28 is a schematic block diagram showing a control system associated with the positioning device of FIGS. 25 and 26.

FIG. 28 shows a specific construction of a control system for controlling the eccentric cam 242 and solenoid 246 of the guide mechanism 222. In FIG. 2, an allowable curl level setting block 248 sets an allowable curl level for controlling the angle or the distance of the guide plate 236. An excess curl detector 250 which includes a comparator compares an actual amount of curl ($S_1$) as sensed by the curl sensing device 60 with a particular reference value ($S_2$) as set up by the block 248, applying a signal $S_3$ representative of the difference to a controller 252. If the signal $S_3$ shows that the actual curl is above the reference or allowable curl, the controller 252 delivers a control signal $S_4$ to a guide plate driver 254 for controlling the position of the guide plate 236. At the same time, the controller 252 applies a signal $S_5$ to a display 256 to display the amount of curl and the like. In this manner, the control system adjusts the angle and distance of the guide plate 236 as measured from the photoconductive element 38 on the basis of the amount and direction of curl. Consequently, close contact of the paper 12 with the photoconductive element 38 and therefore stable image transfer is guaranteed.

[IV] Fourth Embodiment

When a paper being transported along a predetermined path is curled, it often occurs that an image transferred to such a paper at a transfer station is locally missed out. In a fourth embodiment of the present invention, the curl correcting device is implemented as a device for controlling a current which is fed to the transfer station, particularly the transfer charger, on the basis of the amount of curl. The curl sensing device 60 usable with this embodiment is usually located on the transport path upstream of the transfer station 18 of the copier 10.

Figure 29:
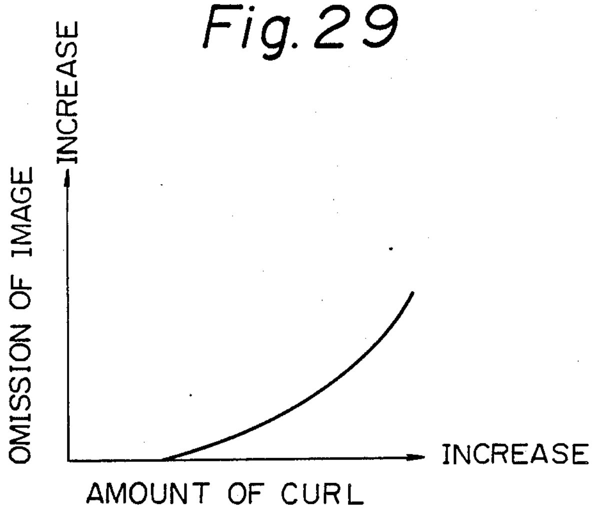
FIG. 29 is a plot showing a relationship between the amount of curl of a paper and the local omission of an image.
Figure 30:
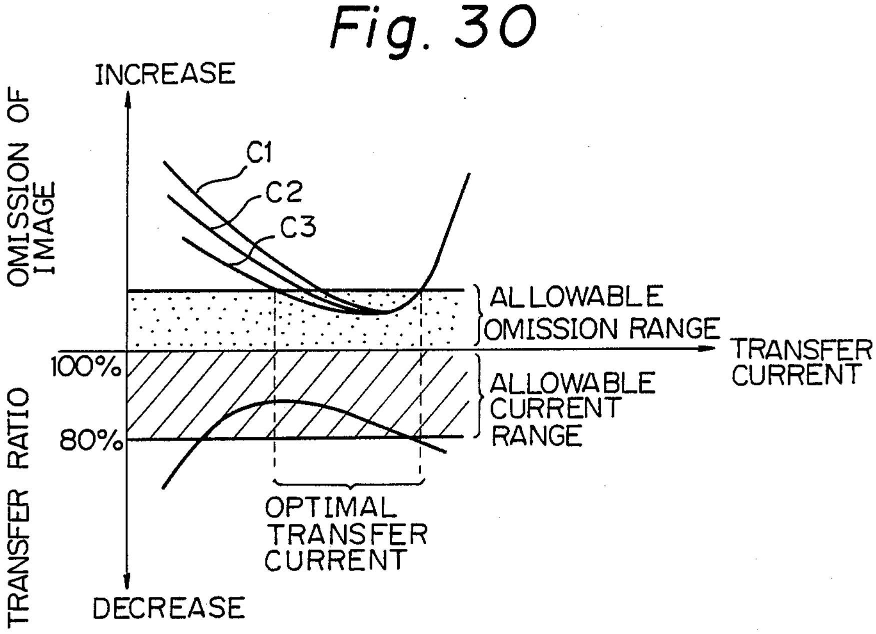
FIG. 30 is a plot showing a relationship between the transfer current and the local omission of an image with respect to papers which are curled to various degrees as well as a relationship between the transfer current and the transfer ratio.

FIG. 29 shows a qualitative relationship between the amount of curl of a paper and the local omission of an image transferred to a paper. As shown, the local omission of an image is more aggravated as the amount of curl increases. FIG. 30 shows a relationship between the current applied to the transfer charger and the local omission of an image and a relationship between the same current and the transfer ratio, which were determined with papers each having a different amount of curl. In FIG. 30, the conditions of images transferred to papers are classified into a plurality of ranks on the basis of visual sensation, and one of those ranks which is generally acceptable is used for a reference. Curves C1, C2 and C3 of FIG. 30 are representative of some examples of the amount of curl which varies with the ambient conditions, the kind of papers, etc. The words "transfer ratio" should be understood to mean a ratio of the amount of toner transferred to a paper to the amount of toner deposited on a photoconductive element before image transfer, a transfer ratio of 80% being adopted as a border. Further, the words "optimal transfer current" shown in FIG. 30 refers to a current associated with the transfer ratio which is obtainable with a non-curled paper. FIG. 3 indicates that to confine the transfer condition to the allowable range with respect to the omission of an image the current has to be controlled within the range in which the transfer ratio remains above 80%, although such a current is deviated from an ordinary optimal current for image transfer.

Figure 31:
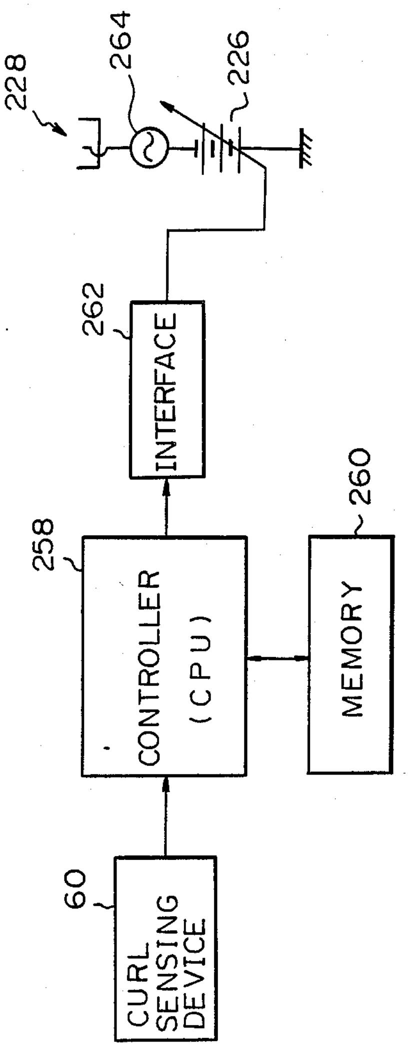
FIG. 31 is a schematic block diagram showing a control system associated with a transfer charger current control device which is representative of a fourth embodiment of the curl correcting device.

A system for so controlling the transfer current is shown in FIG. 31. As shown, the amount of curl of a paper 12 sensed by the curl sensing device 60 is applied to a central processing unit (CPU) of a controller 258. A memory 260 is connected to the controller 258 and stores therein the optimal current range (FIG. 30) associated with the allowable image omission range. In this configuration, the controller 258 selects a current which is associated with a particular amount of curl sensed. Then, the controller 258 changes the bias voltage to be applied to the transfer charger 228 (see FIG. 24) via an interface 262, thereby setting up an optimal current for image transfer. In FIG. 31, the reference numerals 264 and 266 designate an AC power source and a DC bias power source, respectively.

The control system shown in FIG. 31 is effectively applicable to a condition wherein the paper 12 is curled upward or downward at its leading and trailing edges with respect to the direction of transport, as shown in FIG. 7A. Specifically, the transfer current is changed in matching relation to the amount of curl of the leading and trailing edges of the paper 12 and timed to the arrival of the leading edge, intermediate portion and trailing edge of the paper 12 at the transfer station 18. However, the paper 12 is sometimes curled upward or downward along its side edges with respect to the direction of transport (side curl), as shown in FIG. 7B. This kind of curl is readily sensed by the distance sensor units 110 and 112 (FIG. 10) which constitute the curl sensing device 60, and all that is required is applying a different transfer current to the transfer charger 228 for each of the opposite side edges of the paper 12 and the intermediate portion of the same.

Figure 32A:
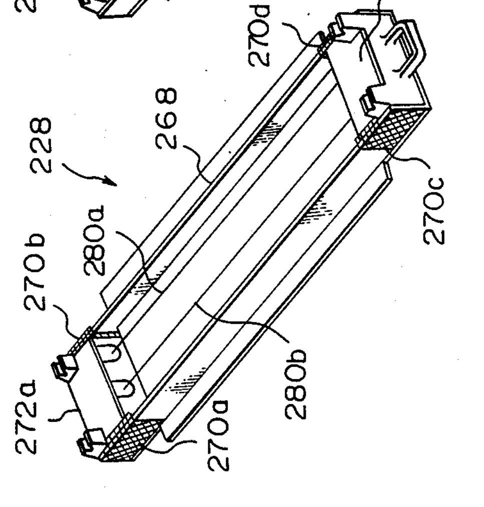
FIGS. 32A to 32C are perspective views each showing in a particular position conductive members which are mounted on the transfer charger to serve as the current control device.
Figure 32B:
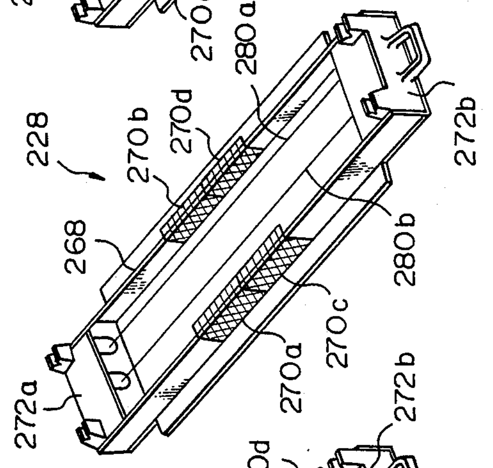
Figure 32C:
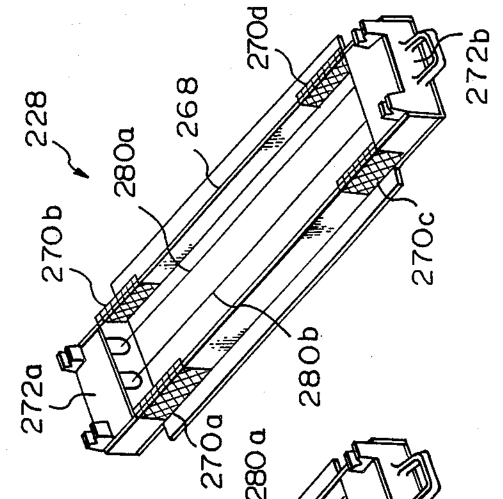
Figure 33:
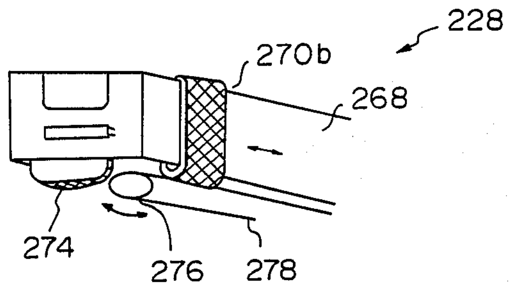
FIG. 33 is a perspective view showing a specific construction of a mechanism for driving the conductive members.

FIGS. 32A to 32C show a specific configuration of the transfer charger 228 in which the arrangement for controlling the transfer current is built. As shown, the transfer charger 228 includes a casing 268 and four conductive members **270*a*, 270*b*, 270*c* and 270*d* which are slidably mounted on the inner walls of the casing 268. Specifically, two conductive members 270*a* and 270*b* are positioned at one end of the casing 268, and the other two 270*c* and 270*d* at the other end. As shown in FIG. 32A, the conductive members 270*a*, 270*b*, 270*c* and 270*d* are usually received in opposite end blocks 272*a* and 272*b* to allow a usual transfer current to flow. When the paper 12 has side curls as sensed by the sensing device 60, the conductive members 270*a* to 270*d* are moved into the transfer region. FIG. 33 shows an exemplary implementation for moving the conductive members 270*a* to 270*d* as stated. In FIG. 33, a motor 274 is mounted on the bottom of the casing 268 and drivably connected by a wire 278 to a pulley 276, the conductive members 270*a* to 270*d* being fixed to the wire 278. When the side curls are directed away from the photoconductive element 38, the conductive members 270*a* to 270*d* are moved to the center of the casing 268, as shown in FIG. 32B. In this condition, the transfer current is decreased at the center and increased at the sides. Conversely, when the side curls are directed toward the photoconductive element 38, the conductive members 270*a* to 270*d* are moved to opposite end portions of the transfer region, as shown in FIG. 32**C. This decreases the transfer current at the sides and increases it at the center.

Why the transfer current is reduced in those positions where the conductive members **270*a* to 270*d* are located as stated above is as follows. In those positions, the distance between the casing 268 and charge wires 280*a* and 280*b* is reduced with the result that a greater proportion of current flows into the casing 268 than into the paper 12**.

Figure 34:
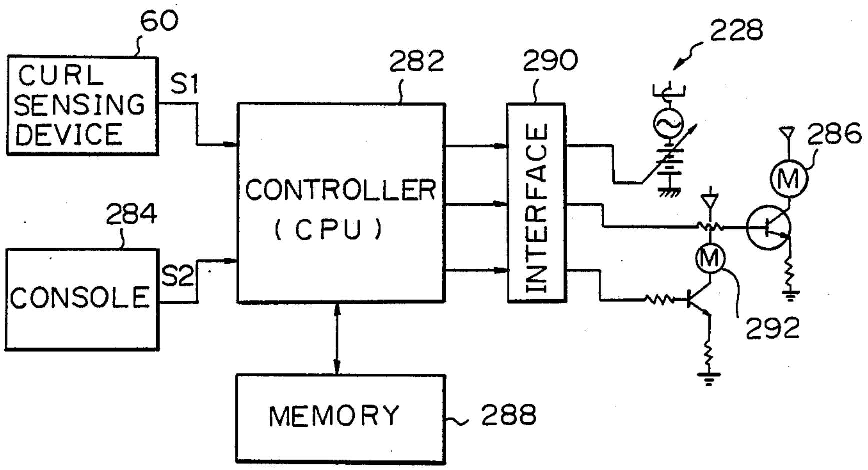
FIG. 34 is a schematic block diagram showing a control system which is associated with the conductive members of FIG. 33.

A control system associated with the arrangement of FIGS. 32A to 32C is shown in FIG. 34. This control system differs from the system of FIG. 31 which is constructed to control the transfer current for correcting curls at the leading and trailing edges of the paper 12. In FIG. 34, a controller 282 which includes a CPU is informed of the size ($S_2$) of the paper 12 which is entered on a console 284. Then, the controller 282 drives a motor 286 so that the distance sensor units 110 and 112 of the curl sensing device 60 are moved to those positions which are associated with the paper size. The amount of curl ($S_1$) sensed by the sensor units 110 and 112 is applied to the CPU 282 which then selects a particular transfer current associated with the amount of curl out of a memory 288, the transfer current being applied to the transfer charger 228. At the same time, the controller 282 drives a motor 292 for moving the conductive members 280*a* to 280*d* as previously stated. It is to be noted that the control which does not rely on the conductive members and the control which relies on them as described above may be effected one at a time or simultaneously, depending upon the condition of curls.

While the illustrative embodiment has been shown and described in relation to a case wherein a toner image is transferred from the photoconductive element 38 to the paper 12, it is similarly applicable to a case wherein an electrostatic latent image is transferred from the former to the latter.

As stated above, the fourth embodiment sets up an adequate transfer ratio and therefore realizes stable image reproduction by controlling a transfer current in those positions which are associated with curls of a paper, whether the curls may occur at the leading and trailing edges of a paper or at opposite side edges of the same.

[V] Fifth Embodiment

When a paper to which an image is transferred from a photoconductive element at a transfer station has any curl, it fails to be positively separated from the surface of the photoconductive element and, in the worst case, a part of the image is re-transferred from the paper to the photoconductive element. Such an occurrence critically effects the quality of an image. In the fifth embodiment, the curl correcting device is implemented as a device for controlling a current applied to the separation charger in matching relation to the amount of curl of a paper. The curl sensing device 60 which is usable with the illustrative embodiment is usually located on the transport path downstream of the fixing station 20 of the copier 10.

Figure 35:
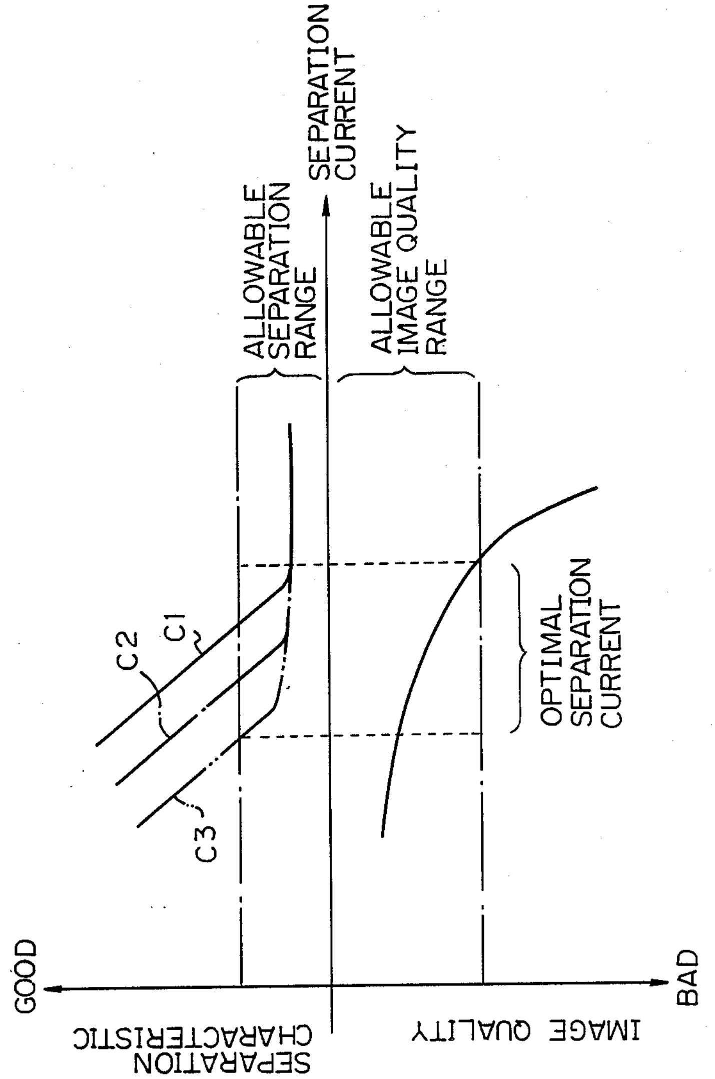
FIG. 35 is a plot representative of a relationship between the separation current associated with a separation charger and the separation characteristic as well as a relationship between the separation current and the image quality.

Referring to FIG. 35, there are shown a relationship between the current applied to a separation charger (hereinafter referred to as separation current) and the separation characteristic (corresponding to the frequency of incomplete separation) and a relationship between the separation current and the image quality (corresponding to the degradation of image quality due to retransfer). In FIG. 35, curves C1, C2 and C3 are individually representative of the characteristics of papers each being curled by a different amount. As shown, while the separation current should preferably be great from the separation characteristic standpoint, it should preferably be small from the image quality standpoint. Further, the separation current range which is acceptable for both of the separation characteristic and the image quality varies with the amount of curl of a paper. It follows that by sensing the amount of curl of a paper and adjusting the separation current based on the sensed amount of curl, it is possible to set up optimal control over the separation process, e.g., to control the separation current characteristic to the center of a particular range which satisfies both the separation characteristic and the image quality. That is, it is possible to eliminate incomplete separation and the degradation of image quality even if a paper is curled.

Now, the separation characteristic and image quality associated with a curled paper varies with the position of the paper for the following reason. In the transfer process of the kind in which a paper is moved along a photoconductive element to transfer an image as stated above, even a curled paper is successfully guided into contact with the photoconductive element by, for example, the guide mechanism 222 of FIGS. 24 and 25. A separation process, however, lacks a guide member for guiding a paper along the photoconductive element. Therefore, a curled paper locally rises away from the surface of the photoconductive element due to its own restoring force. For example, assume that a paper is curled at its leading and trailing edges away from a photoconductive element, as shown in FIG. 7A. Then, when those edges of the paper are subjected to the separation process, they are raised away from the surface of the photoconductive element. In this condition, those edge portions of the paper become closer to a separation charger than the other portion which is held in contact with the photoconductive element. In this manner, the distance between a curled paper and a separation charger changes depending upon the position where curls are present. Hence, even when a constant current is fed to a separation charger, the current actually flows through a paper varies with the position of the paper and in turn effects the amount of charge deposited on a paper during the separation process. Specifically, the amount of charge is increased than usual in those portions of a paper which are raised away from a photoconductive element, causing the re-transfer and therefore the local omission of an image to occur.

This embodiment uniformizes the amount of charge which is deposited on various portions of a paper in the separation process by adjusting the flow of a current from a separation charger to a paper in dependence upon the amount and direction of curl which may occur in any of those portions of a paper. Then, an image can be fully transferred even to a noticeably curled paper without the need for curl correction.

Figures 36A, 36B, 36C:
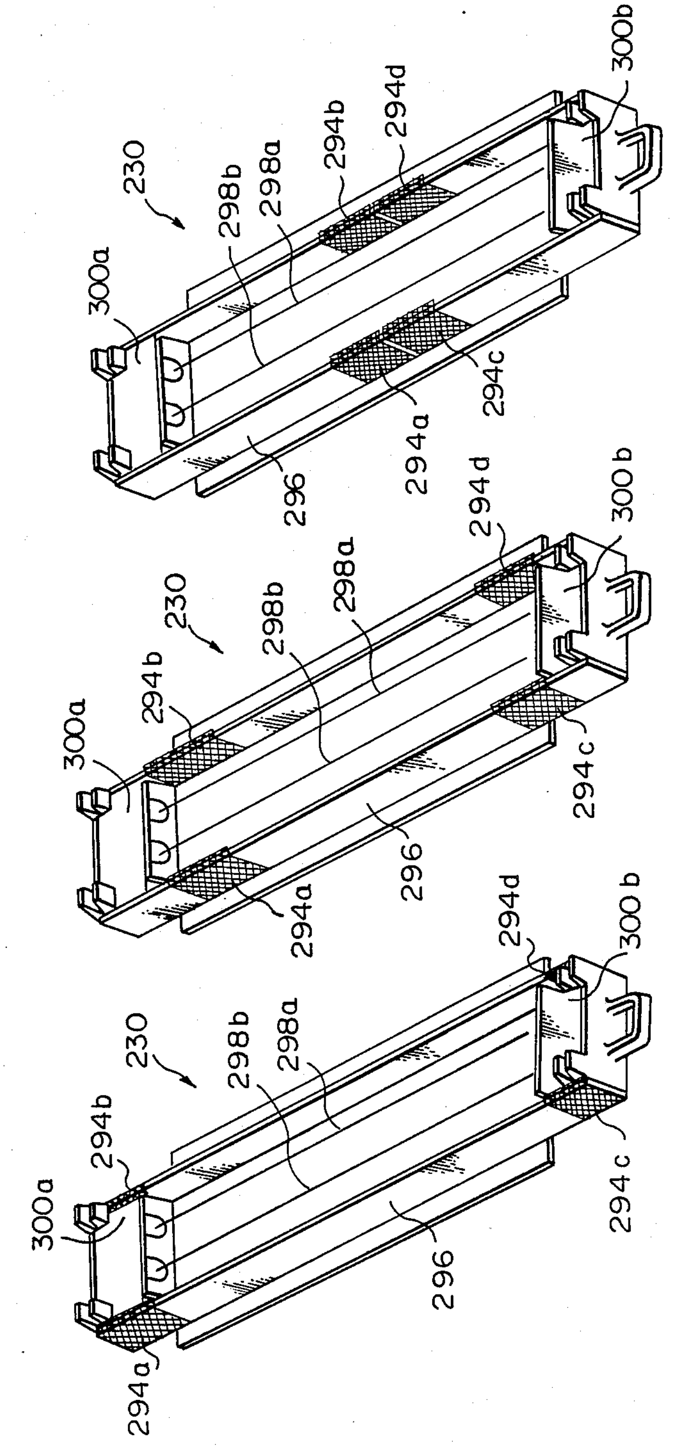
FIGS. 36A to 36C are views showing conductive members constituting a separation charger current control device which is representative of a fifth embodiment of the curl correcting device.

Specifically, assume that the paper 12 is curled in the widthwise direction, as shown in FIG. 7B. In this case, the current distribution in the axial direction of the separation charger 230 (see FIG. 24) is adjusted. Such adjustment is implemented by four conductive members 294*a*, 294*b*, 294*c* and 294*d* which are shown in FIGS. 36A, 36B and 36C. The conductive members 294*a* to 294*d* are so arranged as to extend along the inner and outer walls of a casing 296 of the charger 230 and are individually slidable in the axial direction of the casing 296. In the separation process, the current to flow through charge wires 298*a* and 298*b* of the charger 230 is controlled, and such a current partly flows into the conductive casing 296 and partly into the paper 12. Therefore, even if the current fed to the charge wires 298*a* and 298*b* is maintained constant, any change in the allocation of current to the casing 296 and the paper 12 results in a change in the current which flows into the paper 12. Since the conductive members 294*a* to 294*d* are exposed to the interior of the casing 296, they are closer to the charge wires 298*a* and 298*b* than the casing 296. It follows that the electric resistance is smaller between those portions of the casing 296 where the conductive members 294 to 294*d* are present and the charge wires 298*a* and 298*b* than between the other portions and the charge wires 298*a* and 198*b*, causing a current to flow more easily in the former portions than in the latter portions. More specifically, the current flowing between the charge wires 298*a* and 298*b* and the casing 296 is different from those portions where the conductive members 294*a* to 294*d* are present to the other portions where they are absent. Hence, the distribution of separation current in the axial direction of the separator charger 230 is adjustable by moving the conductive members 294*a* to 294*d*.

In the illustrative embodiment, the conductive members 294*a* to 294*d* are rigidly connected to a drive wire which is passed over two pulleys although not shown in the drawings. The drive wire is driven by a motor to move the conductive members 294*a* and 294*b* and the conductive members 294*c* and 294*d* toward and away from each other. So long as the paper 12 is not curled, the conductive members 294*a* to 294*d* are located in opposite end blocks 300*a* and 300*b* of the casing 296. In this condition, the casing 296 is spaced by a uniform distance from the charge wires 298*a* and 298*b* throughout its axial length so that the current flowing into the casing 296 and the current flowing into the paper 12 are uniformized.

When the paper 12 is curled, the conductive members 294*a* to 294*d* are moved out of the end blocks 300*a* and 300*b* to control the current distribution, as follows. If the paper 12 is curled at opposite sides thereof toward the photoconductive element, the conductive members 294*a* to 294*d* are shifted to end portions of the casing 296 as delimited by the inner ends of the end blocks 300*a* and 300*b*, as shown in FIG. 36B. In this condition, neglecting the influence of curls of the paper 12, the distribution of current flowing through the casing 298 is such that the current is greater in the end portions of the charger 230 than in the intermediate portion. Conversely, neglecting the influence of the conductive members 294*a* to 294*d*, the distribution of current flowing through the conductive members 294*a* to 294*d* is such that the current is greater in the intermediate portion of the paper 12 than in the opposite side portions, because the current flows more easily in the former than in the latter. In practice, however, the influence of the conductive members 294*a* to 294*d* and that of the curls occur at the same time and combined together, so that the current actually flowing from the charge wires 298*a* to 298*b* into the various portions of the paper 12 is substantially uniform.

Next, assume that the paper 12 is curled along its opposite sides away from the photoconductive element 38. Then, the conductive members 294*a* to 294*d* are shifted to the center of the casing 296, as shown in FIG. 36C. In this case, neglecting the influence of the curls of the paper 12, the current flowing into the casing 296 is greater in the intermediate portion of the charger 230 than in the opposite end portions. On the other hand, neglecting the influence of the conductive members 294*a* to 294*d*, the current flowing into the paper 12 is greater in the opposite side portions of the paper 12 than in the intermediate portion, because the current flows more easily in the former than in the latter. In practice, however, the influence of the conductive members 294*a* to 294*d* and that of curls of the paper 12 occur at the same time and are combined together. Hence, the current actually flowing from the charge wires 298*a* and 298*b* into the various portions of the paper 12 is substantially uniform.

Assume that the paper 12 is curled in the direction of transport, as shown in FIG. 7A. Then, the position of the paper 12 where the separation current flows sequentially varies as the paper 12 is advanced, i.e., as the copying process proceeds. Without any special current control, a greater current would flow in that portion of the paper 12 which is raised away from the photoconductive element 38 due to the curl than in that portion which is held in close contact with the element 38. In accordance with this embodiment, the current fed to the charge wires 298*a* and 298*b* of the separation charger 230 is so controlled as to set up a uniform separation current distribution throughout the paper 12, as described hereinafter.

Figure 37:
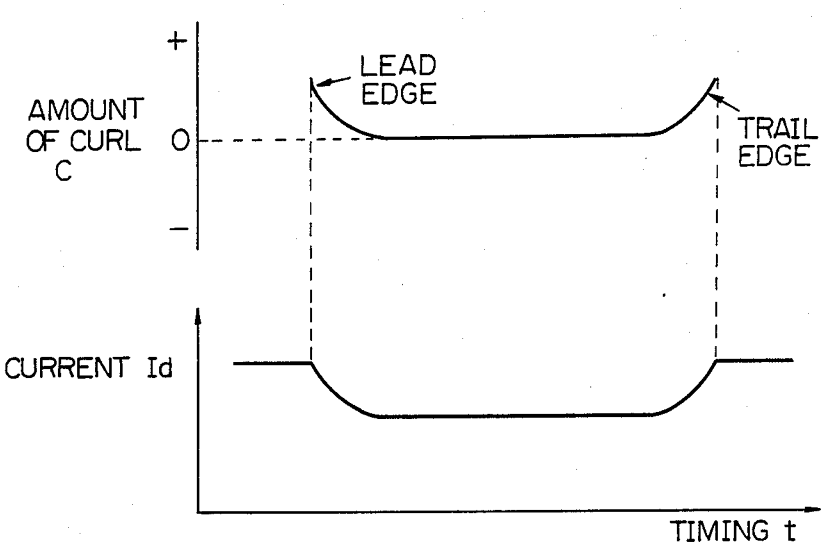
FIGS. 37 and 38 are timing charts demonstrating the control over the separation current which is adapted for a paper that is curled in the direction of transport.

First, assume that the leading and trailing edges of the paper 12 are curled toward the photoconductive element 38. In this condition, although the leading and trailing edges of the paper 12 are held in close contact with the photoconductive element 38, the intermediate portion of the same is raised to cause a current flowing therethrough to increase. In the light of this, as shown in FIG. 37, the current Id fed to the charge wires 298*a* and 298*b* of the separation charger 230 is controlled timed to the progress of the separation process which is represented by time t. As shown, the current Id is so controlled as to become smaller in the intermediate portion of the paper 12 than in the leading and trailing edges of the same. More specifically, since the allocation of the current from the charge wires 298*a* and 298*b* to the casing 296 and the paper 12 is different from one portion to another of the paper due to the curls, the current fed to the charge wires 298*a* and 298*b* is controlled to set up a uniform current distribution throughout the paper 12.

Figure 38:
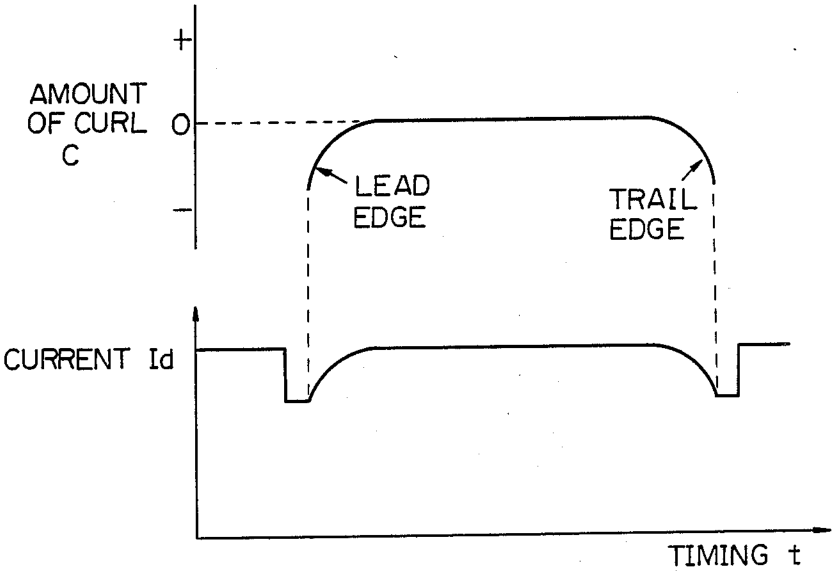

Further, assume that the leading and trailing edges of the paper 12 are curled away from the photoconductive element 38. Then, while the intermediate portion of the paper 12 is held in close contact with the photoconductive element 38, the leading and trailing edges of the same are raised from the element 38 and would cause the separation current flowing therethrough to increase. In this case, the current Id fed to the charge wires 298*a* and 298*b* is sequentially controlled as shown in FIG. 38, i.e., such that the current Id becomes smaller at the leading and trailing edges of the paper 12 than at the intermediate portion. More specifically, since the allocation of the current from the charge wires 298*a* and 298*b* to the casing 296 and the paper 12 is different from one portion to another of the paper 12 due to the curls, the current Id is controlled to uniformize the current which flows through the paper 12.

Figure 39:
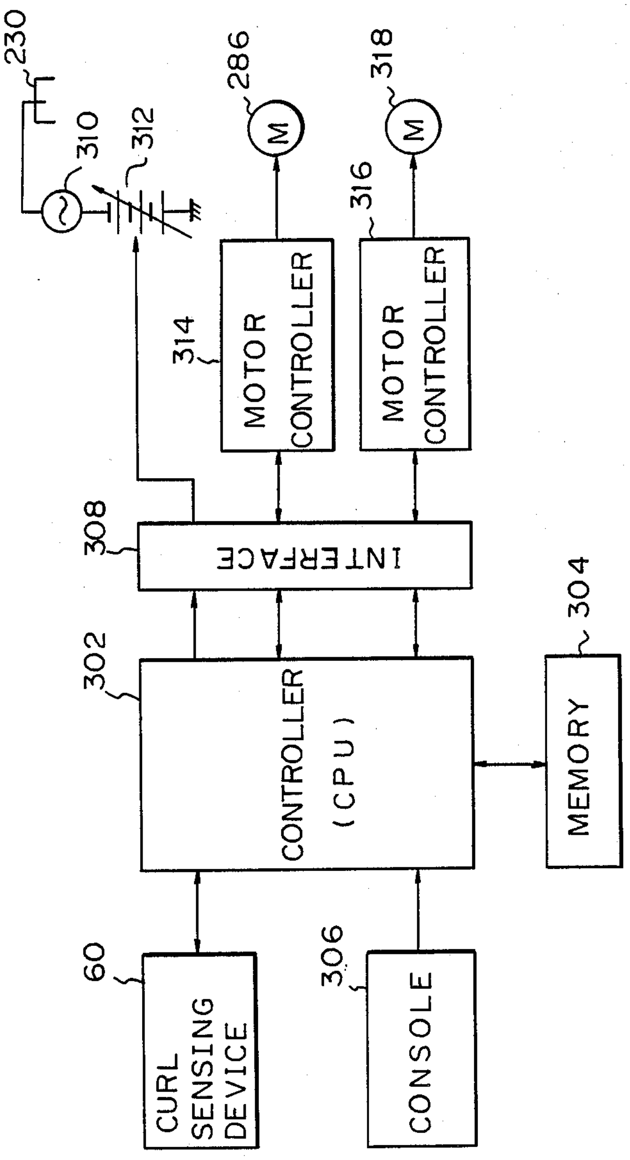
FIG. 39 is a schematic block diagram showing a control system which is associated with the control device of FIGS. 36A to 36C.

A control system for controlling the separation current as described above is shown in FIG. 39. As shown, the control system includes a controller 302 which is implemented by a CPU. Connected to the controller 302 are a memory 304 which includes a random access memory (RAM) and a read only memory (ROM), the curl sensing device 60, a console 306, and an interface 308. An AC power source 310 is connected at one end to the charge wires 298*a* and 298*b* of the separation charger 230 and at the other end to ground via a DC bias power source 312. The voltage of the DC bias power source 312 is variable and controlled by the CPU of the controller 302 via the interface 308. Electric motors 286 and 318 are connected to the interface 308 via motor controllers 314 and 316, respectively. While the motor 286 is adapted to position the distance sensor units 110 and 112 of the curl sensing device 60 in association with paper size, the motor 318 is adapted to position the conductive members 294a to 294d of the separation charger 230. The console 306 is accessible for entering the width of a paper 12. In response to the paper width entered on the console 306, the CPU 302 drives the motor 286 to adjust the positions of the sensor units 110 and 112. At the same time, in response to the amount and direction of curl as outputted by the sensing device 60, the CPU 302 controls the voltage of the DC bias source 312 (i.e. current fed to the separation charger 230) and the motor 318 (i.e. positions of the conductive members 294a to 294d).

As described above, this embodiment prevents the image quality from being degraded by incomplete image transfer even if a curled paper is used and even in a two-side copy mode which is apt to curl a paper.

[VI] Sixth Embodiment

As shown in FIG. 24, a pawl 232 is located to face the separation charger 230 of the transfer station 18 for the purpose of separating the paper 12 from the photoconductive element 38 and feeding it toward the belt 234. This embodiment is implemented as a device for controlling the position of the pawl 232 in association with the amount of curl of the paper 12. The curl sensing device 60 which is usable with this embodiment is usually located on the transport path upstream of the transfer station of the copier 10.

Figure 40:
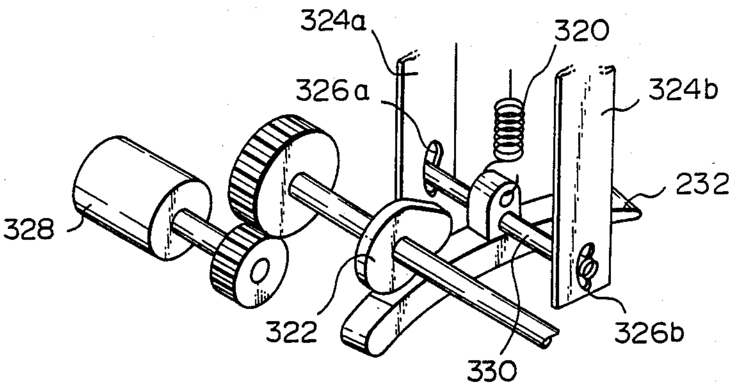
FIG. 40 is a perspective view showing a pawl positioning device which is representative of a sixth embodiment of the curl correcting device.

The pawl 232 is positioned such that its tip makes contact with or adjoins the photoconductive element 38. A plurality of such pawls 232 are sequentially arranged along the axis of the photoconductive element 38 and are individually movable. FIG. 40 shows an exemplary mechanism for moving the pawls 232. As shown in FIG. 40, each pawl 232 is constantly biased upward by a spring 320 while being pressed downward by an eccentric cam 322. The pawl 232 is restricted in the longitudinal direction by brackets 324a and 324b and in the lateral direction by guide slots 326a and 326b which are formed through the brackets 324a and 324b, respectively. When a motor 328 is rotated, the eccentric cam 322 is rotated to in turn move a pin 330 of the pawl 232 up and down along the guide slots 326a and 326b in cooperation with the spring 320. The guide slots 326a and 326b are so configured as to prevent the gap or the contact pressure between the tip of the pawl 232 and the photoconductive element 38 from being changed during the movement of the pawl 232. For example, when the photoconductive element 38 is implemented by a drum, the guide slots 326a and 326b are each provided with an arcutate shape the curvature of which is substantially the same as the circumference of the drum.

Assume that the paper 12 which is curled at opposite corners of its leading edge is fed and then separated from the photoconductive element 38 after image transfer. Then, those pawls 232 which adjoin those corner portions of the paper 12 are lowered to prevent the latter from rising and therefore from interfering with a cleaning unit and others. In this manner, the pawls 232 are selectively moved depending upon the paper size and the amount and direction of curl so as to press raised portions of the paper 12. This insures stable separation and transport of the paper 12.

Figure 41:
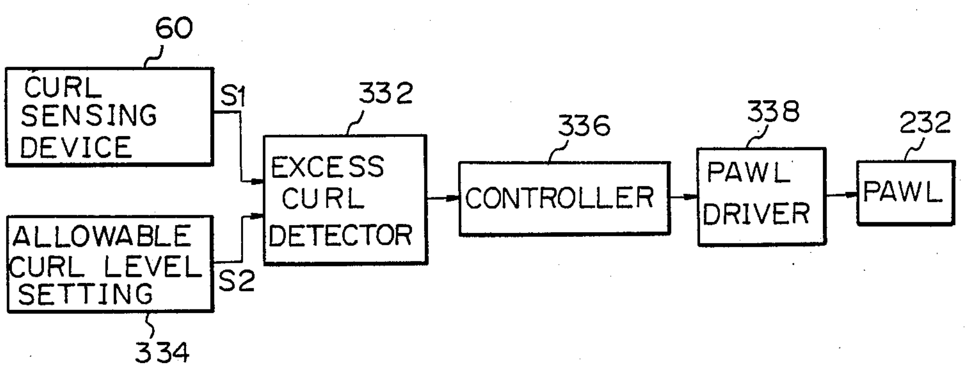
FIG. 41 is a block diagram showing a control system associated with the device of FIG. 40.
Figure 42:
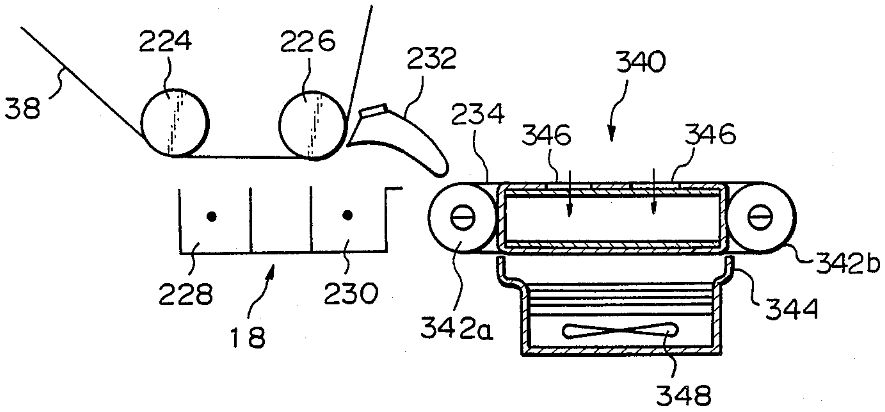
FIG. 42 is a sectional side elevation showing a suction control arrangement which is located downstream of a transfer station and representative of a seventh embodiment of the curl correcting device.
Figure 43:
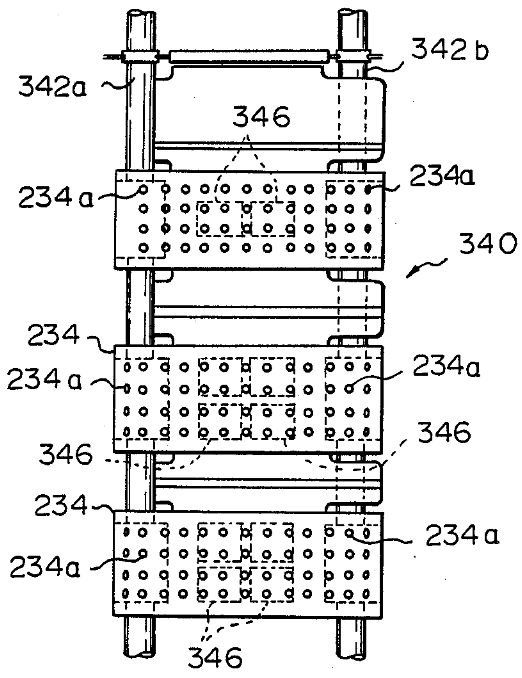
FIG. 43 is a view showing a specific construction of a suction assembly as shown in FIG. 42.

FIG. 41 shows in a block diagram a control system for moving the separator pawls 232 as stated above. The amount of curl ($S_1$) sensed by the sensing device 60 at various points of and along the width of the paper 12 is compared by an excess curl detector, or comparator, 332 with an allowable curl level ($S_2$) which is set up by an allowable curl level setting block 334. If the actual curl is greater than the allowable or reference curl, a controller 336 actuates the individual pawls 232 via a pawl driver 338.

As described above, this embodiment allows even a curled paper to be surely separated and then transported toward a belt when it is fed to a separating region of a transfer station.

[VII] Seventh Embodiment

As shown in FIG. 24, the belt 234 is located along the transport path downstream of the separation charger 230 and pawl 232 of the transfer station 18 for the purpose of transporting the paper separated from the photoconductive element 38 toward the fixing station 20. In this embodiment, the curl correcting device is implemented as a device for controlling on the basis of the sensed amount of curl of the paper 12 a suction which is exerted by a suction mechanism for sucking the back of the paper 12 onto the belt 234. The curl sensing device 60 which is usable with this embodiment is usually located on the transport path upstream of the fixing station 18 of the copier 10.

As shown in FIGS. 42, 43, 44A and 44B, the suction mechanism 340 includes a plurality of belts 234 which are passed over a pair of rollers 342a and 342b and each is formed with a number of apertures, a suction tank 344 disposed between the upper and lower runs of the belts 234 and formed with openings 346 through its top, and a vacuum fan 348 accommodated in a lower part of the tank 344. Shutters 350 are each associated with a respective one of the openings 346 and are controllable to fully open, fully close or partly open their associated openings 346. Specifically, the shutters 350 control the opening degrees of their associated openings 346 on the basis of the amount, direction and others of curl of the paper 12 as sensed by the sensing device 60, thereby causing the paper 12 to be evenly retained on the belt 234 by suction.

Figure 44A:
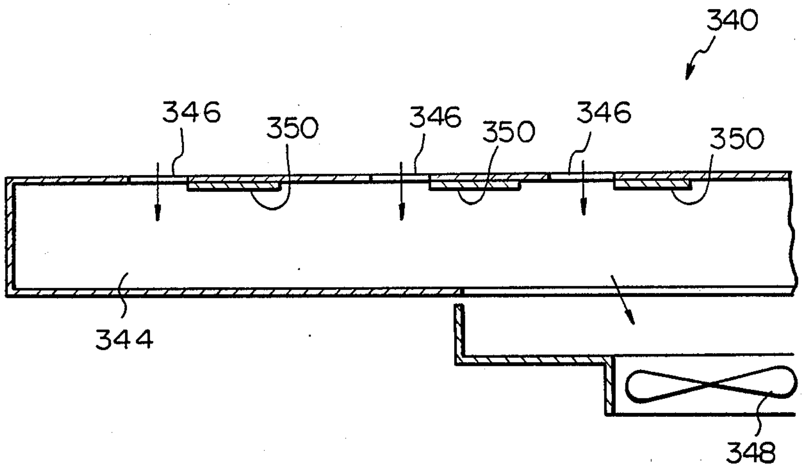
FIGS. 44A and 44B are sectional side elevations showing an example of a suction tank which is included in the suction assembly of FIG. 42.
Figure 44B:
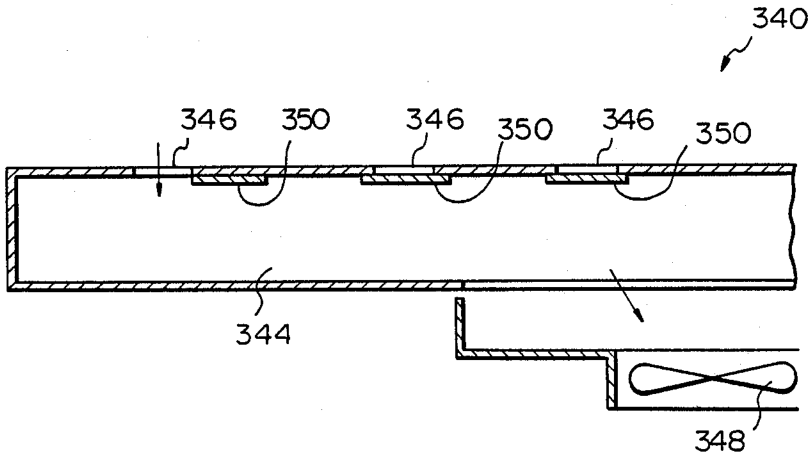

For example, when the paper 12 being transported has no noticeable curls, the shutters 350 are positioned to fully close their associated openings 346, as shown in FIG. 44A. When the paper 12 is curled upward at both ends thereof, only those shutters 350 which are aligned with the curled ends of the paper 12 are driven to fully open their associated openings 346, as shown in FIG. 44B. In this condition, the opposite ends of the paper 12 are firmly retained on the belts 234 by intense suction. In this manner, even a paper 12 which is curled upward at opposite ends thereof is evenly retained on and stably transported by the belts 234 toward the fixing station.

Figure 45A:
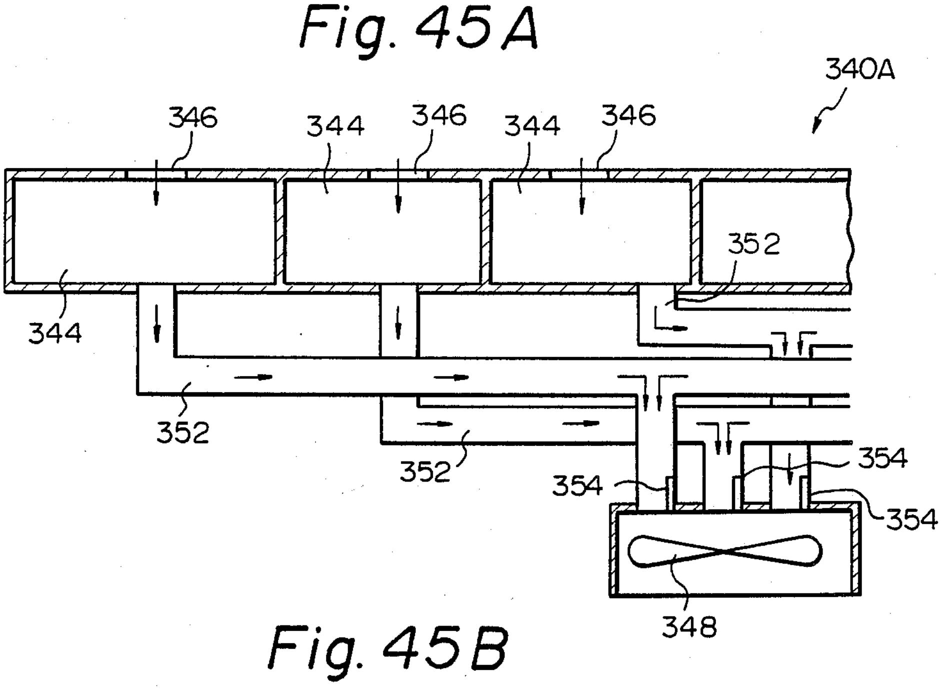
FIGS. 45A and 45B are views similar to FIGS. 44A and 44B, showing another example of the suction tank.
Figure 45B:
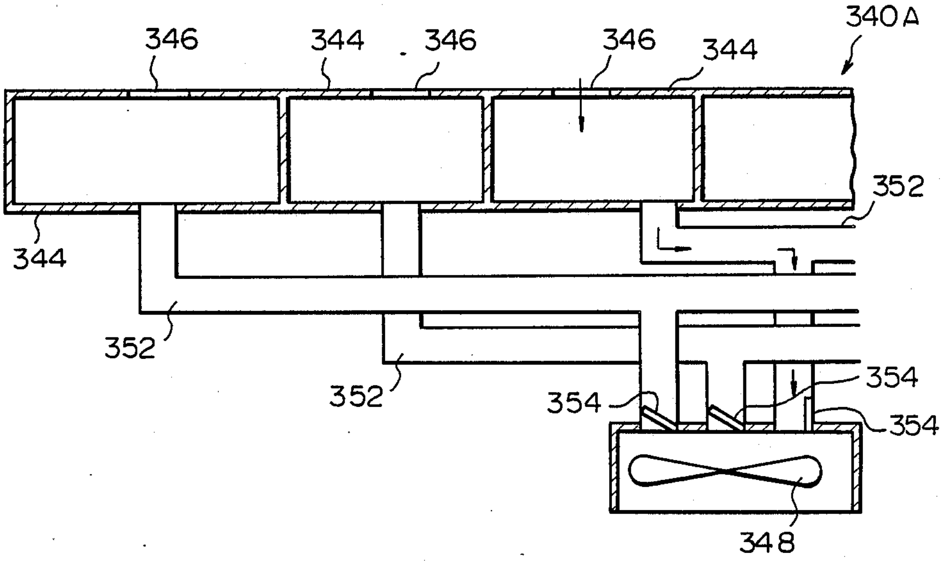

Referring to FIGS. 45A and 45B, a modification to the embodiment of FIGS. 44A and 44B is shown. In the modification, a suction mechanism 340A includes the suction tank 344 which is partitioned into a plurality of compartments by walls that extend in the transport direction. Each of the compartments is provided with the exclusive opening 346, an exclusive duct 352 which terminates at the fan 348, and an exclusive shutter 354. In this construction, the opening degree of each opening 346 is adjustable independently of the others to adjust the intensity of suction. When the paper 12 being transported has no noticeable curls, all the shutters 354 are fully opened, as shown in FIG. 45A. In this condition, the paper 12 is evenly retained on the belts 234 by the suction which is exerted through the compartments. On the other hand, when the paper 12 is curled such that its intermediate portion is lifted relative to the end portions, only those shutters 354 which are associated with those compartments which underly the paper intermediate portion are fully opened with the others fully closed. Then, air is sucked only through the full-open openings 346 so that the intermediate portion of the paper 12 is strongly sucked and, therefore, the entire paper 12 is laid flat on the belts 234.

Figure 46:
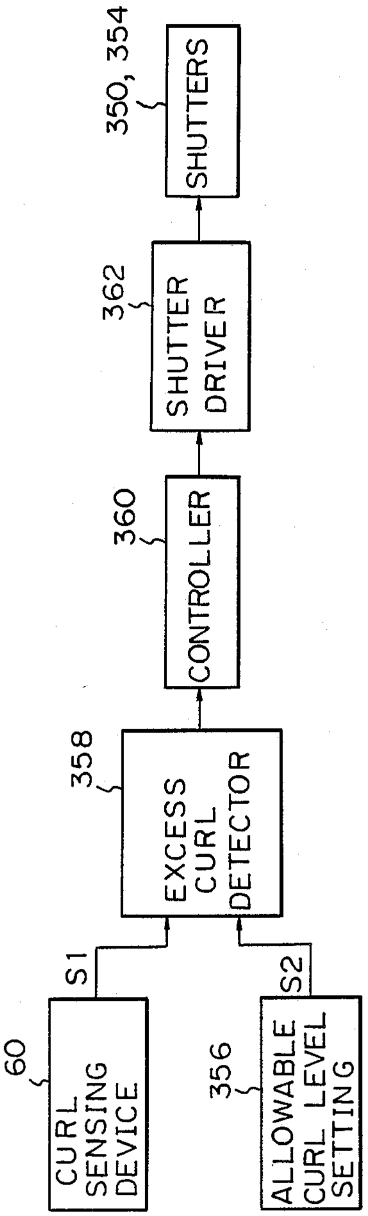
FIG. 46 is a schematic block diagram showing a control system which is associated with the device of FIGS. 42 to 45.

FIG. 46 shows a control system for controlling the suction which is exerted by any of the suction mechanisms 340 and 340A. As shown, the amount of curl ($S_1$) sensed by the sensing device 60 is applied to an excess curl detector 358 which comprises a comparator. The excess curl detector 358 compares the actual amount of curl with an allowable curl level ($S_2$) which is set up by an allowable curl level setting block 356. If the actual curl level is above the allowable or reference level, a controller 360 controls the shutters 350 or 354 via a shutter driver 362 as previously discussed. So long as the actual curl is below the reference level, the controller 360 controls the shutters 350 or 354 to fully open all the openings 346.

As stated above, in accordance with this embodiment, even a curled paper is stably transported from a separating station toward a fixing station while being evenly retained on a transport belt by suction.

[VIII] Eighth Embodiment

The curl correcting device of this embodiment is implemented as a device for adjusting on the basis of the amount and direction of curl of a paper the position of a guide mechanism which serves to guide a paper from a transfer station to a fixing station, particularly the position of a guide plate of the guide mechanism, and thereby the direction of entry of a paper into a nipping section of a fixing and a pressing roller of the fixing station. The curl sensing device 60 which is usable with this embodiment is usually located on the transport path downstream of the fixing station 20. However, it may of course be located on the transport path upstream of the fixing station 20.

Figure 47:
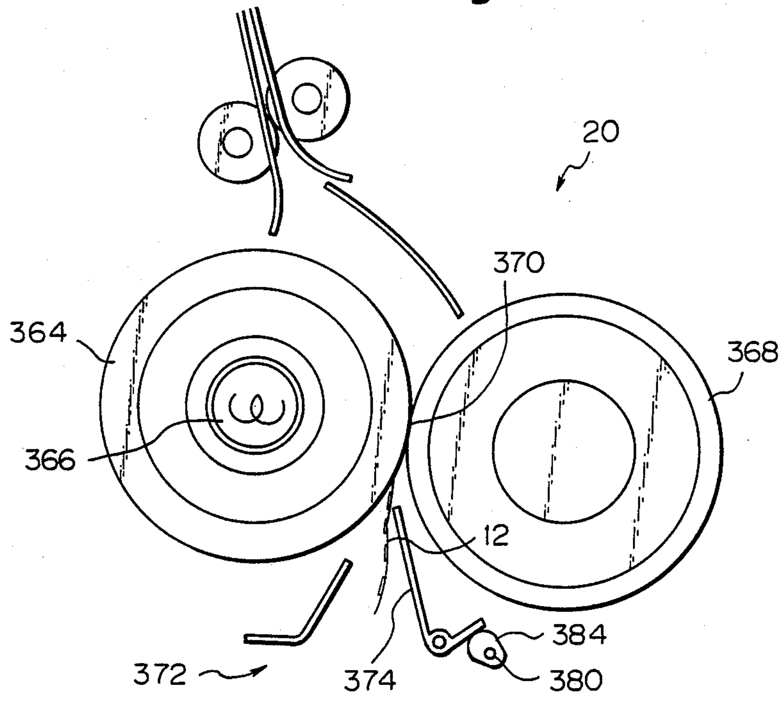
FIG. 47 is a side elevation showing a guide mechanism positioning device which is associated with a fixing station and representative of an eighth embodiment of the present invention.
Figure 48:
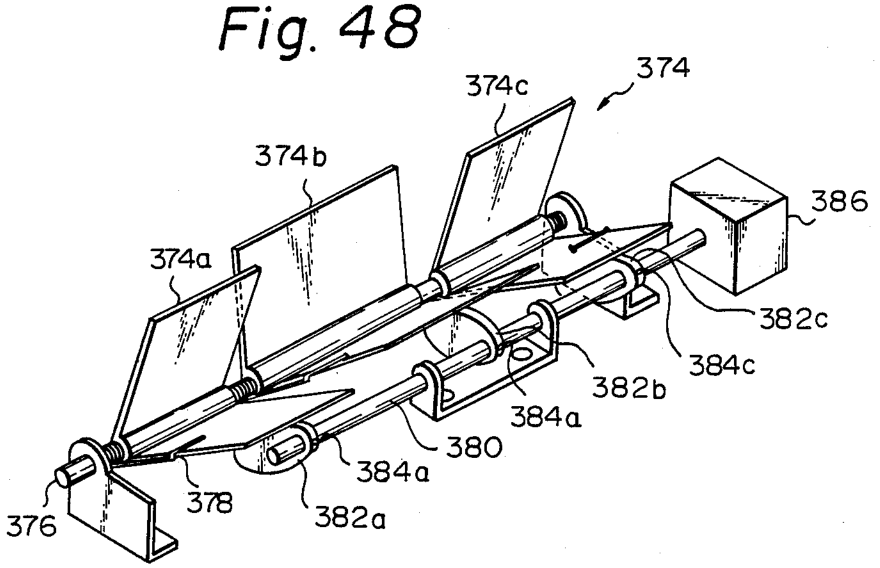
FIG. 48 is a perspective view showing the positioning device of FIG. 47.

FIG. 47 shows a specific construction of the fixing station 20 of the copier 10 as shown in FIG. 1. As shown, the fixing station 20 includes a fixing roller 364 in which a heater 366 is built and a pressing roller 368 which is pressed against the fixing roller 364 to define a nipping section 370. A guide mechanism 372 is positioned at the inlet side of the nipping section 370 and includes an inlet guide plate 374 which faces the non-image surface or back of the paper 12. The inlet guide plate 374 extends over substantially the entire axial length of the fixing roller 364. As shown in FIG. 48, the inlet guide plate 374 is constituted by three segments **374*a*, 374*b* and 374*c* which are arranged one after another in the axial direction of the fixing roller 364 and each has a generally L shape. The guide segments 374*a* to 374*c* are rotatably mounted on a single shaft 376 which is fixed to the framework of the copier 10. Torsion springs 378 individually constantly bias the guide segments 374*a* to 374*c* such that the tip of each guide segment tends to move away from the fixing roller 364. Cams 382*a*, 382*b* and 382*c* are mounted on a single shaft 380 which is rotatably mounted to the framework. The side of each of the guide segments 374*a* to 374*b* other than the side which defines a guide surface is abutted against one of the cams 382*a* to 382*c* which is associated with the guide segment. The cams 382*a* to 382*c* are independently adjustable in their angular position relative to the shaft 380 through screws 384*a*, 384*b* and 384*c*. The shaft 380 is directly coupled with a constant speed motor 386 and therefore rotatable by an angle which is proportional to the duration of operation of the motor 386**.

Ideally, the paper 12 should enter the nipping section 370 of the rollers 364 and 368 in such a manner that its center with respect to the width makes contact with the fixing roller 364 before the other portions, as generally accepted. It follows that the guide surface of each guide segment 374 has to be inclined in the direction of transport by an angle which is optimal for a particular degree of elasticity and a particular amount of curl of a paper. Since the kind of papers 12 used depends upon the user, it is necessary to adjust the angle of the cams **382*a* to 382*c* on the shaft 380 beforehand in association with the kind of papers 12. When the motor 386 is energized until the individual guide segments 374*a* to 374*c* reach the above-mentioned optimal angular position, the paper 12 is allowed to enter the nipping section 370** in an almost ideal condition and therefore free from the fear of creases and jams.

Figure 49:
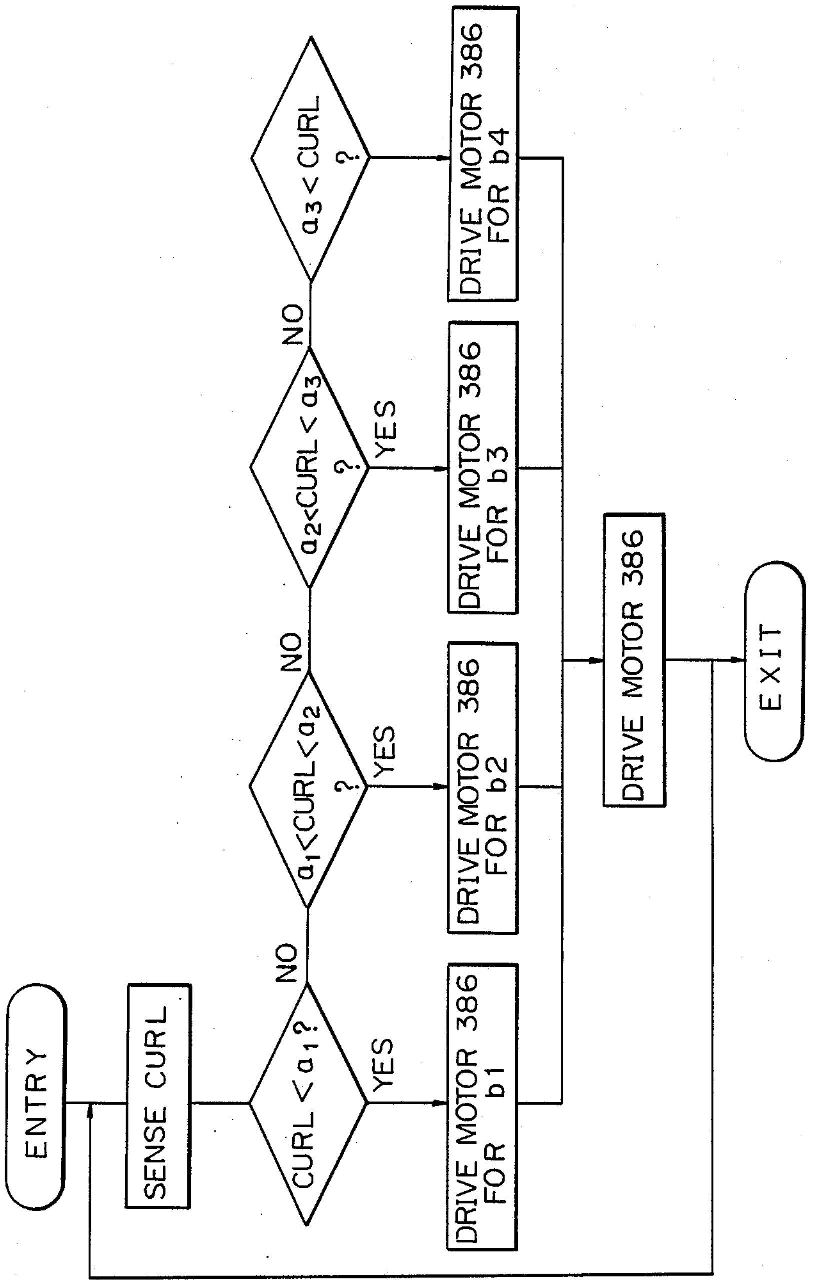
FIG. 49 is a flowchart associated with the operation of the positioning device of FIG. 47.

FIG. 49 is a flowchart exemplarily demonstrating a procedure for rotating the motor 386 by a necessary angle on the basis of the amount of curl which is sensed by the curl sensing device 60. As shown, when the actual amount of curl is less than $a_1$, when it is greater than $a_1$ and smaller than $a_2$, when it is greater than $a_2$ and smaller than $a_3$, and when it is greater than $a_3$, the motor 386 is operated for periods of time of $b_1$, $b_2$, $b_3$ and $b_4$, respectively. Consequently, the individual guide segments **374*a* to 374*c*** are displaced to an optimal angular position.

As described above, even when a paper which has been curled by the fixing process of the first copying operation as in a two-side copy mode or in a combination copy mode is subjected to a fixing process during the second copying operation, the illustrative embodiment described above allows the paper to be smoothly introduced into a nipping section which is defined by a fixing and a pressing roller of a fixing station. This prevents even such a curled paper from being creased or from jamming a paper transport path.

Figure 50:
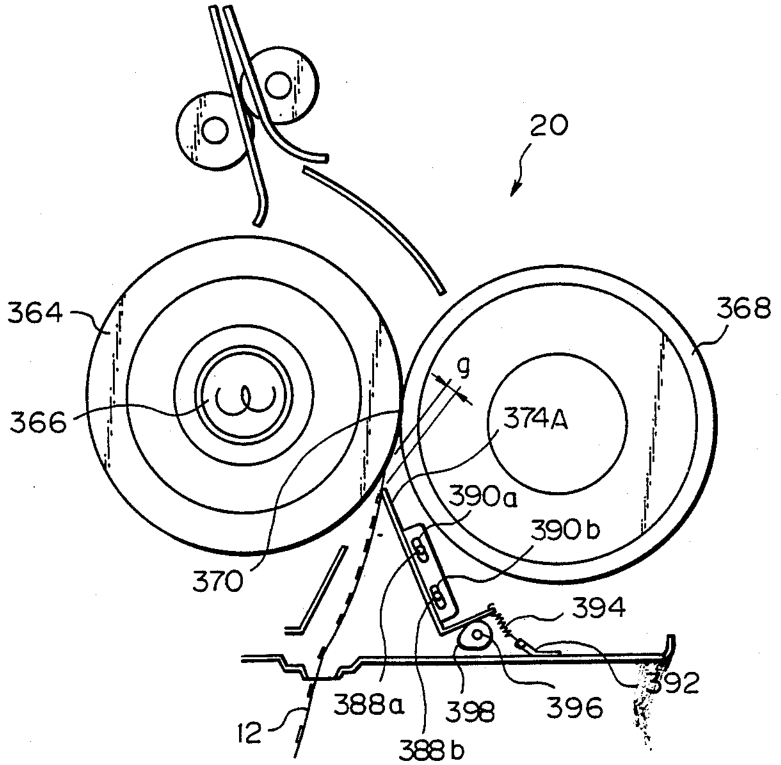
FIG. 50 is a sectional side elevation showing a modification to the embodiment of FIG. 47.

Referring to FIG. 50, a modification to the eighth embodiment is shown. As shown, a generally L-shaped guide plate 374A is formed with slots **390*a* and 390*b* while two pins which are fixed to the framework are received in the slots 390*a* and 390*b*, respectively. In this configuration, the guide plate 374A is movable along the length of the slots 390*a* and 390*b*. A spring 394 is anchored at one end to a mount 392 which is fixed to the framework and at the other end to the lower end of the guide plate 374A, whereby the tip of the guide plate 374A is constantly biased away from the fixing roller 364. A cam 398 is rotatably mounted on a shaft 396 so as to adjust the gap g between the guide plate 374A and the fixing roller 364. The shaft 396 is driven by a motor, one-rotation clutch or like known implementation to rotate the cam 398 by a predetermined angle which is associated with the angle of rotation of the shaft 396**.

The inlet guide plate 374A may be controlled as follows. The cam shaft 396 and cam 398 are rotated by the motor in association with the amount of curl which is sensed by the curl sensing device 60. Consequently, the gap g between the inlet guide plate 374A and the fixing roller 364 is controlled to a value which is optimal for the amount of curl.

The smaller the gap g, the less the probability of creasing is. However, when it is excessively small, it would interfere with the transport of a paper having a noticeable curl or having substantial elasticity and thereby cause a jam. Such a relationship should be taken into account in determining the correspondence of the gap g and the amount of curl. Since an ordinary user is expected to use only one or two different kinds of papers, the correspondence of the amount of curl and the gap may be determined by confining the elasticity of papers to a certain range.

As described above, this modification frees papers from creases and jams by defining a gap between a fixing roller and an inlet guide plate which is optimal for an amount of curl sensed.

[IX] Ninth Embodiment

In this embodiment, the curl correcting device is implemented as a device for adjusting the position of contact of a pawl adapted to separate a paper from the surface of a fixing roller of a fixing station with the fixing roller while maintaining the contact of the former with the latter, in dependence upon the amount of curl of a paper. Specifically, by changing the position of contact of such a pawl with the fixing roller it is possible to change the stress, the direction and degree of bend and others of a paper which is separated from the roller and therefore to reduce the amount of curl.

Figure 51:
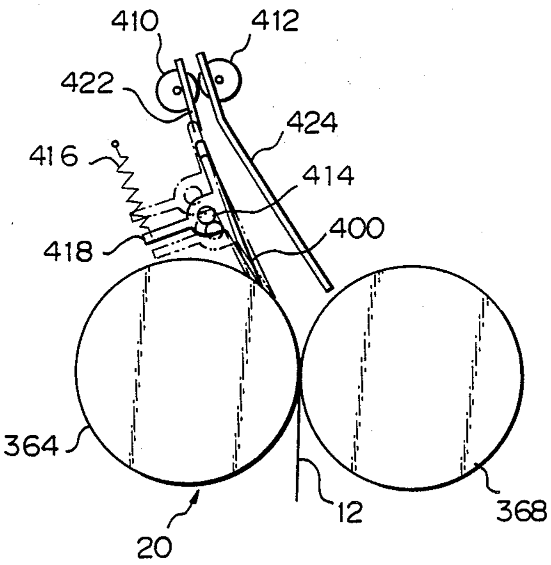
FIGS. 51 and 52 are side elevations showing a positioning device which is representative of a ninth embodiment of the curl correcting device and associated with a pawl that is located at the downstream side of a fixing station.
Figure 52:
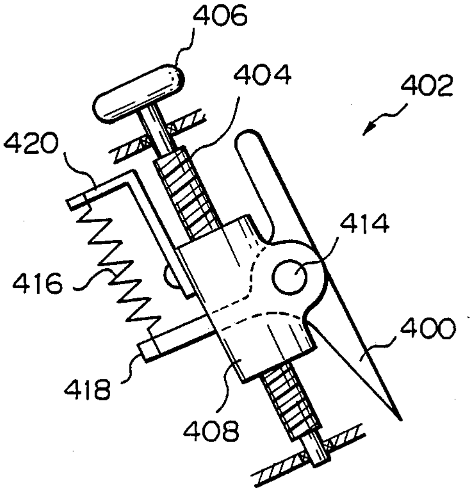

FIGS. 51 and 52 show the fixing station 20 in which a fixing roller 364 and a pressing roller 368 are provided, a pawl 400 located downstream of a nipping section of the rollers 364 and 368 and held in contact with the surface of the roller 364, and a mechanism 402 for adjusting the position of the pawl 400. The mechanism 402 includes a screw shaft 404 which is provided with a knob 406 at one end thereof. The screw shaft 404 extends substantially parallel to the direction of paper transport. A bracket 408 is threaded over the screw shaft 404 just as a nut is threaded over a bolt. When the screw shaft 404 is rotated by holding the knob 406, the bracket 408 moves on and along the screw shaft 404. The pawl 400 serves to separate the paper 12 from the fixing roller 364 and guide it toward transport rollers 410 and 412 which are located downstream of the pawl 400. An intermediate portion of the pawl 400 is rotatably connected by a shaft 414 to the bracket 408. A spring 416 is adapted to constantly maintain the tip of the pawl 400 in contact with the fixing roller 364. The spring 416 is anchored at one end to an arm 418 which extends from the intermediate portion of the pawl 400 and at the other end to a member 420 which is fixed to the bracket 408. The pawl 400 is oriented toward the nipping section 370 of the fixing roller 364 and pressing roller 368 and constantly held in pressing contact with the roller 364. The reference numerals 422 and 424 designate guide plates which function to guide the paper 12 from the nipping section 370 to the transport rollers 410 and 412. While the guide plate 422 is interposed between the roller 410 and the pawl 400, the guide plate 424 is interposed between the roller 412 and the pressing roller 368.

In the above construction, the paper 12 entered the nipping section 370 and having an image fixed there is separated from the fixing roller 364 by the pawl 400, then guided by the guide plates 422 to 424 to the transport rollers 410 and 412, and then further fed by the rollers 410 and 412 for a subsequent step. When the paper 12 fed for the subsequent step is curled, the pawl 400 is moved from a position indicated by a solid line in FIG. 51 to a position indicated by a dash-and-dots line or a dash-and-dot line depending upon the amount of curl. This changes the angular position of the pawl 400 which is held in contact with the fixing roller 364. Specifically, the knob 406 is rotated to rotate the screw shaft 404 so that the bracket 408 is moved along the screw shaft 404 together with the pawl 400. At this instant, the pawl 400 is maintained in contact with the fixing roller 364 by the action of the spring 416. Consequently, the angular position of the pawl 400 relative to the fixing roller 364 is changed to reduce the amount of curl. It is to be noted that the force of the spring 416 does not noticeably change because the pawl 400 and bracket 408 are movable integrally with each other along the screw shaft 404.

Figure 53A:
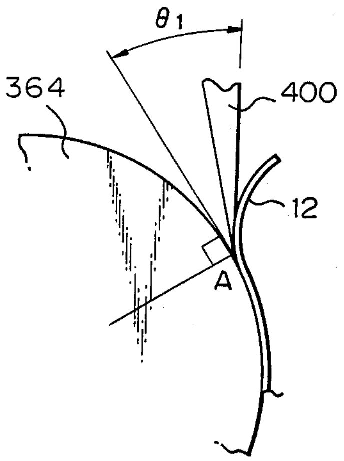
FIGS. 53A and 53B are diagrams schematically showing a relationship between the contact angle of the pawl and the change in the amount of curl.
Figure 53B:
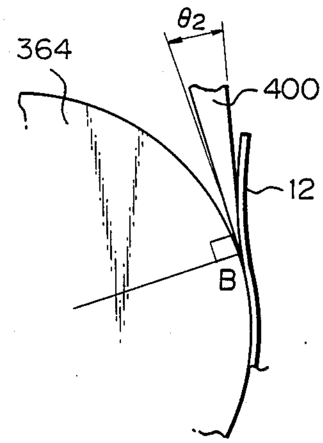
Figure 54:
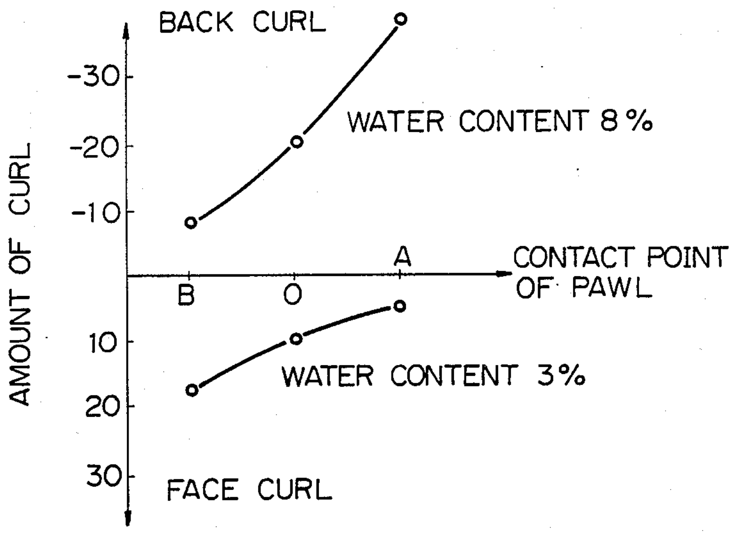
FIG. 54 is a plot showing a relationship between the position of the pawl and the amount of curl in accordance with the ninth embodiment.

In detail, as shown in FIGS. 53A and 53B, when the point of contact of the pawl 400 with the fixing roller 364 is shifted from A to B, the separating angle of the pawl 400 is changed from $\theta_1$ to $\theta_2$ so that the orientation of the stress which is applied to the paper 12 after the separation from the roller 364 is changed. Hence, as represented by curves in FIG. 54, the amount of curl can be reduced by adjusting the position of contact of the pawl 400 with the fixing roller 364 in matching relation to the conditions of the paper 12.

Figure 55:
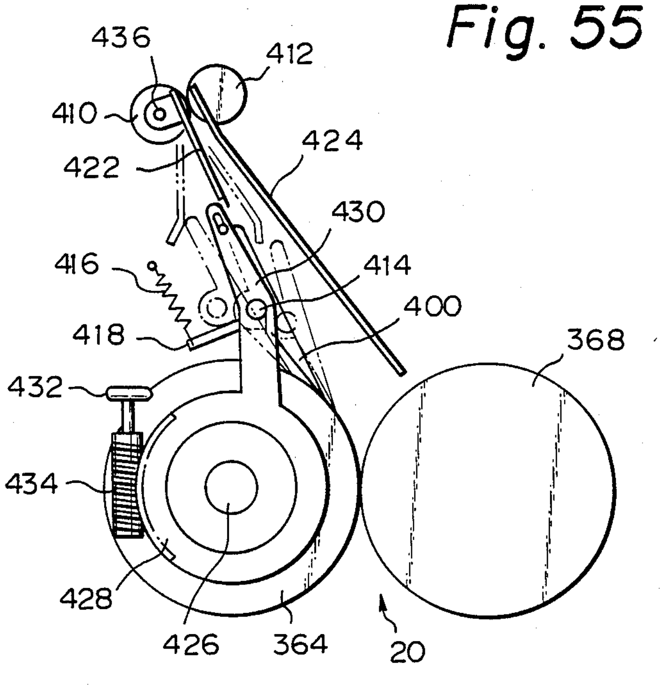
FIG. 55 is a side elevation showing a modification to the ninth embodiment.
Figure 56A:
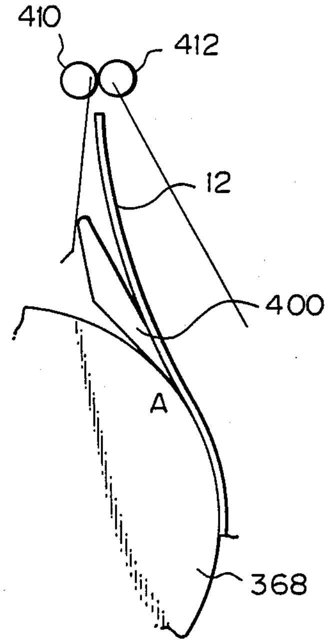
FIGS. 56A and 56B are plots showing a relationship between the contact position of the pawl and the change in the amount of curl in accordance with the modification of FIG. 55.
Figure 56B:
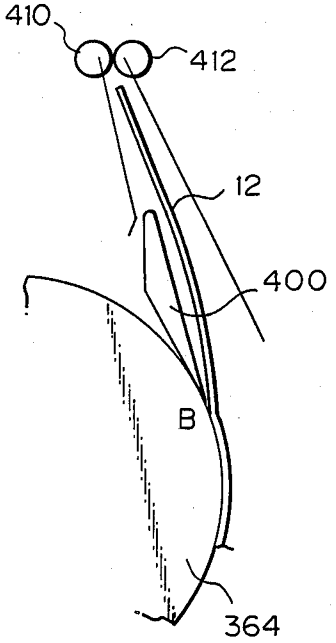

Referring to FIG. 55, a modification to this embodiment is shown. As shown, a sector gear 428 is coaxially and rotatably mounted on a shaft 426 on which the fixing roller 364 is mounted. The pawl 400 is rotatably supported by an arm 430 which extends from the sector gear 428, via a shaft 414. The spring 416 anchored at one end to the arm 418 of the pawl 400 is fixed at the other end to a suitable member, whereby the tip of the pawl 400 is held in contact with the fixing roller 364. A worm 434 is meshed with the sector gear 428 and rotatable when a knob 432 is rotated. When the worm 434 is rotated, the sector gear 428 is rotated to in turn rotate the arm 430 and thereby moves the pawl 400. That end of the guide plate 422 which is close to the transport roller 410 is rotatably mounted on a shaft 436 of the roller 410, so that the guide plate 422 follows the movement of the pawl 400. That end of the guide plate 422 which adjoins the pawl 400 is movably connected to the tip of the arm 430 by, for example, a pin and slot mechanism.

Figure 57:
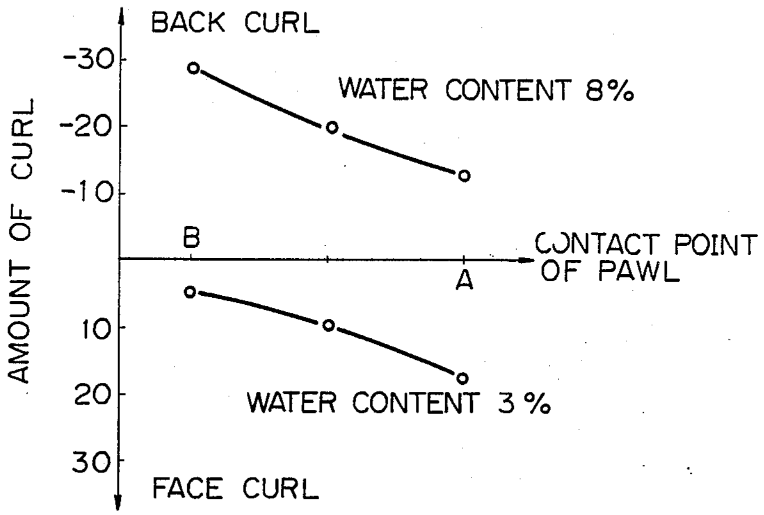
FIG. 57 is a plot showing a relationship between the position of the pawl and the amount of curl in accordance with the modification of FIG. 55.

In the above construction, when the worm 434 is rotated through the knob 432, the shaft 414 supported by the arm 430 is rotated about the shaft 429 of the fixing roller 364. As a result, although the separating angle of the pawl 400 remains the same despite the shift of the contact point from A to B as shown in FIGS. 5A and 5B, the direction and degree of bend of the paper 12 being separated from the fixing roller 368 are changed due to the shift of the contact point. Therefore, as represented by curves in FIG. 57, the amount of curl can be reduced by adjusting the contact point in association with the conditions of the paper 12 and in the opposite relationship to the embodiment described.

Figure 58:
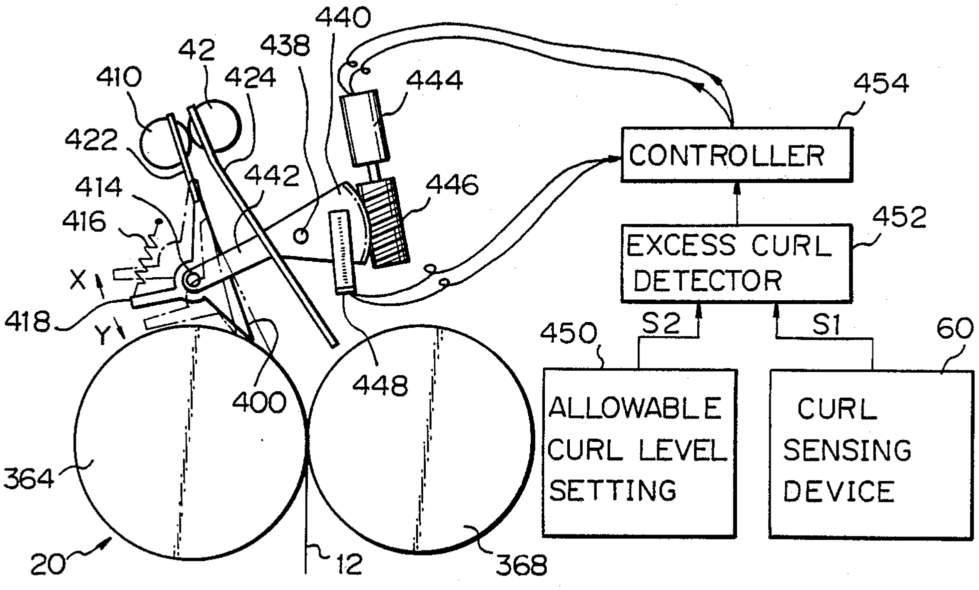
FIG. 58 is a side elevation showing another modification to the ninth embodiment.

Referring to FIG. 58, another modification to the above embodiment is shown. As shown, as a sector gear 440 is rotatably mounted on a shaft 438 outside of the guide plate 424 which is interposed between the pressing roller 368 and the transport roller 412. An intermediate portion of the pawl 400 is rotatably supported by the end of an arm 442 of the sector gear 440 via a shaft 414. A worm 446 is meshed with the sector gear 440 and driven by a motor 444 in a rotary motion. When the worm 446 is rotated to rotate the sector gear 440 about the shaft 438, the pawl 400 is shifted. A pawl position sensor 448 is provided for sensing the displacement of the pawl 100 in terms of the rotation of the sector gear 440. Arranged on the paper transport path are the curl sensing device 60 responsive to the amount and direction of curl ($S_1$), an allowable curl level setting block 450 for setting an allowable curl level ($S_2$), an excess curl detector 452 which is implemented by a comparator for comparing the allowable curl level and the actual curl level, and a controller 454 which delivers a drive signal to the motor 444 in response to an output of the excess curl detector 452 and receives a feedback signal from the pawl position sensor 448.

When the motor 444 is driven to rotate the worm 446, the sector gear 440 meshed with the worm 446 is rotated about the shaft 438 with the result that the pawl 400 supported by the arm 442 is shifted from a position indicated by a solid line in FIG. 58 to a position indicated by a dash-and-dots line or a dash-and-dot line. At this instant, the tip of the pawl 400 is held in contact with the fixing roller 364 by the spring 416. Consequently, the separating angle of the pawl 400 relative to the fixing roller 364 is changed to reduce the amount of curl. In detail, as shown in FIGS. 53A and 53B, when the point of contact of the pawl 400 with the fixing roller 364 is shifted from A to B, the separating angle of the pawl 400 is changed from $\theta_1$ to $\theta_2$ so that the orientation of the stress which is applied to the paper 12 after the separation from the roller 364 is changed. Hence, as represented by curves in FIG. 54, the amount of curl can be reduced by adjusting the position of contact of the pawl 400 with the fixing roller 364 in matching relation to the conditions of the paper 12.

Figure 59:
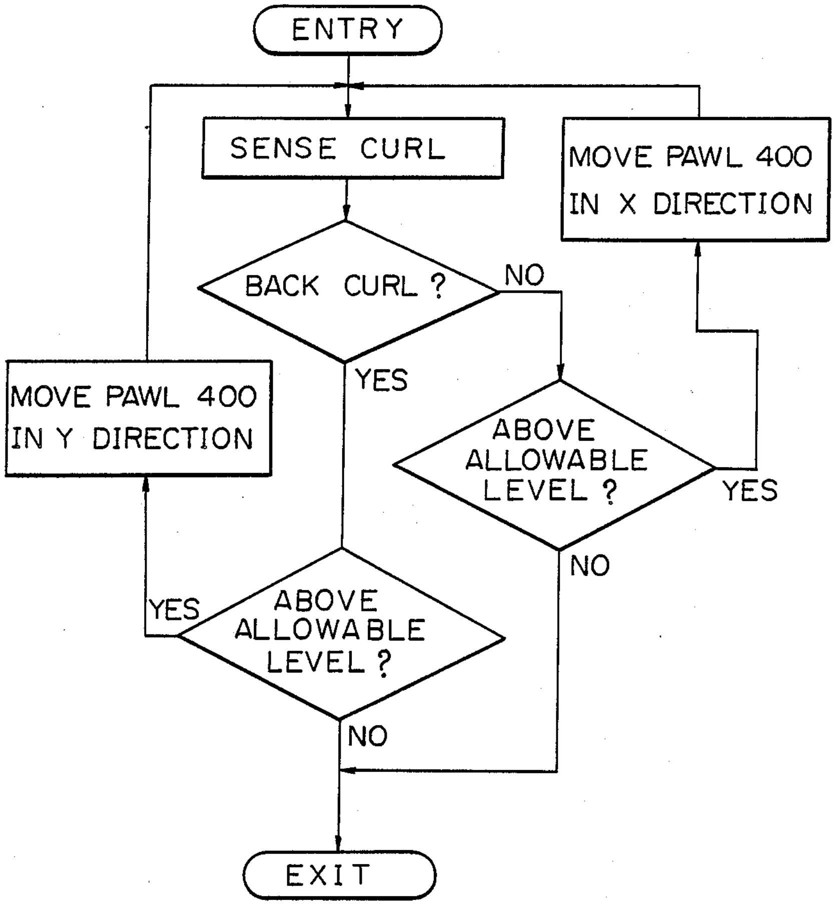
FIG. 59 is a flowchart associated with the modification of FIG. 58.

The operation described above is demonstrated in a flowchart in FIG. 59. The flow begins with measuring the amount of curl of the paper 12 and deciding whether the curl is a back curl or a face curl. Then, the excess curl detector 452 determines whether the actual curl is above the allowable or reference curl level which is set up by the allowable curl setting block 450. If the actual curl is a back curl and above the reference level, the pawl 400 is moved in a direction X of FIG. 58 to increase the separating angle of the pawl 400. On the other hand, if the actual curl is a face curl and above the reference level, the pawl 400 is moved in a direction Y of FIG. 58 to reduce the separating angle. The instantaneous position of the pawl 400 is sensed by the pawl position sensor 448 in terms of the movement of the sector gear 440 and with respect to a plurality of consecutive steps. A signal representative of such a position of the pawl 400 is fed back to the controller 454, and the curl measurement and the shift of the pawl 400 are repeated until the amount of curl becomes minimum.

As described above, any of the embodiment and its modifications described above is capable of adjusting the contact point of a pawl with a fixing roller in association with the amount of curl of a paper and therefore reducing the amount of curl.

[X] Tenth Embodiment

In this embodiment, the curl correcting device is implemented as a paper feed control device which in a two-side copy mode causes papers each carrying an image on one side thereof to be accurately fed and transported one at a time from a two-side copy tray.

Figure 60A:
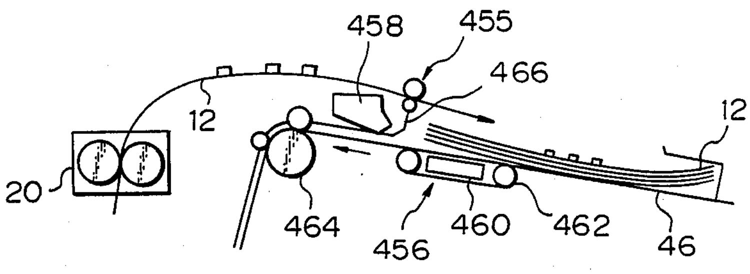
FIGS. 60A and 60B are views showing a paper feed control device which is representative of a tenth embodiment of the present invention and associated with a two-side tray.
Figure 60B:
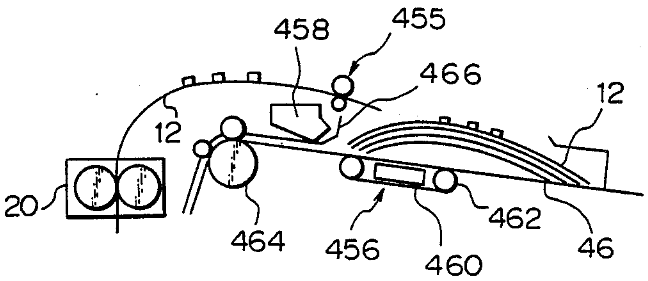

FIGS. 60A and 60B show the two-side tray 46 of the copier 10 as shown in FIG. 1 and the paper feed control device mentioned above. The paper feed control device is generally constituted by a suction assembly 456 and an air ejection assembly (hereinafter referred to as an air knife) 458. Disposed below the two-side tray 46, the suction assembly 456 serves to suck the lowermost one of papers which are stacked on the tray 46. The air knife 458 functions to blow air to between the lowermost paper and the other papers which overly the lowermost one. In detail, papers each being provided with an image on one side thereof are sequentially stacked on the two-side tray 46 by a discharge roller pair 455. The air knife 458 blows air to between the lowermost paper 12 and the other papers 12, so that the individual papers 12 are held in a floating condition. The suction assembly 456 comprises a vacuum fan 460 for sucking the lowermost paper 12 and an endless belt 462 for feeding the lowermost paper 12. The vacuum fan 460 is turned on at a predetermined timing to suck the lowermost paper 12, and the endless belt 462 feeds out that paper 12. Further, a grip roller 464 drives the paper 12 for the second copying operation. In this manner, the air knife 458 lifts the papers 12 to reduce the coefficient of friction between the papers 12 and, when the lowermost paper 12 is sucked by the fan 460, separates the lowermost papers 12 from the others by producing an air gap between it and the paper 12 which is positioned just above the lowermost one.

FIG. 60A shows a condition in which opposite edges of the papers 12 are curled upward (face curl). In this condition, should the amount of air blown by the air knife 458 be excessive, the papers 12 would be turned up and abut against a fence 466 at their leading edge when fed one by one. This constitutes a cause of so-called dog-earing. Also, while the vacuum produced by the vacuum fan 460 has to be intensified as the curl level increases, excessive vacuum would suck not only the lowermost paper 12 but also the overlying paper 12 and cause them to be fed together. In this embodiment, the amount of air and the intensity of vacuum are predetermined on the basis of a condition in which the amount of curl is approximately zero. It is to be noted that a face curl is generally smaller than a back curl.

FIG. 60B shows a condition in which the papers 12 are curled downward at their opposite edges (back curl). In this condition, unless the amount of air from the air knife 458 is large, it is difficult for air to penetrate the end of the paper stack and therefore to lift the papers 12 from the tray 46. Then, the lowermost paper 12 is apt to be fed together with the paper 12 just above it. The vacuum has to be intensified as the curl level increases. In the back curl condition, different from the face curl condition, the vacuum for sucking the paper 12 onto the endless belt 462 may be intensified. A greater suction is needed for the back curl condition than for the face curl condition. In this instance, it hardly occurs that the paper 12 just above the lowermost one is sucked together with the latter.

In the illustrative embodiment, the amount of air from the air knife 458 and the vacuum generated by the suction assembly 456 are changed in association with the conditions of curls of the papers 12. The air and the vacuum are increased and decreased by controlling the rotation speeds of motors which are individually associated with the air knife 458 and the suction assembly 456.

Figure 61:
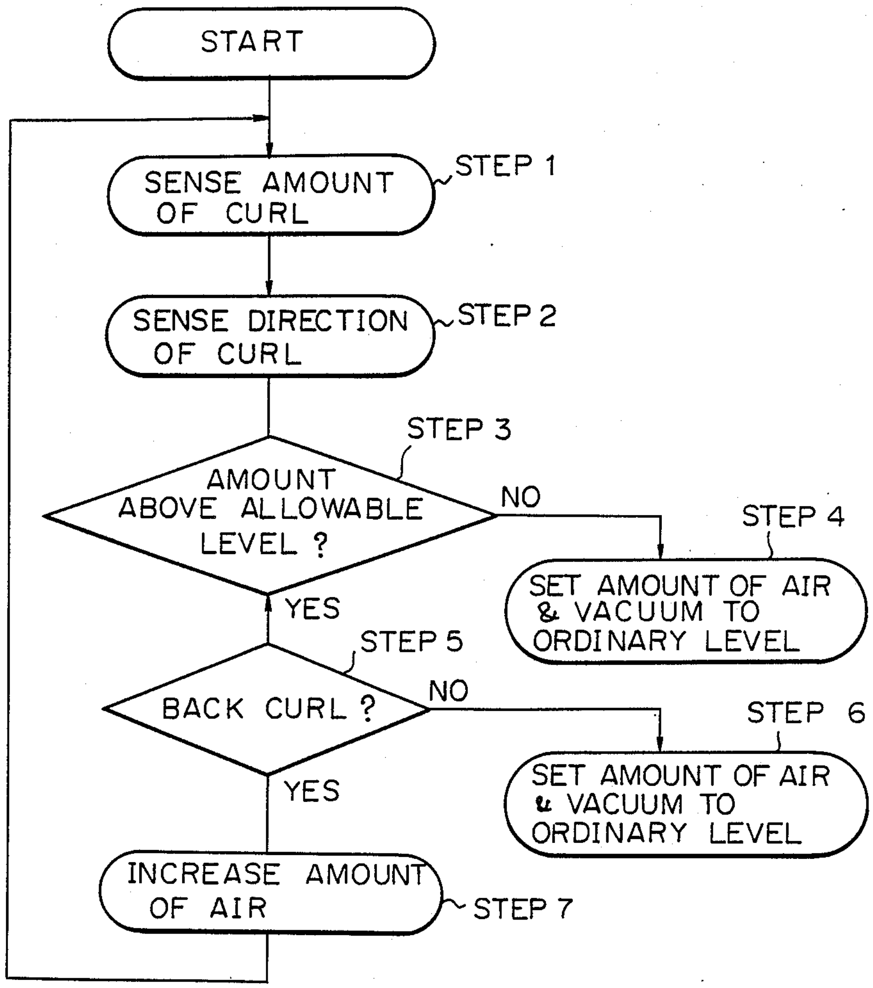
FIG. 61 is a flowchart associated with the operation of an air knife and a suction assembly which constitute the control device of FIGS. 60A and 60B.

FIG. 61 is a flowchart demonstrating how the air and the vacuum are controlled. The curl sensing device 60 senses the amount of curl (STEP 1) and the direction of curl (STEP 2) of the paper 12. If the amount of curl is less than an allowable level (STEP 3), the air knife 458 and the suction assembly 456 are individually actuated to produce air and vacuum each being of standard intensity. If the amount of curl is above the allowable level, whether it is a back curl or a face curl is determined (STEP 5). If the curl is a face curl, the air knife 458 and the suction assembly 456 are individually controlled to set up the standard conditions (STEP 6). If it is a back curl, they are individually controlled to increase the amount of air (STEP 7).

Figure 62:
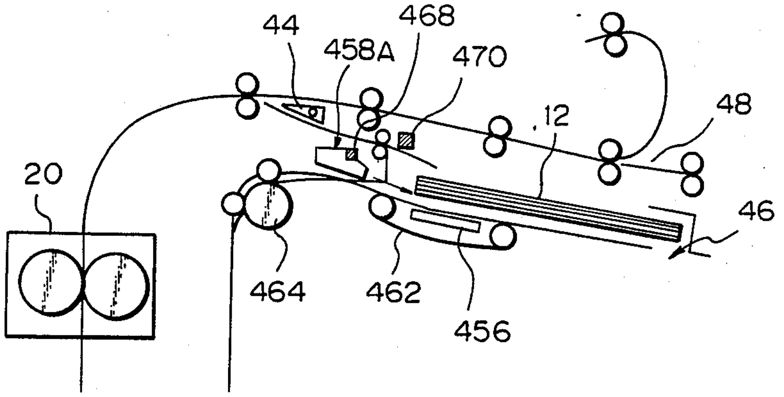
FIG. 62 is a view showing a modification to the tenth embodiment.

A modification to the above embodiment is shown in FIG. 62. In FIG. 62, an air knife 458A is provided with a first humidifier 468 while a second humidifier 470 is located above the two-side tray 46. The first humidifier 468 is adapted to humidify the lower surface (back) of the paper 12 through the air knife 458A, and the second humidifier 470 is adapted to humidify the upper surface (front) of the same. Each of the humidifiers 468 and 470 may be implemented with a common ultrasonic humidifier by way of example.

Figure 63:
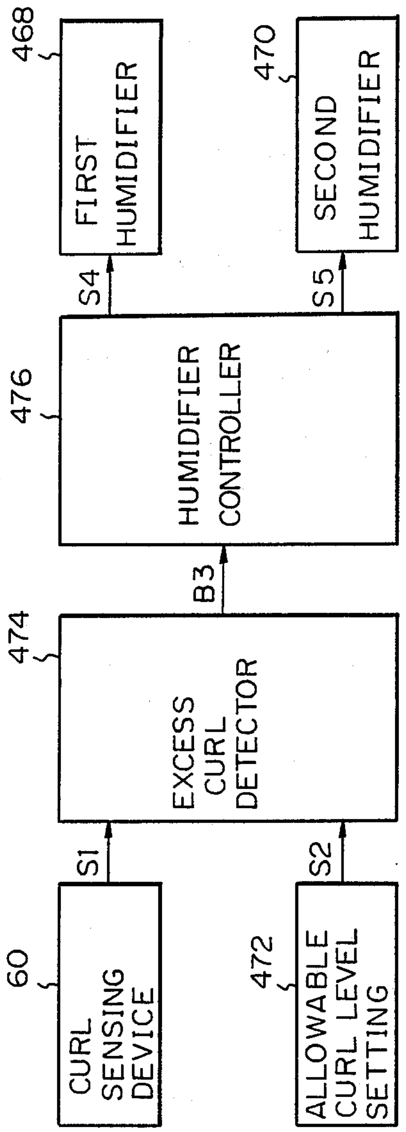
FIG. 63 is a schematic block diagram showing a control system for a humidifier which is included in the control device of FIG. 62.

FIG. 63 shows a control system which may be associated with the humidifiers 468 and 470. As shown, the control system includes an excess curl detector 474 which functions to compare an amount of curl ($S_1$) sensed by the curl sensing device 60 with an allowable curl level ($S_2$) set up by the allowable curl setting block 472, producing an excess curl signal ($S_3$). The output signal of the excess curl detector 474 is fed to a humidifier controller 476. The humidifier controller 476 in turn produces control signals (S4 and S5) which are individually applied to the humidifiers 468 and 470. Constituted by a CPU by way of example, the controller 476 operates the humidifiers 468 and 470 as will be described with reference to FIG. 64.

Figure 64:
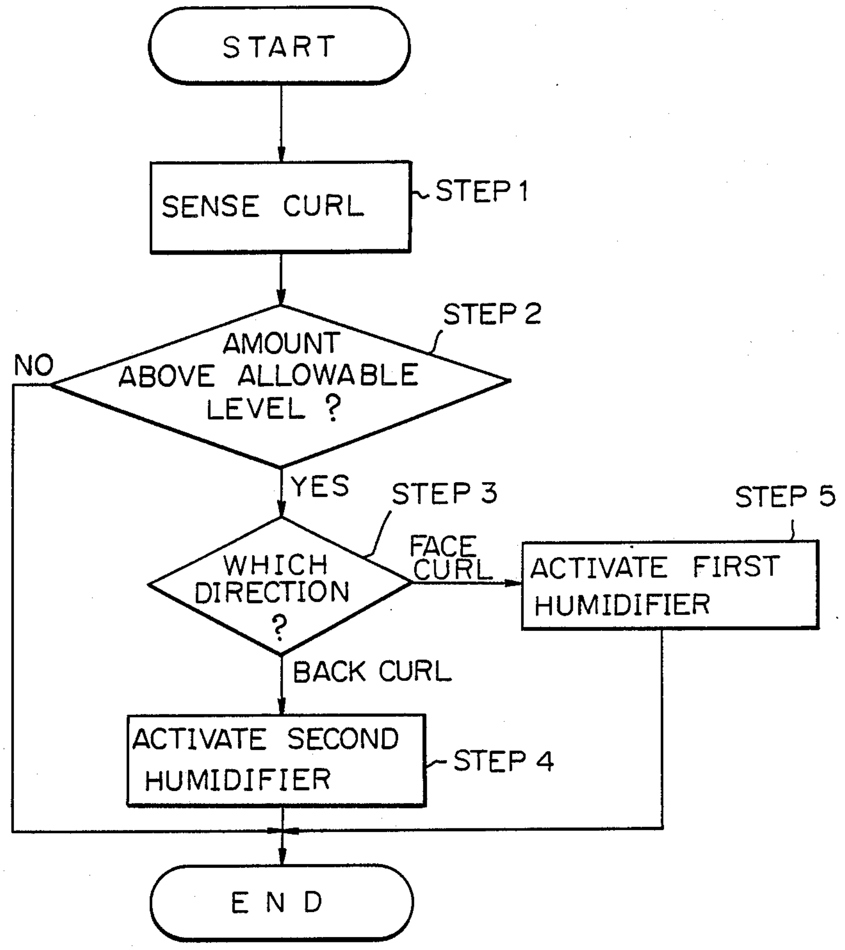
FIG. 64 is a flowchart demonstrating the operation of the control system of FIG. 63.
Figure 65A:
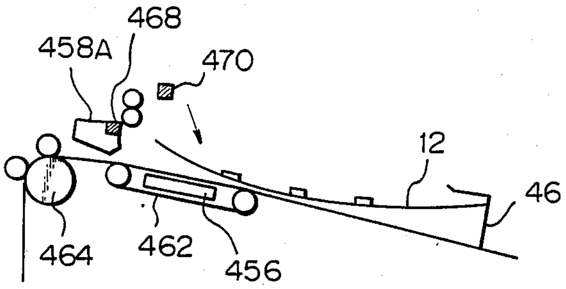
FIGS. 65A and 65B are views showing the operation of the humidifier.
Figure 65B:
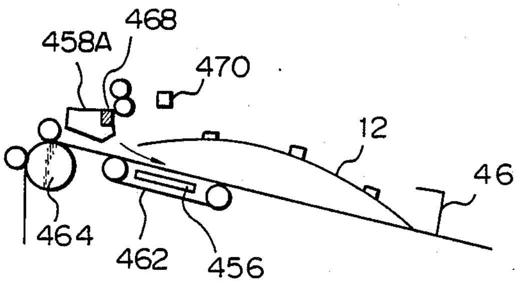

In FIG. 64, after the curl sensing device 60 has sensed the amount of curl of the paper 12 (STEP 1), the program advances to a STEP 2 to determine whether or not the actual curl level is above the allowable curl level. If the actual curl level is higher than the allowable level, a STEP 3 is executed. If the former is lower than the latter, the program ends. In the STEP 3, the direction in which the paper 12 is curled is determined. In the case of a back curl, the program advances to a STEP 4 to activate the first humidifier 468 so that the back of the paper 12 is humidified. Consequently, those fibers which constitute the back of the paper 12 are expanded to straighten the paper 12. In the case of a face curl, the STEP 3 is followed by a STEP 5 for activating the second humidifier 470. This humidifies the front of the paper 12 as shown in FIG. 65B and thereby straightens the paper 12.

The allowable curl level setting circuit 472 may be designed such that the allowable or reference level is variable so as to cope with the scattering in the amount of curl in a single copier or among copiers.

In the modification shown and described, use may be made of ordinary forward and reverse rollers for feeding the papers 12 one by one from the two-side tray 46. In such a case, ducts may be provided on the tray 46 to connect humidifiers. Of course, only the first humidifier 468 which is adapted to humidify the back of the paper 12 which is easy to curl may be used and is successful in controlling the relative humidity around the tray 46 to about 60% and suppressing local omission of an image. To promote further accurate curl correction, two such humidifiers may be located at each of opposite widthwise ends of the paper 12, i.e., four humidifiers may be used in total.

While the paper feed control device made up of the air knife and suction assembly has been shown and described as being associated with the two-side tray 46, it may of course be associated with any of the paper feeders 16*a*, 16*b* and 16*c* and the mass paper feeder B of FIG. 1.

As described above, this embodiment is capable of surely feeding papers on the basis of the amount of curl of a paper. In addition, it positively straightens a paper by using a simple construction which humidifies at least one of opposite surfaces of a paper, thereby substantially eliminating paper jamming, dog-earing, and irregular image reproduction in a two-side copy mode.

Various modifications will become possible for those skilled in the art after receiving the teachings of the present disclosure without departing from the scope thereof.

What is claimed is:

1. A curl control system, for controlling curl of a paper which is applicable to an image forming apparatus, comprising:

curl sensing means for sensing a curl of the paper; and curl correcting means for correcting the curl, sensed by said curl sensing means on the basis of the sensed conditions of any curl.

2. A curl control system as claimed in claim 1, wherein said curl sensing means comprises distance sensor means for sensing an amount and a direction of curl of the paper.

3. A curl control system as claimed in claim 2, wherein said curl sensing means further comprises:

paper transport means, disposed on a paper transport path, which is defined in the image forming apparatus;

paper support means, disposed on said paper transport path, for supporting at least a part of the paper; and wherein said distance sensor means is positioned above and at a predetermined distance from the paper which is supported by said paper support means.

4. A curl control system as claimed in claim 3, wherein said paper support means has a part whose width is smaller than a width of the paper and a part whose width is greater than the width of the paper.

5. A curl control system as claimed in claim 3, wherein said curl sensing means further comprises paper size sensor means for measuring a size of the paper which is transported along the paper transport path.

6. A curl control system as claimed in claim 5, wherein said distance sensor means comprises at least two distance sensors each being constituted by light emitting means for emitting light toward the paper and light-sensitive means for receiving the light which is reflected by the paper.

7. A curl control system as claimed in claim 6, wherein said curl sensing means further comprises distance sensor positioning means for moving and positioning said distance sensors.

8. A curl control system as claimed in claim 7, wherein said curl sensing means further comprises control means for controlling said distance sensor positioning means such that a distance between said distance sensors is adjusted on the basis of the size of the paper which is measured by said paper size sensor means.

9. A curl control system as claimed in claim 8, wherein said control means comprises allowable curl level setting means for setting an allowable curl level, excess curl detector means for reporting an excess curl when the amount of curl detected by said distance sensor means is above the allowable curl level, and display means for displaying a signal indicative of the excess curl.

10. A curl control system as claimed in claim 9, wherein said control means is constructed to disenable a part of various processing units of the image forming apparatus when the excess curl is detected.

11. A curl control system as claimed in claim 1, wherein said curl correcting means comprises:

first transport means, for receiving the paper being transported along a paper transport path, which is defined in the image forming apparatus;

path selector means causing the paper received by said first transport means to follow either one of a first and a second path depending upon conditions of the curl which is sensed by said curl sensing means;

stress applying means disposed on said first and second paths for correcting the curl of the paper by applying a stress to the paper, and second transport means for discharging the paper to which a stress has been applied.

12. A curl control system as claimed in claim 11, wherein said first transport means and said second transport means each comprises a pair of transport rollers.

13. A curl control system as claimed in claim 12, wherein said path selector means comprises a selector pawl for guiding the paper which is received by said transport roller pair to one of the first path and the second paths depending upon the conditions of the curl.

14. A curl control system as claimed in claim 13, wherein said stress applying means comprises a main roller rotatably supported by a support member, a first subroller held in contact with said main roller for applying a stress to the paper which is fed to the first path, and a second subroller held in contact with said main roller for applying stress to the paper which is fed to the second path.

15. A curl control system as claimed in claim 14, wherein a heater is built in said main roller.

16. A curl control system as claimed in claim 14, wherein said stress applying means further comprises a support member for rotatably supporting said main roller, said first subroller, and said second subroller.

17. A curl control system as claimed in claim 16, wherein said stress applying means further comprises support member displacing means for displacing said support member.

18. A curl control system as claimed in claim 1, wherein said curl correcting means comprises humidity adjusting means for adjusting, on the basis of conditions of the curl sensed by said curl sensing means, humidity of an ambience around the paper which is laid on a paper feeder of the image forming apparatus.

19. A curl control system as claimed in claim 18, wherein said humidity adjusting means comprises at least one of humidifier means for humidifying the ambience and dehumidifying means for dehumidifying the ambience.

20. A curl control system as claimed in claim 19, wherein said dehumidifying means comprises both a heater and a humdifying means which comprises an ultrasonic humidifier.

21. A curl control system as claimed in claim 19, wherein said humidity adjusting means further comprises control means for controlling operations of either of a humidifying means and a dehumidifying means.

22. A curl control system as claimed in claim 21, wherein said control means comprises, allowable curl level setting means for setting an allowable curl level, excess curl detector means for reporting an excess curl when the amount of curl sensed is above the allowable curl level, and drive control means responsive to the excess curl for selectively activating and deactivating either of a humidifying means and a dehumidifying means.

23. A curl control system as claimed in claim 1, wherein said curl correcting means comprises:

guide means for guiding the paper, to a transfer station and to a photoconductive element of the image forming apparatus; and guide means positioning means for adjusting a position of said guide means on the basis of conditions of the curl of the paper which is sensed by said curl sensing means.

24. A curl control system as claimed in claim 23, wherein said guide means comprises a guide plate.

25. A curl control system as claimed in claim 24, wherein said guide is made up of a plurality of segments.

26. A curl control system as claimed in claim 24, wherein said guide means positioning means comprises at least one of distance adjusting means for changing a distance between said guide plate and the photoconductive element and angle adjusting means for changing an angle of said guide plate relative to the photoconductive element.

27. A curl control system as claimed in claim 26, wherein said angle adjusting means comprises an eccentric cam rotatable in pressing contact with said guide plate on the basis of the amount of curl which is sensed by said curl sensing means.

28. A curl control system as claimed in claim 26, wherein said distance adjusting means comprises solenoid means for displacing said guide plate on the basis of the amount of curl sensed.

29. A curl control system as claimed in claim 1, wherein said curl correcting means comprises:

current control means for controlling, on the basis of a signal indicative of the conditions of the curl which is sensed by said curl sensing means a transfer current caused to flow by a transfer charger, which is provided at a transfer station of the image forming apparatus.

30. A curl control system as claimed in claim 29, wherein said current control means comprises adjusting means for changing a distance between a casing of the transfer charger and charge wires.

31. A curl control system as claimed in claim 30, wherein said adjusting means comprises movable members which are individually movable on and along opposite walls of the casing.

32. A curl control system as claimed in claim 31, wherein said movable members comprises four conductive members.

33. A curl control system as claimed in claim 1, wherein said curl correcting means comprises:

current control means for controlling, on the basis of a signal indicative of the conditions of the curl which is sensed by said curl sensing means, a separation current caused to flow by a separation charger which is provided at a transfer station of the image forming apparatus.

34. A curl control system as claimed in claim 33, wherein said current control means comprises adjusting means for changing a distance between a casing of the separation charger and charge wires.

35. A curl control system as claimed in claim 34, wherein said adjusting means comprises movable members which are movable on and along opposite side walls of the casing of the separation charger.

36. A curl control system as claimed in claim 35, wherein said movable members comprise four conductive members.

37. A curl control system as claimed in claim 1, wherein said curl correcting means comprises:

pawl positioning means for controlling, on the basis of a signal indicative of the conditions of the curl which is sensed by said curl sensing means, adjusting a position of a pawl which separates the paper from a photoconductive element after image transfer at a transfer station of the image forming apparatus.

38. A curl control system as claimed in claim 37, wherein said curl correcting means further comprises allowable curl level setting means for setting an allowable curl level, excess curl detector means for reporting an excess curl when the curl sensed is above the allowable curl level, and control means for driving said pawl positioning means in response to a signal indicative of any curl.

39. A curl control system as claimed in claim 1, wherein said curl correcting means comprises:

suction adjusting means for, on the basis of a signal indicative of the conditions of the curl sensed, adjusting a suction which is exerted by a paper transport mechanism.

40. A curl control system as claimed in claim 39, wherein said paper transport mechanism comprises a movable endless belt which is formed with a number of apertures, a suction tank interposed between an upper and a lower run of said endless belt and formed with a number of openings through a top wall of said tank, and a vacuum fan disposed in a lower portion of said tank.

41. A curl control system as claimed in claim 40, wherein said suction adjusting means comprises shutters each being associated with a respective one of the openings of said suction tank for selectively fully opening, fully closing and partly opening the opening on the basis of conditions of the curl sensed.

42. A curl control system as claimed in claim 41, wherein said suction adjusting means further comprises allowable curl setting means for setting an allowable curl level, excess curl detector means for reporting an excess curl when the curl sensed is above the allowable curl level, and control means for driving said shutters in response to a signal indicative of any curl.

43. A curl control system as claimed in claim 40, wherein said suction adjusting means comprises ducts each providing communication between said vacuum fan and a respective one of compartments which are defined in said suction tank and are each associated with a respective one of said openings, and shutters each being associated with a respective one of said ducts for selectively opening and closing said duct on the basis of conditions of the curl sensed.

44. A curl control system as claimed in claim 43, wherein said suction adjusting means further comprises allowable curl level setting means for setting an allowable curl level, excess curl detector means for reporting an excess curl when the curl sensed is above the allowable curl level, and control means for driving said shutters in response to a signal indicative of any curl.

45. A curl control system as claimed in claim 1, wherein said curl correcting means comprises:

guide means for, on the basis of a signal indicative of the conditions of the curl sensed, guiding the paper to a nipping section of a thermal fixing roller pair which is provided at a fixing station of the image forming apparatus, and guide means positioning means for, on the basis of conditions of the curl sensed, adjusting a position of said guide means.

46. A curl control system as claimed in claim 45, wherein said guide means comprises a guide plate having a guide surface which is movable in a direction of transport toward the nipping section.

47. A curl control system as claimed in claim 46, wherein an angle between said guide surface of said guide plate and the direction of transfer toward the nipping section is variable on the basis of conditions of the curl sensed.

48. A curl control system as claimed in claim 46, wherein a distance between said guide plate and a fixing roller of the thermal fixing roller pair is variable on the basis of conditions of the curl sensed.

49. A curl control system as claimed in claim 46, wherein said guide plate is made up of a plurality of segments each being movable independently of the others.

50. A curl control system as claimed in claim 1, wherein said curl correcting means comprises:

a pawl disposed downstream, of a nipping section of a thermal fixing roller pair and pawl positioning means for adjusting a position of said pawl on the basis of conditions of the curl sensed.

51. A curl control system as claimed in claim 50, wherein said pawl positioning means changes a contact position of said pawl with the periphery of the fixing roller.

52. A curl control system as claimed in claim 51, wherein said pawl positioning means comprises drive means for displacing said pawl and control means for controlling said drive means.

53. A curl control system as claimed in claim 52, wherein said control means activates said drive means when the curl sensed is above the allowable curl level.

54. A curl control system as claimed in claim 1, wherein said curl correcting means comprises feed control means for feeding a stack of papers one by one from a paper feeder of the image forming apparatus.

55. A curl control system as claimed in claim 54, wherein said paper feeder comprises a two-side tray provided for a two-side copy mode.

56. A curl control system as claimed in claim 55, wherein said feed control means comprises suction means disposed in a lower portion of the two-side tray for sucking the lowermost paper of the stack, air knife means for blowing air to between the papers of the stack, and control means for changing a suction exerted by said suction means an amount of air blown by said air knife means on the basis of conditions of the curl sensed.

57. A curl control system as claimed in claim 56, wherein said air knife means comprises a first humidifier for humdifying the stack of papers from below.

58. A curl control system as claimed in claim 57, wherein said feed control means further comprises a second humidifier for humidifying the stack of papers from above.

59. A curl control system as claimed in claim 58, wherein said control means controls operations of said first humidifier and said second humidifier on the basis of conditions of the curl sensed.

60. A curl control system as claimed in claim 1, wherein said curl sensing means is located downstream of a fixing means of the image forming apparatus.

61. A curl control system as claimed in claim 1, further comprising paper transport control means for controlling transport of said paper along a paper transport path provided in the image forming apparatus under the sensed condition of any curl, without any correction of the curl.

62. A curl system, for controlling curl of a paper which is applicable to an image forming apparatus, comprising:

curl sensing means located downstream of a fixing means of the image forming apparatus for sensing an amount and a direction of curl of the paper; and paper transport control means for controlling transport of said paper along a paper transport path provided in the image forming apparatus under the sensed condition by any curl, without any correction of the curl.

* * * * *